United States Patent
Oh et al.

(10) Patent No.: US 10,158,678 B2
(45) Date of Patent: Dec. 18, 2018

(54) BROADCAST SIGNAL TRANSMISSION DEVICE, BROADCAST SIGNAL RECEIVING DEVICE, BROADCAST SIGNAL TRANSMISSION METHOD AND BROADCAST SIGNAL RECEIVING METHOD

(71) Applicant: LG ELECTRONICS INC., Seoul (KR)

(72) Inventors: Sejin Oh, Seoul (KR); Jangwon Lee, Seoul (KR); Sungryong Hong, Seoul (KR); Woosuk Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 108 days.

(21) Appl. No.: 15/124,290

(22) PCT Filed: Jun. 24, 2015

(86) PCT No.: PCT/KR2015/006422
§ 371 (c)(1),
(2) Date: Sep. 7, 2016

(87) PCT Pub. No.: WO2015/199439
PCT Pub. Date: Dec. 30, 2015

(65) Prior Publication Data
US 2017/0019432 A1    Jan. 19, 2017

Related U.S. Application Data

(60) Provisional application No. 62/017,241, filed on Jun. 25, 2014.

(51) Int. Cl.
*G06F 15/16* (2006.01)
*H04L 29/06* (2006.01)
(Continued)

(52) U.S. Cl.
CPC ...... *H04L 65/1066* (2013.01); *H04L 61/2007* (2013.01); *H04L 65/4076* (2013.01);
(Continued)

(58) Field of Classification Search
CPC ............. H04L 61/2007; H04L 65/1066; H04L 65/4076; H04L 69/15; H04L 69/164; H04L 29/0619; H04L 29/06455
(Continued)

(56) References Cited

U.S. PATENT DOCUMENTS

2008/0008175 A1   1/2008  Park
2009/0083783 A1   3/2009  Park et al.
(Continued)

FOREIGN PATENT DOCUMENTS

EP    2362650 A1    8/2011
EP    2536136 A2    12/2012
(Continued)

*Primary Examiner* — Wing F Chan
*Assistant Examiner* — Andrew Woo
(74) *Attorney, Agent, or Firm* — Birch, Stewart, Kolasch & Birch, LLP

(57) ABSTRACT

Disclosed is a broadcast signal transmission device. The broadcast signal transmission device according to one embodiment of the present invention comprises: a receiving unit for receiving a transmission protocol packet comprising a service signaling message for signaling a broadcast service; and a control unit for extracting the service signaling message from the received transmission protocol packet, and for obtaining information for providing a broadcast service from the extracted service signaling message.

12 Claims, 55 Drawing Sheets

(51) Int. Cl.
*H04L 29/12* (2006.01)
*H04L 29/08* (2006.01)
*H04N 21/2362* (2011.01)
*H04N 21/434* (2011.01)
*H04N 21/462* (2011.01)
*H04N 21/482* (2011.01)
*H04N 21/845* (2011.01)
*H04N 21/234* (2011.01)
*H04N 21/235* (2011.01)
*H04N 21/236* (2011.01)
*H04N 21/643* (2011.01)

(52) U.S. Cl.
CPC ............ *H04L 65/608* (2013.01); *H04L 67/02* (2013.01); *H04L 67/14* (2013.01); *H04L 67/30* (2013.01); *H04L 69/22* (2013.01); *H04N 21/2362* (2013.01); *H04N 21/4345* (2013.01); *H04N 21/4622* (2013.01); *H04N 21/4825* (2013.01); *H04N 21/8456* (2013.01); *H04L 69/326* (2013.01); *H04N 21/234* (2013.01); *H04N 21/235* (2013.01); *H04N 21/236* (2013.01); *H04N 21/64322* (2013.01)

(58) Field of Classification Search
USPC ............................................................ 709/217
See application file for complete search history.

(56) References Cited

U.S. PATENT DOCUMENTS

| | | |
|---|---|---|
| 2009/0110132 A1 | 4/2009 | Kondrad et al. |
| 2010/0266052 A1 | 10/2010 | Kim et al. |
| 2013/0036234 A1 | 2/2013 | Pazos et al. |
| 2014/0143811 A1 | 5/2014 | Lee et al. |
| 2016/0234534 A1* | 8/2016 | Kitahara ................ H04H 20/95 |
| 2016/0254921 A1 | 9/2016 | Song et al. |

FOREIGN PATENT DOCUMENTS

| | | |
|---|---|---|
| EP | 2555510 A2 | 2/2013 |
| EP | 2618563 A2 | 7/2013 |
| EP | 3131304 A1 | 2/2017 |
| JP | 2014-17741 A | 1/2014 |
| KR | 10-2008-0005063 A | 1/2008 |
| KR | 10-2009-0012111 A | 2/2009 |
| KR | 10-2009-0021122 A | 2/2009 |
| KR | 10-2009-0031323 A | 3/2009 |
| KR | 10-2009-0060530 A | 6/2009 |
| KR | 10-2010-0075656 A | 7/2010 |
| WO | WO 2011/088259 A1 | 7/2011 |
| WO | WO 2011/088264 A1 | 7/2011 |
| WO | WO 2012/036429 A2 | 3/2012 |
| WO | WO 2013/118617 A1 | 8/2013 |
| WO | WO 2015/088292 A1 | 6/2015 |
| WO | WO 2015/115253 A1 | 8/2015 |
| WO | WO 2015/156150 A1 | 10/2015 |

\* cited by examiner

| Content | Bits |
|---|---|
| PHY_PROFILE | 3 |
| FFT_SIZE | 2 |
| GI_FRACTION | 3 |
| EAC_FLAG | 1 |
| PILOT_MODE | 1 |
| PAPR_FLAG | 1 |
| FRU_CONFIGURE | 3 |
| RESERVED | 7 |

FIG. 12

| Content | Bits |
|---|---|
| PREAMBLE_DATA | 20 |
| NUM_FRAME_FRU | 2 |
| PAYLOAD_TYPE | 3 |
| NUM_FSS | 2 |
| SYSTEM_VERSION | 8 |
| CELL_ID | 16 |
| NETWORK_ID | 16 |
| SYSTEM_ID | 16 |
| for i = 0:3<br>    FRU_PHY_PROFILE<br>    FRU_FRAME_LENGTH<br>    FRU_GI_FRACTION<br>    RESERVED<br>end | <br>3<br>2<br>3<br>4 |
| PLS2_FEC_TYPE | 2 |
| PLS2_MOD | 3 |
| PLS2_SIZE_CELL | 15 |
| PLS2_STAT_SIZE_BIT | 14 |
| PLS2_SYN_SIZE_BIT | 14 |
| PLS2_REP_FLAG | 1 |
| PLS2_REP_SIZE_CELL | 15 |
| PLS2_NEXT_FEC_TYPE | 2 |
| PLS2_NEXT_MODE | 3 |
| PLS2_NEXT_REP_FLAG | 1 |
| PLS2_NEXT_REP_SIZE_CELL | 15 |
| PLS2_NEXT_REP_STAT_SIZE_BIT | 14 |
| PLS2_NEXT_REP_DYN_SIZE_BIT | 14 |
| PLS2_AP_MODE | 2 |
| PLS2_AP_SIZE_CELL | 15 |
| PLS2_NEXT_AP_MODE | 2 |
| PLS2_NEXT_AP_SIZE_CELL | 15 |
| RESERVED | 32 |
| CRC 32 | 32 |

FIG. 13

| Content | Bits |
|---|---|
| FIC_FLAG | 1 |
| AUX_FLAG | 1 |
| NUM_DP | 6 |
| for i = 1 : NUM_DP | |
|     DP_ID | 6 |
|     DP_TYPE | 3 |
|     DP_GROUP_ID | 8 |
|     BASE_DP_ID | 6 |
|     DP_FEC_TYPE | 2 |
|     DP_COD | 4 |
|     DP_MOD | 4 |
|     DP_SSD_FLAG | 1 |
|     if PHY_PROFILE = '010' | |
|         DP_MIMO | 3 |
|     end | |
|     DP_TI_TYPE | 1 |
|     DP_TI_LENGTH | 2 |
|     DP_TI_BYPASS | 1 |
|     DP_FRAME_INTERVAL | 2 |
|     DP_FIRST_FRAME_IDX | 5 |
|     DP_NUM_BLOCK_MAX | 10 |
|     DP_PAYLOAD_TYPE | 2 |
|     DP_INBAND_MODE | 2 |
|     DP_PROTOCOL_TYPE | 2 |
|     DP_CRC_MODE | 2 |
|     if DP_PAYLOAD_TYPE == TS('00') | |
|         DNP_MODE | 2 |
|         ISSY_MODE | 2 |
|         HC_MODE_TS | 2 |
|         if HC_MODE_TS == '01' or '10' | |
|             PID | 13 |
|         end | |
|     if DP_PAYLOAD_TYPE == IP('01') | |
|         HC_MODE_IP | 2 |
|     end | |
|     RESERVED | 8 |
| end | |
| if FIC_FLAG == 1 | |
|     FIC_VERSION | 8 |
|     FIC_LENGTH_BYTE | 13 |
|     RESERVED | 8 |
| end | |
| if AUX_FLAG == 1 | |
|     NUM_AUX | 4 |
|     AUX_CONFIG_RFU | 8 |
|     for - 1 : NUM_AUX | |
|         AUX_STREAM_TYPE | 4 |
|         AUX_PRIVATE_CONF | 28 |
|     end | |
| end | |

| Content | Bit |
|---|---|
| FRAME_INDEX | 5 |
| PLS_CHANGE_COUNTER | 4 |
| FIC_CHANGE_COUNTER | 4 |
| RESERVED | 16 |
| for i = 1: NUM_DP | |
|     DP_ID | 6 |
|     DP_START | 15 (or13) |
|     DP_NUM_BLOCK | 10 |
|     RESERVED | 8 |
| end | |
| EAC_FLAG | 1 |
| EAS_WAKE_UP_VERSION_NUM | 8 |
| if EAC_FLAG == 1 | |
|     EAC_LENGTH_BYTE | 12 |
| else | |
|     EAC_COUNTER | 12 |
| end | |
| for i=1:NUM_AUX | |
|     AUX_PRIVATE_DYN | 48 |
| end | |
| CRC 32 | 32 |

FIG. 18
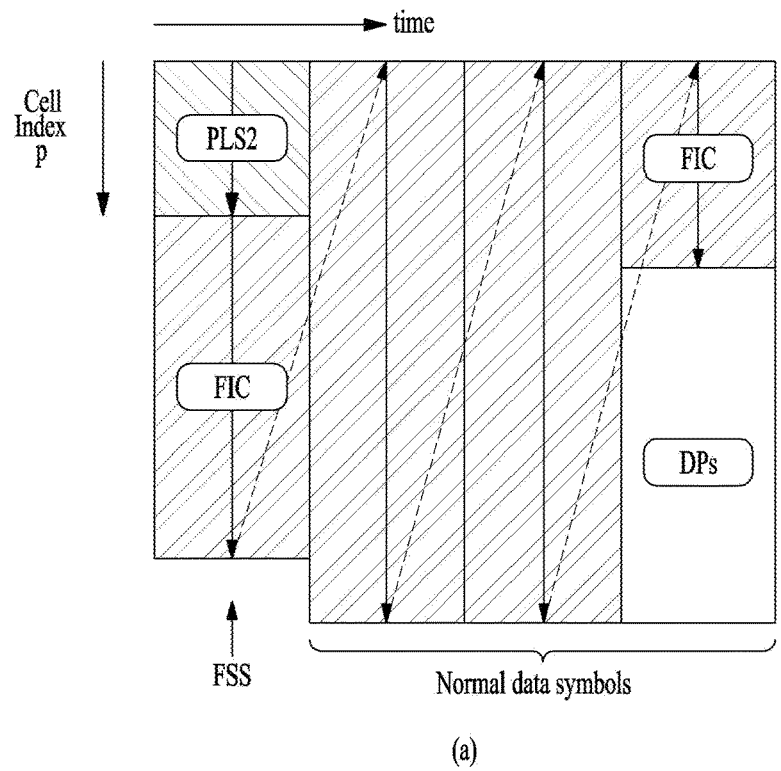
(a)
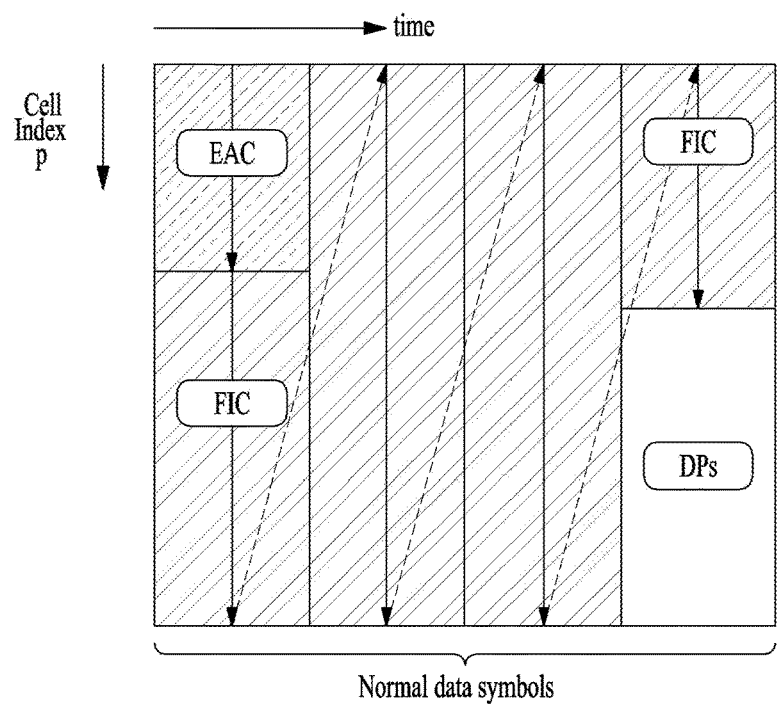
(b)

FIG. 33

| P1 | L1 | Common PLP | Scheduled & interleaved PLP's | | | | Auxiliary data |
|----|----|-----------|------|------|-----|------|----------------|
|    |    |           | PLP1 | PLP2 | ... | PLPn |                |

FIG. 34

| P1 | L1 | Fast Information Channel | Scheduled & interleaved PLP's | | | | Auxiliary data |
|----|----|--------------------------|------|------|-----|------|----------------|
|    |    |                          | PLP1 | PLP2 | ... | PLPn |                |

FIG. 36

| Signaling message header | Signaling message (binary or XML formatted) |
|---|---|

| Syntax | No. Bits | Format |
|---|---|---|
| signaling_message_header{ | | |
|     signaling_id | 8 | uimsbf |
|     signaling_length | 12 | uimsbf |
|     reserved | 4 | '1111' |
|     signaling_id_extension { | | |
|         protocol_version | 8 | uimsbf |
|         reserved | 8 | uimsbf |
|     } | | |
|     reserved | 2 | '11' |
|     version_number | 5 | uimsbf |
|     current_next_indicator | 1 | uimsbf |
|     fragment_number | 8 | uimsbf |
|     last_fragment_number | 8 | uimsbf |
| } | | |

FIG. 37

| Signaling message header | Signaling message (binary or XML formatted) |
|---|---|

| Syntax | No. Bits | Format |
|---|---|---|
| signaling_message_header    { | | |
|    signaling_id | 8 | uimsbf |
|    signaling_length | 12 | uimsbf |
|    reserved | 4 | '1111' |
|    signaling_id_extension    { | | |
|       protocol_version | 8 | uimsbf |
|       reserved | 8 | uimsbf |
|    } | | |
|    reserved | 2 | '11' |
|    version_number | 5 | uimsbf |
|    current_next_indicator | 1 | uimsbf |
|    payload_format | 2 | uimsbf |
|    expiration | 32 | uimsbf |
|    fragment_number | 8 | uimsbf |
|    last_fragment_number | 8 | uimsbf |
| } | | |

FIG. 38

| Signaling message header | or a part of service map signaling message |
|---|---|

| Syntax | No. of Bits | Format |
|---|---|---|
| service_map_signaling_message { | | |
| ... | | |
|    num_services | 8 | uimsbf |
|    for (i=0; i<num_services; i++) | | |
|    { | | |
|      service_id | 16 | uimsbf |
|      service_type | 8 | uimsbf |
|      short_service_name_length /* m */ | 3 | uimsbf |
|      short_service_name | 16*m | bslbf |
|      channel_number | 16 | uimsbf |
|      ... | | |
|      timebase_transport_mode | 8 | uimsbf |
|      bootstrap_data(timebase_transport_mode) | var | |
|      signaling_transport_mode | 8 | |
|      bootstrap_data(signaling_transport_mode) | var | |
|      ... | | |
|      num_service_level_descriptors | 8 | uimsbf |
|      for (m=0; m<num_service_level_descriptors; m++) | | |
|      { | | |
|         service_level_descriptor() | var | |
|      } | | |
|    } | | |
| } | | |

FIG. 39

| timebase_transport_mode or signaling_transport_mode value | Designation |
|---|---|
| 0x00 | IPv4/IPv6 flows through same broadcast or over the cellular network |
| 0x01 | IPv4/IPv6 flows through different broadcast |
| 0x02 | Session-based flows (e.g., ALC/LCT, FLUTE sessions) through same broadcast |
| 0x03 | Session-based flows (e.g., ALC/LCT, FLUTE sessions) through different broadcast |
| 0x04 | packet-based flows through same broadcast |
| 0x05 | packet-based flows through different broadcast |
| 0x06 | URL |
| 0x07-0xFF | Reserved |

FIG. 40

| Syntax | No. of Bits | Format |
|---|---|---|
| bootstrap_data() { | | |
|   IP_version_flag | 1 | bslbf |
|   source_IP_address_flag | 1 | bslbf |
|   destination_IP_address_flag | 1 | bslbf |
|   reserved | 5 | '11111' |
|   if (source_IP_address_flag) | | |
|     source_IP_address | 32 or 128 | uimsbf |
|   if (destination_IP_address_flag) | | |
|     destination_IP_address | 32 or 128 | uimsbf |
|   port_num_count | 8 | |
|   if(port_num_count > 0) | | |
|     destination_UDP_port_num | 16 | uimsbf |
| } | | |

FIG. 41

| Syntax | No. of Bits | Format |
|---|---|---|
| bootstrap_data() { | | |
|     broadcast_id | 16 | uimsbf |
|     IP_version_flag | 1 | bslbf |
|     source_IP_address_flag | 1 | bslbf |
|     destination_IP_address_flag | 1 | bslbf |
|     reserved | 5 | '11111' |
|     if(source_IP_address_flag) | | |
|         source_IP_address | 32 or 128 | uimsbf |
|     if(destination_IP_address_flag) | | |
|         destination_IP_address | 32 or 128 | uimsbf |
|     port_num_count | 8 | |
|     if(port_num_count > 0) | | |
|         destination_UDP_port_num | 16 | uimsbf |
| } | | |

FIG. 42

| Syntax | No. of Bits | Format |
|---|---|---|
| bootstrap_data() { | | |
|     IP_version_flag | 1 | bslbf |
|     source_IP_address_flag | 1 | bslbf |
|     destination_IP_address_flag | 1 | bslbf |
|     reserved | 5 | '11111' |
|     if(source_IP_address_flag) | | |
|         source_IP_address | 32 or 128 | uimsbf |
|     if(destination_IP_address_flag) | | |
|         destination_IP_address | 32 or 128 | uimsbf |
|     destination_UDP_port_num | 16 | uimsbf |
|     tsi | 16 | uimsbf |
| } | | |

FIG. 43

| Syntax | No. of Bits | Format |
|---|---|---|
| bootstrap_data() { | | |
|     broadcast_id | 16 | uimsbf |
|     IP_version_flag | 1 | bslbf |
|     source_IP_address_flag | 1 | bslbf |
|     destination_IP_address_flag | 1 | bslbf |
|     reserved | 5 | '11111' |
|     if(source_IP_address_flag) | | |
|         source_IP_address | 32 or 128 | uimsbf |
|     if(destination_IP_address_flag) | | |
|         destination_IP_address | 32 or 128 | uimsbf |
|     destination_UDP_port_num | 16 | uimsbf |
|     tsi | 16 | uimsbf |
| } | | |

FIG. 44

| Syntax | No. of Bits | Format |
|---|---|---|
| bootstrap_data() { | | |
|     IP_version_flag | 1 | bslbf |
|     source_IP_address_flag | 1 | bslbf |
|     destination_IP_address_flag | 1 | bslbf |
|     reserved | 5 | '11111' |
|     if(source_IP_address_flag) | | |
|         source_IP_address | 32 or 128 | uimsbf |
|     if(destination_IP_address_flag) | | |
|         destination_IP_address | 32 or 128 | uimsbf |
|     destination_UDP_port_num | 16 | uimsbf |
|     packet_id | 16 | uimsbf |
| } | | |

FIG. 45

| Syntax | No. of Bits | Format |
|---|---|---|
| bootstrap_data() { | | |
|    broadcast_id | 16 | uimsbf |
|    IP_version_flag | 1 | bslbf |
|    source_IP_address_flag | 1 | bslbf |
|    destination_IP_address_flag | 1 | bslbf |
|    reserved | 5 | '11111' |
|    if(source_IP_address_flag) | | |
|       source_IP_address | 32 or 128 | uimsbf |
|    if(destination_IP_address_flag) | | |
|       destination_IP_address | 32 or 128 | uimsbf |
|    destination_UDP_port_num | 16 | uimsbf |
|    packet_id | 16 | uimsbf |
| } | | |

FIG. 46

| Syntax | No. of Bits | Format |
|---|---|---|
| bootstrap_data() { | | |
|    URL_length | 8 | |
|    for (i = 0; i < URL_length; i++){ | | |
|       URL_char | 8 | bslbf |
|    } | | |
| } | | |

FIG. 47

```
service_map_signaling_message {
  ...
  num_services
  for (i=0; i<num_services; i++)
  {
    service_id
    service_type
    short_service_name_length /* m */
    short_service_name
    channel_number
    ...
    timebase_transport_mode
    bootstrap_data(timebase_transport_mode)
    signaling_transport_mode
    bootstrap_data(signaling_transport_mode)
    ...
    num_service_level_descriptors
    for (m=0; m<num_service_level_descriptors; m++)
    {
      service_level_descriptor()
    }
  }
}
```

→ IP/UDP flow transmitting Timebase timebase
- timebase id
- clock_rate
- ...

→ Specific ALC/LCT transmission session

MPG signaling message
- MPD@id
- ...

Component location signaling message
- Service_id
- for (i=0; i<num_components; i++)
  {
   ...
  }

Application signaling message
- App_signaling_id
- for (i=0; i<num_apps; i++)
  {
   ...
  }

FIG. 48

| Signaling message header | or a part of service map signaling message |
|---|---|

| Syntax | No. of Bits | Format |
|---|---|---|
| service_map_signaling_message { | | |
| ... | | |
|   num_services | 8 | uimsbf |
|   for (i=0; i<num_services; i++) | | |
|   { | | |
|     service_id | 16 | uimsbf |
|     service_type | 8 | uimsbf |
|     short_service_name_length /* m */ | 3 | uimsbf |
|     short_service_name | 16*m | bslbf |
|     channel_number | 16 | uimsbf |
|     ... | | |
|     timebase_transport_flag | 1 | bslbf |
|     if(timebase_transport_flag) | | |
|       timebase_transport_mode | 8 | uimsbf |
|       bootstrap_data(timebase_transport_mode) | var | |
|     } | | |
|     signaling_transport_mode | 8 | |
|     bootstrap_data(signaling_transport_mode) | var | |
|     ... | | |
|     num_service_level_descriptors | 8 | uimsbf |
|     for (m=0; m<num_service_level_descriptors; m++) | | |
|     { | | |
|       service_level_descriptor() | var | |
|     } | | |
|   } | | |
| } | | |

FIG. 49

| Signaling message header | or a part of service map signaling message |
|---|---|

(can be represented in XML or other format)

| Syntax | No. of Bits | Format |
|---|---|---|
| service_map_signaling_message { | | |
| ... | | |
|   num_services | 8 | uimsbf |
|   for (i=0; i<num_services; i++) | | |
|   { | | |
|     service_id | 16 | uimsbf |
|     service_type | 8 | uimsbf |
|     ... | | |
|     timebase_transport_flag | 1 | bslbf |
|     MPD_transport_flag | 1 | bslbf |
|     component_location_transport_flag | 1 | bslbf |
|     app_signaling_transport_flag | 1 | bslbf |
|     signaling_transport_flag | 1 | bslbf |
|     reserved | 3 | '111' |
|     if(timebase_transport_flag) | | |
|       timebase_transport_mode | 8 | uimsbf |
|       bootstrap_data(timebase_transport_mode) | var | |
|     } | | |
|     if(MPD_transport_flag) | | |
|       MPD_transport_mode | 8 | |
|       bootstrap_data(MPD_transport_mode) | var | |
|     } | | |
|     if(component_location_transport_flag) | | |
|       component_location_transport_mode | 8 | uimsbf |
|       bootstrap_data(component_location_transport_mode) | var | |
|     } | | |
|     if(app_signaling_transport_flag) | | |
|       app_signaling_transport_mode | 8 | |
|       bootstrap_data(app_signaling_transport_mode) | var | |
|     } | | |
|     if(signaling_transport_flag) | | |
|       signaling_transport_mode | 8 | |
|       bootstrap_data(signaling_transport_mode) | var | |
|     } | | |
|     ... | | |
|     num_service_level_descriptors | 8 | uimsbf |
|     for (m=0; m<num_service_level_descriptors; m++) | | |
|     { | | |
|       service_level_descriptor() | var | |
|     } | | |
|   } | | |
| } | | |

FIG. 50

| X_transport_mode 값 | Designation |
|---|---|
| 0x00 | IPv4/IPv6 flows through same broadcast or over the cellular network |
| 0x01 | IPv4/IPv6 flows through different broadcast |
| 0x02 | Session-based flows (e.g., ALC/LCT, FLUTE sessions) through same broadcast |
| 0x03 | Session-based flows (e.g., ALC/LCT, FLUTE sessions) through different broadcast |
| 0x04 | packet-based flows through same broadcast |
| 0x05 | packet-based flows through different broadcast |
| 0x06 | URL |
| 0x07-0xFF | Reserved |

FIG. 51

| Syntax | No. Bits | Format |
|---|---|---|
| component_location_signaling_message { | | |
|    signaling_id | 8 | uimsbf |
|    signaling_length | 12 | uimsbf |
|    reserved | 4 | '1111' |
|    signaling_id_extension { | | |
|       protocol_version | 8 | uimsbf |
|       reserved | 8 | uimsbf |
|    } | | |
|    reserved | 2 | '11' |
|    version_number | 5 | uimsbf |
|    current_next_indicator | 1 | uimsbf |
|    fragment_number | 8 | uimsbf |
|    last_fragment_number | 8 | uimsbf |
|    service_id | 16 | uimsbf |
|    num_components | 8 | uimsbf |
|    for (i=0; i<num_components; i++) | | |
|    { | | |
|       component_id_length /*L*/ | 8 | uimsbf |
|       component_id | 8*L | uimsbf |
|       frequency_number | 16 | uimsbf |
|       broadcast_id | 16 | uimsbf |
|       data_pipe_id | 8 | uimsbf |
|       IP_version_flag | 1 | bslbf |
|       source_IP_address_flag | 1 | bslbf |
|       destination_IP_address_flag | 1 | bslbf |
|       reserved | 5 | '11111' |
|       if (source_IP_address_flag) | | |
|          source_IP_address | 32 or 128 | uimsbf |
|       if (destination_IP_address_flag) | | |
|          destination_IP_address | 32 or 128 | uimsbf |
|       UDP_port_num | 16 | uimsbf |
|       tsi | 16 | uimsbf |
|    } | | |
|    num_app_signalings | 8 | uimsbf |
|    for (k=0; k<num_app_signalings; k++) | | |
|    { | | |
|       app_signaling_id_length /*M*/ | 8 | uimsbf |
|       app_signaling_id | 8*M | uimsbf |
|       app_delivery_info() | var | |
|    } | | |
| } | | |

FIG. 52

| Syntax | No. of Bits | Format |
|---|---|---|
| app_delivery_info() { | | |
|     broadcast_flag | 1 | bslbf |
|     IP_version_flag | 1 | bslbf |
|     source_IP_address_flag | 1 | bslbf |
|     destination_IP_address_flag | 1 | bslbf |
|     reserved | 4 | '1111' |
|     if(broadcast_flag) | | |
|         broadcast_id | 16 | uimsbf |
|     if(source_IP_address_flag) | | |
|         source_IP_address | 32 or 128 | uimsbf |
|     if(destination_IP_address_flag) | | |
|         destination_IP_address | 32 or 128 | uimsbf |
|     destination_UDP_port_num | 16 | uimsbf |
|     tsi | 16 | uimsbf |
| } | | |

FIG. 53

| Syntax | No. of Bits | Format |
|---|---|---|
| app_delivery_info() { | | |
|     broadcast_flag | 1 | bslbf |
|     IP_version_flag | 1 | bslbf |
|     source_IP_address_flag | 1 | bslbf |
|     destination_IP_address_flag | 1 | bslbf |
|     reserved | 4 | '1111' |
|     if(broadcast_flag) | | |
|         broadcast_id | 16 | uimsbf |
|     if(source_IP_address_flag) | | |
|         source_IP_address | 32 or 128 | uimsbf |
|     if(destination_IP_address_flag) | | |
|         destination_IP_address | 32 or 128 | uimsbf |
|     destination_UDP_port_num | 16 | uimsbf |
|     packet_id | 16 | uimsbf |
| } | | |

FIG. 54

```
<?xml version="1.0" encoding="UTF-8"?>
<xs:schema xmlns:xs="http://www.w3.org/2001/XMLSchema">
<xs:element name="CompLocTable" type="CompLocTableType"/>
<xs:complexType name="CompLocTableType">
  <xs:sequence>
    <xs:element name="MPDCompLocs" maxOccurs="unbounded">
    <xs:complexType>
      <xs:sequence>
        <xs:element name="PeriodCompLocs" maxOccurs="unbounded">
          <xs:complexType>
            <xs:sequence>
              <xs:element name="ReptnLoc" type="ReptnLocType" maxOccurs="unbounded"/>
            </xs:sequence>
            <xs:attribute name="periodId" type="xs:string"/>
          </xs:complexType>
        </xs:element>
      </xs:sequence>
      <xs:attribute name="mpdId"/>
    </xs:complexType>
    </xs:element>
  </xs:sequence>
</xs:complexType>
<xs:complexType name="ReptnLocType">
  <xs:attribute name="ReptnID" type="StringNoWhitespaceType" use="required"/>
  <xs:attribute name="RFChan" type="xs:unsignedByte" use="required"/>
  <xs:attribute name="BroadcastId " type="xs:unsignedByte" use="required"/>
  <xs:attribute name="DataPipeId " type="xs:unsignedByte" use="required"/>
  <xs:attribute name="IPAddr" type="xs:unsignedInt" use="required"/>
  <xs:attribute name="UDPPort" type="xs:unsignedShort" use="required"/>
  <xs:attribute name="TSI" type="xs:unsignedInt" use="required"/>
</xs:complexType>
<!-- String without white spaces -->
<xs:simpleType name="StringNoWhitespaceType">
  <xs:restriction base="xs:string">
    <xs:pattern value="[^\r\n\t \p{Z}]*"/>
  </xs:restriction>
</xs:simpleType>
</xs:schema>
```

FIG. 56

| Element or Attribute Name | Use | Description |
|---|---|---|
| Service | | |
| @id | M | Service identifier |
| @serviceType | M | service type |
| @serviceName | O | service name |
| @channelNumber | M | channel number associated with this service |
| .. | | |
| TimebaseLocation | 0...1 | The location where a time base, a metadata to establish a time line for synchronizing the components of this service, can be acquired |
| @deliveryMode | M | The delivery mode of this time base. |
| BootstrapInfo | 1 | Bootstrap information of this time base according to the delivery mode |
| MPD | 0...1 | DASH media presentation description (MPD) including components of this service |
| MPDSignalingLocation | 0...1 | The location where MPD or MPD URL can be acquired |
| @deliveryMode | O | The delivery mode of this MPD location signalling |
| BootstrapInfo | 1 | Bootstrap information of MPD or MPD URL according to the delivery mode |
| ComponentSignalingLocation | 1...N | Component location signalling |
| @deliveryMode | O | The delivery mode of this component location signalling |
| BootstrapInfo | 1 | Bootstrap information of this component location signalling according to the delivery mode |
| AppSignalingLocation | 0...N | The location where application signalling can be acquired |
| @deliveryMode | O | The delivery mode of this application signalling |
| BootstrapInfo | 1 | Bootstrap information of the application signalling according to the delivery mode |
| ObjectFlow | 1...N | associated object flow delivering components of this service |
| Legend: | | |
| For attributes: M=Mandatory, O=Optional, OD=Optional with Default Value, CM=Conditionally Mandatory. For elements: <minOccurs>...<maxOccurs> (N=unbounded) Note that the conditions only holds without using xlink:href. If linking is used, then all attributes are "option" and <minOccurs=0> Elements are bold; attributes are non-bold and preceded with an @. | | |

FIG. 57

| @ deliveryMode value | Designation |
|---|---|
| 0x00 | IPv4/IPv6 flows through same broadcast or over the cellular network |
| 0x01 | IPv4/IPv6 flows through different broadcast |
| 0x02 | Session-based flows (e.g., ALC/LCT, FLUTE sessions) through same broadcast |
| 0x03 | Session-based flows (e.g., ALC/LCT, FLUTE sessions) through different broadcast |
| 0x04 | packet-based flows through same broadcast |
| 0x05 | packet-based flows through different broadcast |
| 0x06 | URL |
| 0x07-0xFF | Reserved |

FIG. 58

| Element or Attribute Name | Use | Description |
|---|---|---|
| BootstrapInfo | | |
| @ RFchannel | O | RF channel carrying broadcast stream |
| @ broadcastID | O | the identifier of broadcaster transmitting the broadcast stream |
| @ datapipeID | O | the physical layer data pipe identifier carrying IP datagrams |
| @ sourceIP | O | the source address of the IP datagrams carrying associated data |
| @ destinationIP | O | the destination address of the IP datagrams carrying associated data |
| @ destinationPort | O | the destination port number of the IP datagrams carrying associated data |
| @ tsi | O | the identifier of transport session delivering transport packets carrying associated data |
| @URL | O | URL where associated data can be acquired |
| @ packetid | O | The identifier of transport packets carrying the associated data |
| Legend: | | |

For attributes: M=Mandatory, O=Optional, OD=Optional with Default Value, CM=Conditionally Mandatory.

For elements: <minOccurs>...<maxOccurs> (N=unbounded)

Note that the conditions only holds without using xlink:href. If linking is used, then all attributes are "optional" and <min Occurs=0>

Elements are bold; attributes are non-bold and preceded with an @.

FIG. 59

| Element or Attribute Name | Use | Description |
|---|---|---|
| ObjectFlow | | specifies the object flow |
| @id | M | the object flow identifier. When DASH segments are delivered via this object flow, it can be equal to combination of MPD identifier, period identifier, and DASH representation identifier |
| @objectFormat | M | The format of objects in this object flow. |
| @contentType | O | the media content component type for this object flow |
| @contentEncoding | O | the encoding of delivered objects via this object flow (e.g., gzip, etc) |
| File | 0...N | file information |
| @contentLocation | M | location where this file can be acquired. When DASH segments are delivered via this object flow, it can be equal to DASH segment URL |
| @TOI | M | transport object identifier (TOI) |
| FileTemplate | 0...1 | file template information. |
| @contentLocTemplate | M | Template to create location where a file can be acquired. |
| @startTOI | O | the first TOI that is delivered in this object flow |
| @endTOI | O | the end TOI that is delivered in this object flow |
| @scale | OD (default = 1) | the scale between TOI values in this object flow. |
| ObjectGroup | 0...N | the group of transport objects delivered via this object flow . |
| @contentLocation | M | content location associated to this object group |
| @startTOI | O | the first TOI of packets delivering this object group |
| @endTOI | O | the last TOI of packets delivering this object group |
| BootstrapInfo | 0...N | bootstrap information of this object flow |

Legend :
For attributes: M=Mandatory, O=Optional, OD=Optional with Default Value, CM=Conditionally Mandatory.
For elements: <minOccurs>...<maxOccurs> (N=unbounded)
Note that the conditions only holds without using xlink:href. If linking is used, then all attributes are "optional" and <minOccurs=0> Elements are bold; attributes are non-bold and preceded with an @.

FIG. 60

| $<Identifier>$ | Substitution parameter | Format |
|---|---|---|
| $$ | Is an escape sequence, i.e. "$$" is replaced with a single "$" | not applicable |
| $RepresentationID$ | This identifier is substituted with the value of the attribute Representation@id of the containing Representation. | The format tag shall not be present. |
| $Number$ | This identifier is substituted with the number of the corresponding Segment. | The format tag may be present. If no format tag is present, a default format tag with width=1 shall be used. |

FIG. 61

| Element or Attribute Name | Use | Description |
|---|---|---|
| ObjectFlow | | specifies the object flow |
| @id | M | the object flow identifier. When DASH segments are delivered via this object flow, it can be equal to combination of MPD identifier, period identifier, and DASH representation identifier |
| @ objectFormat | M | The format of objects in this object flow. |
| @ contentType | O | the media content component type for this object flow |
| @ contentEncoding | O | the encoding of delivered objects via this object flow (e.g., gzip, and so on) |
| @ isDefault | OD (default=true) | Specifies whether objects delivered in this object flow include the component data used as default |
| File | 0...N | file information |
| @contentLocation | M | location where this file can be acquired. When DASH segments are delivered via this object flow, it can be equal to DASH segment URL |
| @TOI | M | transport object identifier (TOI) |
| FileTemplate | 0...1 | file template information. |
| @startTOI | O | the first TOI that is delivered in this object flow |
| @endTOI | O | the end TOI that is delivered in this object flow |
| @scale | OD (default = 1) | the scale between TOI values in this object flow. |
| ObjectGroup | 0...N | the group of transport objects delivered via this object flow . |
| @contentLocation | M | content location associated to this object group |
| @startTOI | O | the first TOI of packets delivering this object group |
| @endTOI | O | the last TOI of packets delivering this object group |
| BootstrapInfo | 0...N | bootstrap information of this object flow |

Legend :
For attributes: M=Mandatory, O=Optional, OD=Optional with Default Value, CM=Conditionally Mandatory.
For elements: <minOccurs>...<maxOccurs> (N=unbounded)
Note that the conditions only holds without using xlink:href. If linking is used, then all attributes are "optional" and <min Occurs=0>
Elements are bold; attributes are non-bold and preceded with an @.

FIG. 62

| Element or Attribute Name | Use | Description |
|---|---|---|
| FDTInstance | | specifies the static File Delivery Descriptor |
| @id | M | specifies the identifier of the FDT instance |
| @Expires | M | expiry time of the FDT Instance. |
| @Complete | O | when TRUE, signals that no new data will be provided in future FDT Instances within this session (i.e., that either FDT Instances with higher ID numbers will not be used or if they are used, will only provide identical file parameters to those already given in this and previous FDT Instances) |
| File | 1...N | |
| @Content-Location | M | Can be assigned a valid URI |
| @TOI | M | MUST be assigned a valid TOI value |
| @Content-Length | O | The actual length of this file content |
| @Transfer-Length | O | The transfer length of this file content |
| @Content-Encoding | O | The encoding of this file content |
| @Content-Type | O | The type of this file content |
| Legend: For attributes: M=Mandatory, O=Optional, OD=Optional with Default Value, CM=Conditionally Mandatory. For elements: <minOccurs>...<maxOccurs> (N=unbounded) Note that the conditions only holds without using xlink:href. If linking is used, then all attributes are "optional" and <minOccurs=0> Elements are bold; attributes are non-bold and preceded with an @. | | |

FIG. 63

| Element or Attribute Name | Use | Description |
|---|---|---|
| TSID | | Transport Session Instance Descriptor |
| TransportSession | 1...N | |
| @tsi | M | specifies the transport session identifier |
| PayloadFormat | 1...N | |
| @codePoint | OD default=0 | defines what CodePoint value is used for this payload. This is the value of the CP field in the LCT header. |
| @protocol | M | specifies the protocol for this payload.<br>0: ALC<br>1: ROUTE |
| @deliveryObjectFormat | M | specifies the payload format of the delivery object. For details see below. |
| @realtime | OD | if not present it is false. If present and set to true, LCT packets contain extension headers including NTP timestamps that express the presentation time of the included delivery object. |
| @isobmff | OD default=0 | expresses if the delivery objects are ISO BMFF structures and if specific fragmentation is applied<br>0: arbitrary data<br>1: delivery object is a sequence of complete ISO BMFF boxes<br>2: each delivery object is a DASH object, i.e. a segment or any other object that is referenced in the MPD.<br>3: delivery object is a is a sequence of complete ISO BMFF boxes fragmented according to the rules in MMT MPU mode |
| @packetheadersize | OD default=1 | The size the route packet header in multiple of 4 octets. The value space shall 0, 1 or 2. If set to 0, the ROUTE packet is of zero size and the packet itself contains an entire delivery object. |
| EFID | 0...1 | provides details of the file delivered data. This is the extended FDT instance descriptor. Either embedded or as reference. |
| ApplicationIdentifier | 0...1 | may provide additional information that can be mapped to the application that is carried in this transport session, e.g. Representation ID of a DASH content. |
| RepairFlow | 0...N | Reference a repair flow. This may be added directly or referenced as a separate fragment |

Legend:
For attributes: M=Mandatory, O=Optional, OD=Optional with Default Value, CM=Conditionally Mandatory.
For elements: <minOccurs>...<maxOccurs> (N=unbounded)
Note that the conditions only holds without using xlink:href. If linking is used, then all attributes are "optional" and <minOccurs=0>
Elements are bold; attributes are non-bold and preceded with an @.

FIG. 64

| Element or Attribute Name | Use | Description |
|---|---|---|
| TSID | | Transport Session Instance Descriptor |
| TransportSession | 1...N | |
| @tsi | M | specifies the transport session identifier |
| @protocol | M | specifies the protocol for this payload.<br>0: ALC<br>1: ROUTE |
| PayloadFormat | 1...N | |
| @codePoint | OD default=0 | defines what CodePoint value is used for this payload. This is the value of the CP field in the LCT header. |
| @deliveryObjectFormat | M | specifies the payload format of the delivery object. For details see below. |
| @realtime | OD | if not present it is false. If present and set to true, LCT packets contain extension headers including NTP timestamps that express the presentation time of the included delivery object. |
| @isobmff | OD default=0 | expresses if the delivery objects are ISO BMFF structures and if specific fragmentation is applied<br>0: arbitrary data<br>1: delivery object is a sequence of complete ISO BMFF boxes<br>2: each delivery object is a DASH object, i.e. a segment or any other object that is referenced in the MPD.<br>3: delivery object is a is a sequence of complete ISO BMFF boxes fragmented according to the rules in MMT MPU mode |
| @packetheadersize | OD default=1 | The size the route packet header in multiple of 4 octets. The value space shall 0, 1 or 2. If set to 0, the ROUTE packet is of zero size and the packet itself contains an entire delivery object. |
| EFID | 0...1 | provides details of the file delivered data. This is the extended FDT instance descriptor. Either embedded or as reference. |
| ApplicationIdentifier | 0...1 | may provide additional information that can be mapped to the application that is carried in this transport session, e.g. Representation ID of a DASH content. |
| RepairFlow | 0...N | Reference a repair flow. This may be added directly or referenced as a separate fragment |

Legend:
For attributes: M=Mandatory, O=Optional, OD=Optional with Default Value, CM=Conditionally Mandatory.
For elements: <minOccurs>...<maxOccurs> (N=unbounded)
Note that the conditions only holds without using xlink:href. If linking is used, then all attributes are "optional" and <minOccurs=0>
Elements are bold; attributes are non-bold and preceded with an @.

# US 10,158,678 B2

BROADCAST SIGNAL TRANSMISSION DEVICE, BROADCAST SIGNAL RECEIVING DEVICE, BROADCAST SIGNAL TRANSMISSION METHOD AND BROADCAST SIGNAL RECEIVING METHOD

CROSS REFERENCE TO RELATED APPLICATIONS

This application is the National Phase of PCT International Application No. PCT/KR2015/006422, filed on Jun. 24, 2015, which claims priority under 35 U.S.C. 119(e) to U.S. Provisional Application No. 62/017,241, filed on Jun. 25, 2014, all of which are hereby expressly incorporated by reference into the present application.

BACKGROUND OF THE INVENTION

Field of the Invention

The present invention relates to a broadcast signal transmission device, a broadcast signal reception device, and a method of transmitting and receiving a broadcast signal.

Discussion of the Related Art

In recent digital broadcasting, a method of synchronizing service and content transmission is required to support hybrid broadcast enabling reception of audio/video (A/V) over a terrestrial broadcast network and reception of enhancement data over an Internet communication network.

In particular, an application to be used in a future DTV service includes a hybrid broadcast service using a combination of a terrestrial broadcast network and an Internet communication network. The hybrid broadcast service transmits some broadcast content or enhancement data associated with broadcast content, which is transmitted over the terrestrial broadcast network, in real time over the Internet communication network, thereby enabling a user to experience a variety of content. Accordingly, there is a need for broadcast transmission and reception devices for transmitting and receiving broadcast content over the terrestrial broadcast network and an Internet communication network.

SUMMARY OF THE INVENTION

That is, a digital broadcast system can provide HD (high definition) images, multi-channel audio and various additional services. However, data transmission efficiency for transmission of large amounts of data, robustness of transmission/reception networks and network flexibility in consideration of mobile reception equipment need to be improved for digital broadcast. In addition, signaling information for receiving a digital broadcast signal needs to be received through various paths.

A broadcast transmission device according to an embodiment of the present invention may include a controller for inserting information for providing a broadcast service into a service signaling message and packetizing the service signaling message into a transport protocol packet and a transmission unit for transmitting the transport protocol packet.

The information for providing the broadcast service may include at least one of first service information for a time-base including metadata on a timeline which is a series of time information for content, second service information of detailed information for acquisition of segments configuring content in adaptive media streaming, third service information of a path for acquiring component data configuring content in the broadcast service, fourth service information for a signaling message for an application used in the broadcast service, and fifth service information for a flow including the component data configuring the broadcast service.

At least one of the first service information, the second service information, the third service information and the fourth service information may include information on a transport mode and bootstrap information.

The bootstrap information may include at least one of IP address information capable of acquiring service information based on the information on the transport mode, port number information, transport session identifier information and associated packet identifier information.

The fifth service information may include information on a format of at least one object included in the flow.

The fifth service information may include information indicating whether payload included in the at least one object includes component data used as a default.

The information for providing the broadcast service may include information on a transport session.

The information on the transport session may include information at least one payload and information on a transport protocol of each payload.

The information on the transport session may include at least one payload and information on a transport protocol of the payload included in the transport session is included in a transport session level.

A broadcast reception device according to an embodiment of the present invention includes a reception unit for receiving a transport protocol packet including a service signaling message for signaling a broadcast service, and a controller for extracting the service signaling message from the received transport protocol packet and acquiring information for providing a broadcast service from the extracted service signaling message.

The information for providing the broadcast service may include at least one of first service information for a time-base including metadata on a timeline which is a series of time information for content, second service information of detailed information for acquisition of segments configuring content in adaptive media streaming, third service information of a path for acquiring component data configuring content in the broadcast service, fourth service information for a signaling message for an application used in the broadcast service, and fifth service information for a flow including the component data configuring the broadcast service.

At least one of the first service information, the second service information, the third service information and the fourth service information may include information on a transport mode and bootstrap information.

The bootstrap information may include at least one of IP address information capable of acquiring service information based on the information on the transport mode, port number information, transport session identifier information and associated packet identifier information.

The fifth service information may include information on a format of at least one object included in the flow.

The fifth service information may include information indicating whether payload included in the at least one object includes component data used as a default.

The information for providing the broadcast service may include information on a transport session.

The information on the transport session may include information at least one payload and information on a transport protocol of each payload.

The information on the transport session may include at least one payload and information on a transport protocol of the payload included in the transport session is included in a transport session level.

A broadcast transmission method according to an embodiment of the present invention includes inserting information for providing a broadcast service into a service signaling message, packetizing the service signaling message into a transport protocol packet, and transmitting the transport protocol packet.

A broadcast reception method according to an embodiment of the present invention includes receiving a transport protocol packet including a service signaling message for signaling a broadcast service, extracting the service signaling message from the received transport protocol packet, and acquiring information for providing a broadcast service from the extracted service signaling message.

According to the embodiment of the present invention, it is possible to increase transmission efficiency of a broadcast system.

According to the embodiment of the present invention, it is possible to provide a hybrid broadcast service.

According to the embodiment of the present invention, a broadcast reception device can receive a media stream over broadband.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 12 illustrates PLS1 data according to an embodiment of the present invention;

FIG. 13 illustrates PLS2 data according to an embodiment of the present invention;

FIG. 18 illustrates FIC mapping according to an embodiment of the present invention;

FIG. 33 is a diagram showing a broadcast transport frame according to one embodiment of the present invention;

FIG. 34 is a diagram showing a broadcast transport frame according to another embodiment of the present invention;

FIG. 36 is a diagram showing the configuration of a service signaling message according to one embodiment of the present invention;

FIG. 37 is a diagram showing the configuration of a service signaling message according to one embodiment of the present invention;

FIG. 38 is a diagram showing the configuration of a broadcast service signaling message in a next generation broadcast system according to one embodiment of the present invention;

FIG. 39 is a diagram showing the meaning of the value of a timebase_transport_mode field and a signaling_transport_mode field in a service signaling message according to one embodiment of the present invention;

FIGS. 40 to 46 are diagrams showing the syntax of a bootstrap( ) field according to the values of the timebase_transport_mode field and the signaling_transport_mode field in one embodiment of the present invention;

FIG. 47 is a diagram showing a process of acquiring a timebase and a service signaling message in the embodiments of FIGS. 38 to 46;

FIG. 48 is a diagram showing the configuration of a broadcast service signaling message in a next generation broadcast system according to one embodiment of the present invention;

FIG. 49 is a diagram showing the configuration of a broadcast service signaling message in a next generation broadcast system according to one embodiment of the present invention;

FIG. 50 is a diagram showing the meaning of the value of each transport mode described in FIG. 49;

FIG. 51 is a diagram showing the configuration of a signaling message for signaling a component data acquisition path of a broadcast service in a next generation broadcast system;

FIG. 52 is a diagram showing the syntax of an app_delevery_info( ) field according to one embodiment of the present invention;

FIG. 53 is a diagram showing the syntax of an app_delevery_info( ) field according to another embodiment of the present invention;

FIG. 54 is a diagram showing component location signaling including path information capable of acquiring one or more component data configuring a broadcast service;

FIG. 56 is a diagram showing other information included in signaling of a broadcast service in a next generation broadcast system in one embodiment of the present invention;

FIG. 57 is a diagram showing a transport mode included in service signaling of a next generation broadcast system according to one embodiment of the present invention;

FIG. 58 is a diagram showing information on a bootstrap included in service signaling of a next generation broadcast system according to one embodiment of the present invention;

FIG. 59 is a diagram showing other information included in signaling for an object flow;

FIG. 60 is a diagram showing a combination of information for representing a file template in one embodiment of the present invention;

FIG. 61 is a diagram showing an object flow included in service signaling according to one embodiment of the present invention;

FIG. 62 is a diagram showing other information included in signaling of a broadcast service in a next generation broadcast system in one embodiment of the present invention;

FIG. 63 is a diagram showing signaling information for transport session information of a session level according to one embodiment of the present invention;

FIG. 64 is a diagram showing signaling information for transport session information of a session level according to another embodiment of the present invention;

DETAILED DESCRIPTION OF THE INVENTION

Figure 1:
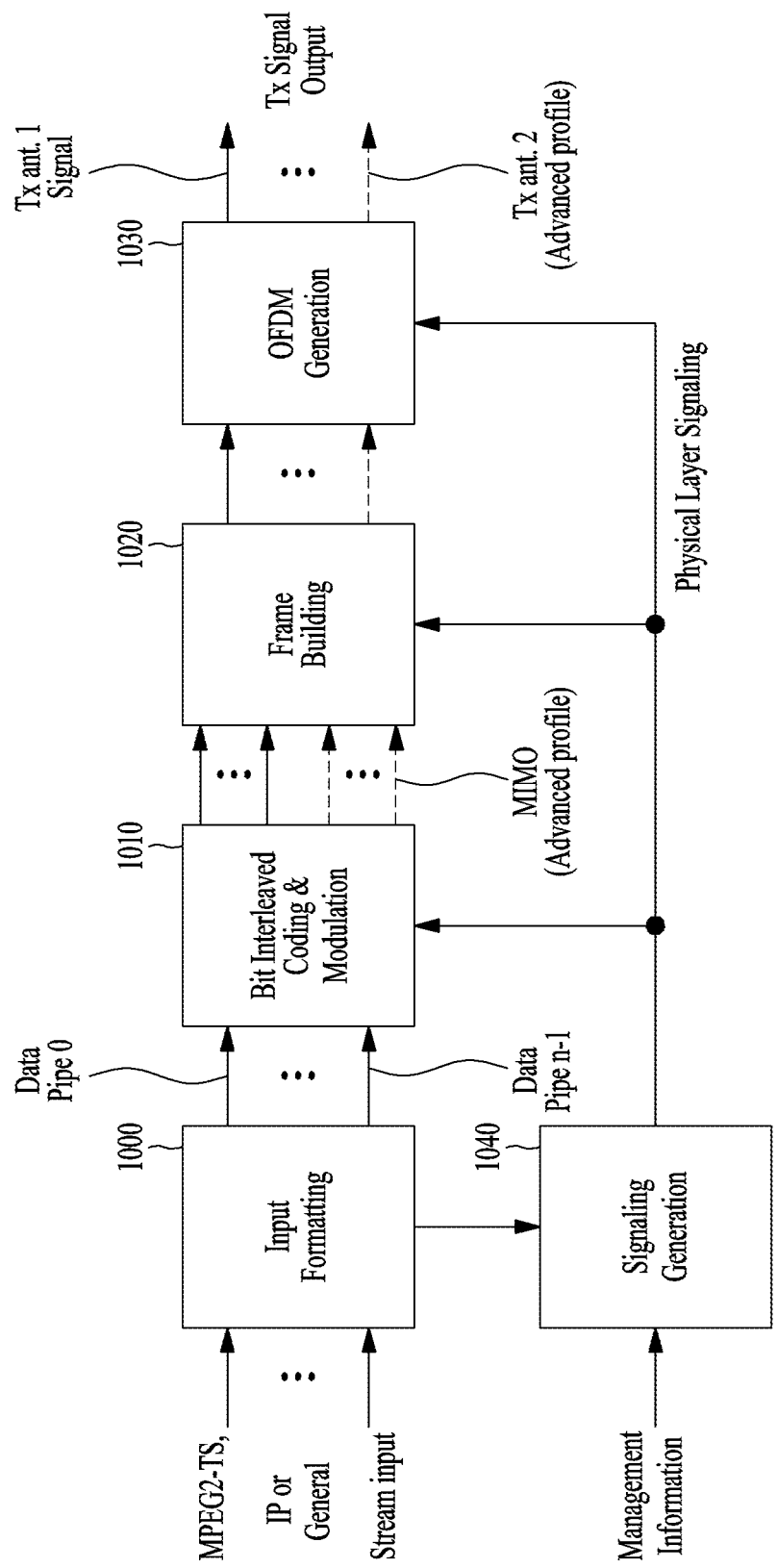
FIG. 1 illustrates a structure of an apparatus for transmitting broadcast signals for future broadcast services according to an embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas. The present invention may defines three physical layer (PL) profiles—base, handheld and advanced profiles—each optimized to minimize receiver complexity while attaining the performance required for a particular use case. The physical layer (PHY) profiles are subsets of all configurations that a corresponding receiver should implement.

The three PHY profiles share most of the functional blocks but differ slightly in specific blocks and/or parameters. Additional PHY profiles can be defined in the future. For the system evolution, future profiles can also be multiplexed with the existing profiles in a single RF channel through a future extension frame (FEF). The details of each PHY profile are described below.

1. Base Profile

The base profile represents a main use case for fixed receiving devices that are usually connected to a roof-top antenna. The base profile also includes portable devices that could be transported to a place but belong to a relatively stationary reception category. Use of the base profile could be extended to handheld devices or even vehicular by some improved implementations, but those use cases are not expected for the base profile receiver operation.

Target SNR range of reception is from approximately 10 to 20 dB, which includes the 15 dB SNR reception capability of the existing broadcast system (e.g. ATSC A/53). The receiver complexity and power consumption is not as critical as in the battery-operated handheld devices, which will use the handheld profile. Key system parameters for the base profile are listed in below table 1.

TABLE 1

| | |
|---|---|
| LDPC codeword length | 16K, 64K bits |
| Constellation size | 4~10 bpcu (bits per channel use) |
| Time de-interleaving memory size | ≤2^19 data cells |
| Pilot patterns | Pilot pattern for fixed reception |
| FFT size | 16K, 32K points |

2. Handheld Profile

The handheld profile is designed for use in handheld and vehicular devices that operate with battery power. The devices can be moving with pedestrian or vehicle speed. The power consumption as well as the receiver complexity is very important for the implementation of the devices of the handheld profile. The target SNR range of the handheld profile is approximately 0 to 10 dB, but can be configured to reach below 0 dB when intended for deeper indoor reception.

In addition to low SNR capability, resilience to the Doppler Effect caused by receiver mobility is the most important performance attribute of the handheld profile. Key system parameters for the handheld profile are listed in the below table 2.

TABLE 2

| | |
|---|---|
| LDPC codeword length | 16K bits |
| Constellation size | 2~8 bpcu |
| Time de-interleaving memory size | ≤2^18 data cells |
| Pilot patterns | Pilot patterns for mobile and indoor reception |
| FFT size | 8K, 16K points |

3. Advanced Profile

The advanced profile provides highest channel capacity at the cost of more implementation complexity. This profile requires using MIMO transmission and reception, and UHDTV service is a target use case for which this profile is specifically designed. The increased capacity can also be used to allow an increased number of services in a given bandwidth, e.g., multiple SDTV or HDTV services.

The target SNR range of the advanced profile is approximately 20 to 30 dB. MIMO transmission may initially use existing elliptically-polarized transmission equipment, with extension to full-power cross-polarized transmission in the future. Key system parameters for the advanced profile are listed in below table 3.

TABLE 3

| | |
|---|---|
| LDPC codeword length | 16K, 64K bits |
| Constellation size | 8~12 bpcu |
| Time de-interleaving memory size | ≤2^19 data cells |
| Pilot patterns | Pilot pattern for fixed reception |
| FFT size | 16K, 32K points |

In this case, the base profile can be used as a profile for both the terrestrial broadcast service and the mobile broadcast service. That is, the base profile can be used to define a concept of a profile which includes the mobile profile. Also, the advanced profile can be divided advanced profile for a base profile with MIMO and advanced profile for a handheld profile with MIMO. Moreover, the three profiles can be changed according to intention of the designer.

The following terms and definitions may apply to the present invention. The following terms and definitions can be changed according to design.

auxiliary stream: sequence of cells carrying data of as yet undefined modulation and coding, which may be used for future extensions or as required by broadcasters or network operators base data pipe: data pipe that carries service signaling data baseband frame (or BBFRAME): set of Kbch bits which form the input to one FEC encoding process (BCH and LDPC encoding)

cell: modulation value that is carried by one carrier of the OFDM transmission coded block: LDPC-encoded block of PLS1 data or one of the LDPC-encoded blocks of PLS2 data data pipe: logical channel in the physical layer that carries service data or related metadata, which may carry one or multiple service(s) or service component(s).

data pipe unit: a basic unit for allocating data cells to a DP in a frame.

data symbol: OFDM symbol in a frame which is not a preamble symbol (the frame signaling symbol and frame edge symbol is included in the data symbol)

DP_ID: this 8-bit field identifies uniquely a DP within the system identified by the SYSTEM_ID dummy cell: cell carrying a pseudo-random value used to fill the remaining capacity not used for PLS signaling, DPs or auxiliary streams emergency alert channel: part of a frame that carries EAS information data frame: physical layer time slot that starts with a preamble and ends with a frame edge symbol frame repetition unit: a set of frames belonging to same or different physical layer profile including a FEF, which is repeated eight times in a super-frame fast information channel: a logical channel in a frame that carries the mapping information between a service and the corresponding base DP FECBLOCK: set of LDPC-encoded bits of a DP data FFT size: nominal FFT size used for a particular mode, equal to the active symbol period Ts expressed in cycles of the elementary period T frame signaling symbol: OFDM symbol with higher pilot density used at the start of a frame in certain combinations of FFT size, guard interval and scattered pilot pattern, which carries a part of the PLS data frame edge symbol: OFDM symbol with higher pilot density used at the end of a frame in certain combinations of FFT size, guard interval and scattered pilot pattern frame-group: the set of all the frames having the same PHY profile type in a super-frame.

future extension frame: physical layer time slot within the super-frame that could be used for future extension, which starts with a preamble Futurecast UTB system: proposed physical layer broadcasting system, of which the input is one or more MPEG2-TS or IP or general stream(s) and of which the output is an RF signal input stream: A stream of data for an ensemble of services delivered to the end users by the system.

normal data symbol: data symbol excluding the frame signaling symbol and the frame edge symbol PHY profile: subset of all configurations that a corresponding receiver should implement PLS: physical layer signaling data consisting of PLS1 and PLS2

PLS1: a first set of PLS data carried in the FSS symbols having a fixed size, coding and modulation, which carries basic information about the system as well as the parameters needed to decode the PLS2

NOTE: PLS1 data remains constant for the duration of a frame-group.

PLS2: a second set of PLS data transmitted in the FSS symbol, which carries more detailed PLS data about the system and the DPs PLS2 dynamic data: PLS2 data that may dynamically change frame-by-frame PLS2 static data: PLS2 data that remains static for the duration of a frame-group preamble signaling data: signaling data carried by the preamble symbol and used to identify the basic mode of the system preamble symbol: fixed-length pilot symbol that carries basic PLS data and is located in the beginning of a frame NOTE: The preamble symbol is mainly used for fast initial band scan to detect the system signal, its timing, frequency offset, and FFT-size.

reserved for future use: not defined by the present document but may be defined in future super-frame: set of eight frame repetition units time interleaving block (TI block): set of cells within which time interleaving is carried out, corresponding to one use of the time interleaver memory TI group: unit over which dynamic capacity allocation for a particular DP is carried out, made up of an integer, dynamically varying number of XFECBLOCKs NOTE: The TI group may be mapped directly to one frame or may be mapped to multiple frames. It may contain one or more TI blocks.

Type 1 DP: DP of a frame where all DPs are mapped into the frame in TDM fashion

Type 2 DP: DP of a frame where all DPs are mapped into the frame in FDM fashion

XFECBLOCK: set of Ncells cells carrying all the bits of one LDPC FECBLOCK

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting block 1000, a BICM (Bit interleaved coding & modulation) block 1010, a frame building block 1020, an OFDM (Orthogonal Frequency Division Multiplexing) generation block 1030 and a signaling generation block 1040. A description will be given of the operation of each module of the apparatus for transmitting broadcast signals.

IP stream/packets and MPEG2-TS are the main input formats, other stream types are handled as General Streams. In addition to these data inputs, Management Information is input to control the scheduling and allocation of the corresponding bandwidth for each input stream. One or multiple TS stream(s), IP stream(s) and/or General Stream(s) inputs are simultaneously allowed.

The input formatting block 1000 can demultiplex each input stream into one or multiple data pipe(s), to each of which an independent coding and modulation is applied. The data pipe (DP) is the basic unit for robustness control, thereby affecting quality-of-service (QoS). One or multiple service(s) or service component(s) can be carried by a single DP. Details of operations of the input formatting block 1000 will be described later.

The data pipe is a logical channel in the physical layer that carries service data or related metadata, which may carry one or multiple service(s) or service component(s).

Also, the data pipe unit: a basic unit for allocating data cells to a DP in a frame.

In the BICM block 1010, parity data is added for error correction and the encoded bit streams are mapped to complex-value constellation symbols. The symbols are interleaved across a specific interleaving depth that is used for the corresponding DP. For the advanced profile, MIMO encoding is performed in the BICM block 1010 and the additional data path is added at the output for MIMO transmission. Details of operations of the BICM block 1010 will be described later.

The Frame Building block 1020 can map the data cells of the input DPs into the OFDM symbols within a frame. After mapping, the frequency interleaving is used for frequency-domain diversity, especially to combat frequency-selective fading channels. Details of operations of the Frame Building block 1020 will be described later.

After inserting a preamble at the beginning of each frame, the OFDM Generation block 1030 can apply conventional OFDM modulation having a cyclic prefix as guard interval. For antenna space diversity, a distributed MISO scheme is applied across the transmitters. In addition, a Peak-to-Average Power Reduction (PAPR) scheme is performed in the time domain. For flexible network planning, this proposal provides a set of various FFT sizes, guard interval lengths and corresponding pilot patterns. Details of operations of the OFDM Generation block 1030 will be described later.

The Signaling Generation block 1040 can create physical layer signaling information used for the operation of each functional block. This signaling information is also transmitted so that the services of interest are properly recovered at the receiver side. Details of operations of the Signaling Generation block 1040 will be described later.

Figure 2:
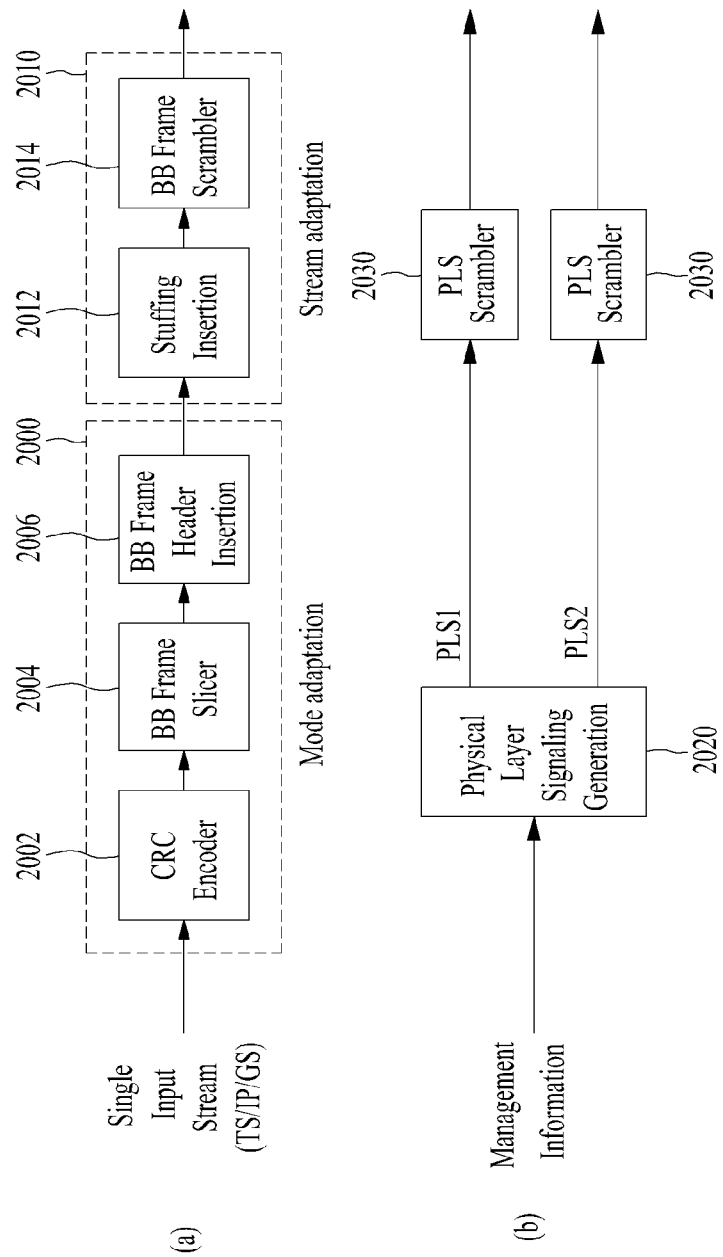
FIG. 2 illustrates an input formatting block according to one embodiment of the present invention.
Figure 3:
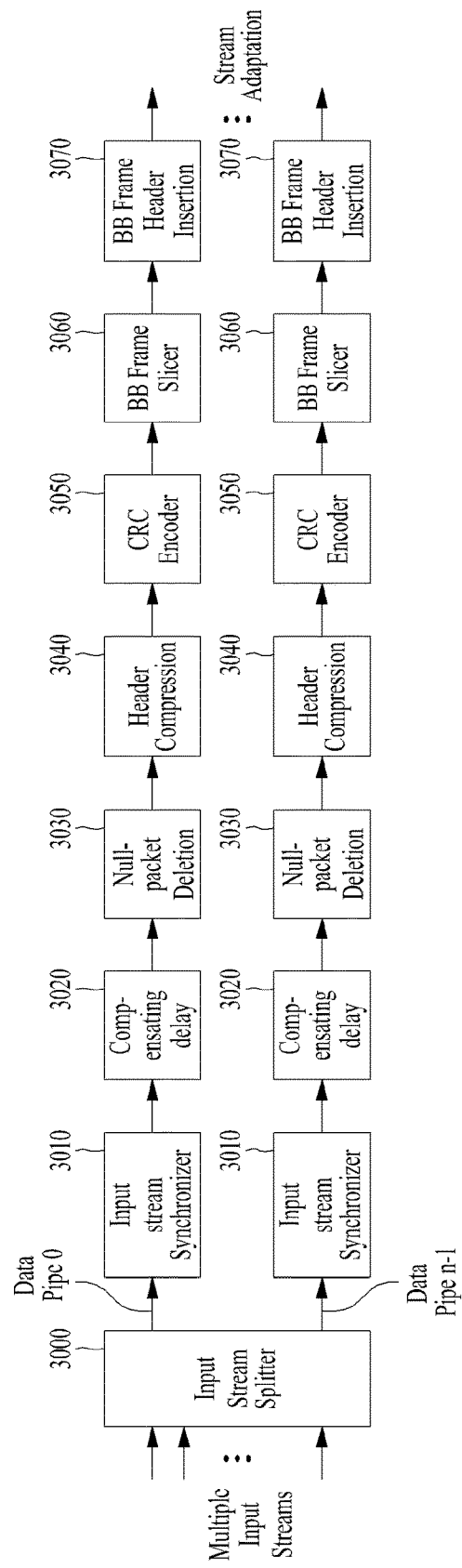
FIG. 3 illustrates an input formatting block according to another embodiment of the present invention.
Figure 4:
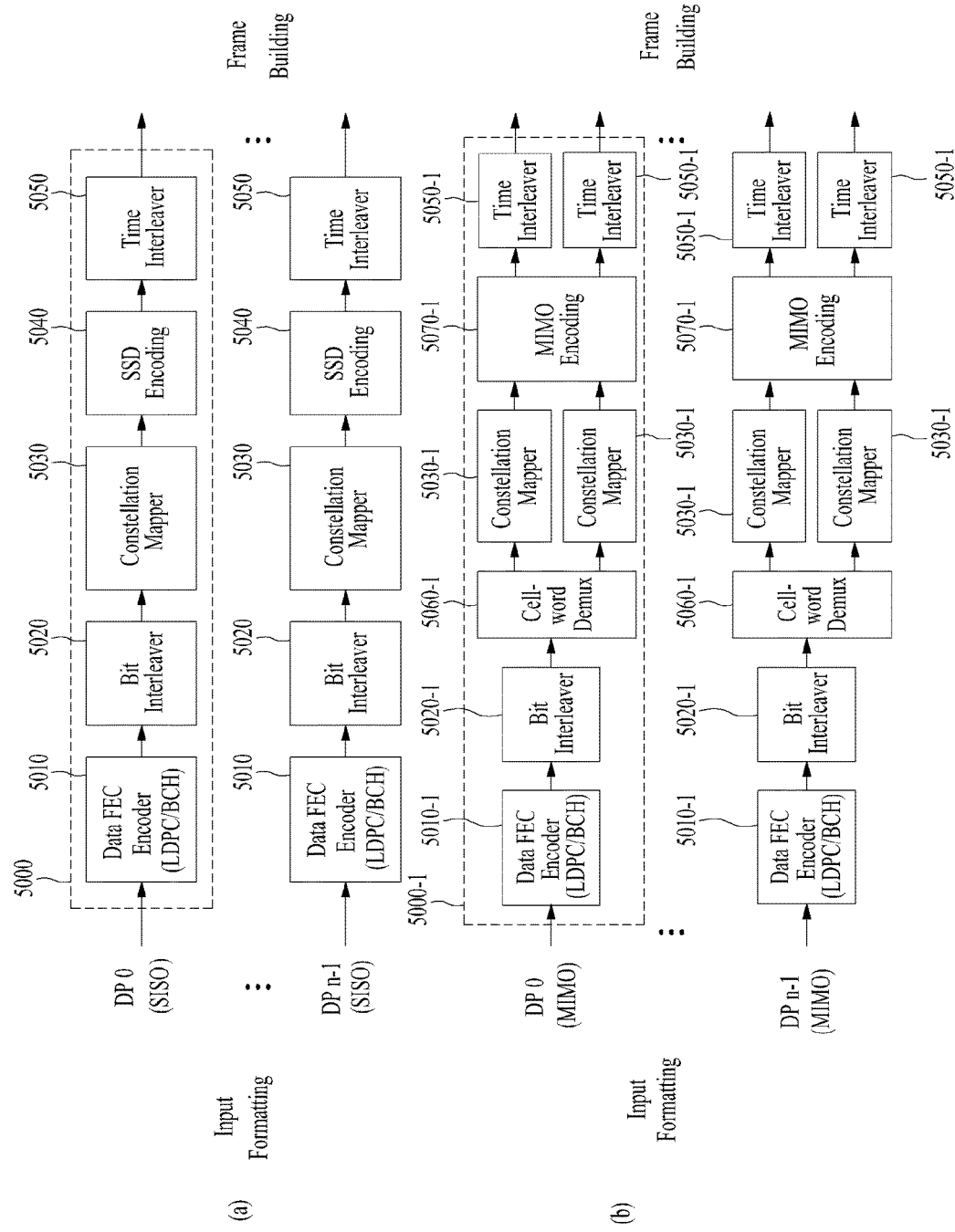
FIG. 4 illustrates a BICM block according to an embodiment of the present invention.

FIGS. 2, 3 and 4 illustrate the input formatting block 1000 according to embodiments of the present invention. A description will be given of each figure.

FIG. 2, including views (a) and (b), illustrates an input formatting block and a signaling generation block according to one embodiment of the present invention.

The input formatting block illustrated in FIG. 2(a) corresponds to an embodiment of the input formatting block 1000 described with reference to FIG. 1.

The input to the physical layer may be composed of one or multiple data streams. Each data stream is carried by one DP. The mode adaptation modules slice the incoming data stream into data fields of the baseband frame (BBF). The system supports three types of input data streams: a MPEG2-TS stream, an Internet protocol (IP) stream and a Generic stream (GS). The MPEG2-TS stream is characterized by fixed length (188 byte) packets with the first byte being a sync-byte (0x47). The IP stream is composed of variable length IP datagram packets, as signaled within IP packet headers. The system supports both IPv4 and IPv6 for the IP stream. The GS stream may be composed of variable length packets or constant length packets, signaled within encapsulation packet headers.

FIG. 2(a) shows a mode adaptation block 2000 and a stream adaptation block 2010 for signal DP, and FIG. 2(b) shows a physical layer signaling (PLS) generation block 2020 and PLS scramblers 2030 for generating and processing PLS data. A description will be given of the operation of each block.

The input TS, IP and GS streams are split into multiple service or service component (audio, video, etc.) streams. The mode adaptation block 2000 is comprised of a CRC Encoder 2002, a BB (baseband) Frame Slicer 2004, and a BB Frame Header Insertion block 2006.

The CRC Encoder 2002 provides three kinds of CRC encoding for error detection at the user packet (UP) level, i.e., CRC-8, CRC-16, and CRC-32. The computed CRC bytes are appended after the UP. CRC-8 is used for TS stream and CRC-32 for IP stream. If the GS stream doesn't provide the CRC encoding, the proposed CRC encoding should be applied.

The BB Frame Slicer 2004 maps the input into an internal logical-bit format. The first received bit is defined to be the MSB. The BB Frame Slicer 2004 allocates a number of input bits equal to the available data field capacity. To allocate a number of input bits equal to the BBF payload, the UP packet stream is sliced to fit the data field of BBF.

The BB Frame Header Insertion block 2006 can insert fixed length BBF header of 2 bytes is inserted in front of the BB Frame. The BBF header is composed of STUFFI (1 bit), SYNCD (13 bits), and RFU (2 bits). In addition to the fixed 2-Byte BBF header, BBF can have an extension field (1 or 3 bytes) at the end of the 2-byte BBF header.

The stream adaptation 2010 is comprised of a stuffing insertion block 2012 and a BB frame scrambler 2014. The stuffing insertion block 2012 can insert stuffing field into a payload of a BB frame. If the input data to the stream adaptation is sufficient to fill a BB-Frame, STUFFI is set to '0' and the BBF has no stuffing field. Otherwise STUFFI is set to '1' and the stuffing field is inserted immediately after the BBF header. The stuffing field comprises two bytes of the stuffing field header and a variable size of stuffing data.

The BB frame scrambler 2014 scrambles complete BBF for energy dispersal. The scrambling sequence is synchronous with the BBF. The scrambling sequence is generated by a feed-back shift register.

The signaling generation block illustrated in FIG. 2(*b*) corresponds to an embodiment of the signaling generation block 1040 described with reference to FIG. 1. The PLS generation block 2020 can generate physical layer signaling (PLS) data. The PLS provides the receiver with a means to access physical layer DPs. The PLS data consists of PLS1 data and PLS2 data.

The PLS1 data is a first set of PLS data carried in the FSS symbols in the frame having a fixed size, coding and modulation, which carries basic information about the system as well as the parameters needed to decode the PLS2 data. The PLS1 data provides basic transmission parameters including parameters required to enable the reception and decoding of the PLS2 data. Also, the PLS1 data remains constant for the duration of a frame-group.

The PLS2 data is a second set of PLS data transmitted in the FSS symbol, which carries more detailed PLS data about the system and the DPs. The PLS2 contains parameters that provide sufficient information for the receiver to decode the desired DP. The PLS2 signaling further consists of two types of parameters, PLS2 Static data (PLS2-STAT data) and PLS2 dynamic data (PLS2-DYN data). The PLS2 Static data is PLS2 data that remains static for the duration of a frame-group and the PLS2 dynamic data is PLS2 data that may dynamically change frame-by-frame.

Details of the PLS data will be described later.

The PLS scramblers 2030 can scramble the generated PLS data for energy dispersal.

The above-described blocks may be omitted or replaced by blocks having similar or identical functions.

FIG. 3 illustrates an input formatting block according to another embodiment of the present invention.

The input formatting block illustrated in FIG. 3 corresponds to an embodiment of the input formatting block 1000 described with reference to FIG. 1.

FIG. 3 shows a mode adaptation block of the input formatting block when the input signal corresponds to multiple input streams.

The mode adaptation block of the input formatting block for processing the multiple input streams can independently process the multiple input streams.

Referring to FIG. 3, the mode adaptation block for respectively processing the multiple input streams can include an input stream splitter 3000, an input stream synchronizer 3010, a compensating delay block 3020, a null packet deletion block 3030, a head compression block 3040, a CRC encoder 3050, a BB frame slicer 3060 and a BB header insertion block 3070. Description will be given of each block of the mode adaptation block.

Operations of the CRC encoder 3050, BB frame slicer 3060 and BB header insertion block 3070 correspond to those of the CRC encoder, BB frame slicer and BB header insertion block described with reference to FIG. 2 and thus description thereof is omitted.

The input stream splitter 3000 can split the input TS, IP, GS streams into multiple service or service component (audio, video, etc.) streams.

The input stream synchronizer 3010 may be referred as ISSY. The ISSY can provide suitable means to guarantee Constant Bit Rate (CBR) and constant end-to-end transmission delay for any input data format. The ISSY is always used for the case of multiple DPs carrying TS, and optionally used for multiple DPs carrying GS streams.

The compensating delay block 3020 can delay the split TS packet stream following the insertion of ISSY information to allow a TS packet recombining mechanism without requiring additional memory in the receiver.

The null packet deletion block 3030, is used only for the TS input stream case. Some TS input streams or split TS streams may have a large number of null-packets present in order to accommodate VBR (variable bit-rate) services in a CBR TS stream. In this case, in order to avoid unnecessary transmission overhead, null-packets can be identified and not transmitted. In the receiver, removed null-packets can be re-inserted in the exact place where they were originally by reference to a deleted null-packet (DNP) counter that is inserted in the transmission, thus guaranteeing constant bit-rate and avoiding the need for time-stamp (PCR) updating.

The head compression block 3040 can provide packet header compression to increase transmission efficiency for TS or IP input streams. Because the receiver can have a priori information on certain parts of the header, this known information can be deleted in the transmitter.

For Transport Stream, the receiver has a-priori information about the sync-byte configuration (0x47) and the packet length (188 Byte). If the input TS stream carries content that has only one PID, i.e., for only one service component (video, audio, etc.) or service sub-component (SVC base layer, SVC enhancement layer, MVC base view or MVC dependent views), TS packet header compression can be applied (optionally) to the Transport Stream. IP packet header compression is used optionally if the input steam is an IP stream. The above-described blocks may be omitted or replaced by blocks having similar or identical functions.

FIG. 4, including views (a) and (b), illustrates a BICM block according to an embodiment of the present invention The BICM block illustrated in FIG. 4 corresponds to an embodiment of the BICM block 1010 described with reference to FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the a BICM block according to an embodiment of the present invention can independently process DPs input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each DP.

FIG. 4(a) shows the BICM block shared by the base profile and the handheld profile, and FIG. 4(b) shows the BICM block of the advanced profile.

The BICM block shared by the base profile and the handheld profile and the BICM block of the advanced profile can include plural processing blocks for processing each DP.

A description will be given of each processing block of the BICM block for the base profile and the handheld profile and the BICM block for the advanced profile.

A processing block 5000 of the BICM block for the base profile and the handheld profile can include a Data FEC encoder 5010, a bit interleaver 5020, a constellation mapper 5030, an SSD (Signal Space Diversity) encoding block 5040 and a time interleaver 5050.

The Data FEC encoder 5010 can perform the FEC encoding on the input BBF to generate FECBLOCK procedure using outer coding (BCH), and inner coding (LDPC). The outer coding (BCH) is optional coding method. Details of operations of the Data FEC encoder 5010 will be described later.

The bit interleaver 5020 can interleave outputs of the Data FEC encoder 5010 to achieve optimized performance with combination of the LDPC codes and modulation scheme while providing an efficiently implementable structure. Details of operations of the bit interleaver 5020 will be described later.

The constellation mapper 5030 can modulate each cell word from the bit interleaver 5020 in the base and the handheld profiles, or cell word from a cell-word demultiplexer 5060-1 in the advanced profile using either QPSK, QAM-16, non-uniform QAM (NUQ-64, NUQ-256, NUQ-1024) or non-uniform constellation (NUC-16, NUC-64, NUC-256, NUC-1024) to give a power-normalized constellation point, el. This constellation mapping is applied only for DPs. Observe that QAM-16 and NUQs are square shaped, while NUCs have arbitrary shape. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in PLS2 data.

After the output of the constellation mapper 5030 is processed by the SSD encoding block 5040, the time interleaver 5050 can operate at the DP level. The parameters of time interleaving (TI) may be set differently for each DP. Details of operations of the time interleaver 5050 will be described later.

A processing block 5000-1 of the BICM block for the advanced profile can include a Data FEC encoder 5010-1, a bit interleaver 5020-1, constellation mappers 5030-1 and time interleavers 5050-1.

However, the processing block 5000-1 is distinguished from the processing block 5000 by further including the a cell-word demultiplexer 5060-1 and a MIMO encoding block 5070-1.

Also, the operations of the Data FEC encoder 5010-1, bit interleaver 5020-1, constellation mappers 5030-1, and time interleavers 5050-1 in the processing block 5000-1 correspond to those of the Data FEC encoder 5010, bit interleaver 5020, constellation mapper 5030, and time interleaver 5050 of the processing block 5000 described above, and thus description thereof is omitted.

The cell-word demultiplexer 5060-1 is used for the DP of the advanced profile to divide the single cell-word stream into dual cell-word streams for MIMO processing. Details of operations of the cell-word demultiplexer 5010-1 will be described later.

The MIMO encoding block 5070-1 is used to process the output of the cell-word demultiplexer 5060-1 using a MIMO encoding scheme. The MIMO encoding scheme was optimized for broadcasting signal transmission. The MIMO technology is a promising way to get a capacity increase but it depends on channel characteristics. Especially for broadcasting, the strong LOS component of the channel or a difference in the received signal power between two antennas caused by different signal propagation characteristics makes it difficult to get capacity gain from MIMO. The proposed MIMO encoding scheme overcomes this problem using a rotation-based pre-coding and phase randomization of one of the MIMO output signals.

MIMO encoding is intended for a 2×2 MIMO system requiring at least two antennas at both the transmitter and the receiver. Two MIMO encoding modes are defined in this proposal; full-rate spatial multiplexing (FR-SM) and full-rate full-diversity spatial multiplexing (FRFD-SM). The FR-SM encoding provides capacity increase with relatively small complexity increase at the receiver side while the FRFD-SM encoding provides capacity increase and additional diversity gain with a great complexity increase at the receiver side. The proposed MIMO encoding scheme has no restriction on the antenna polarity configuration.

MIMO processing is required for the advanced profile frame, which means all DPs in the advanced profile frame are processed by the MIMO encoder. MIMO processing is applied at DP level. Pairs of the Constellation Mapper outputs NUQ (e1,i and e2,i) are fed to the input of the MIMO Encoder. Paired MIMO Encoder output (g1,i and g2,i) is transmitted by the same carrier k and OFDM symbol 1 of their respective TX antennas.

The above-described blocks may be omitted or replaced by blocks having similar or identical functions.

Figure 5:
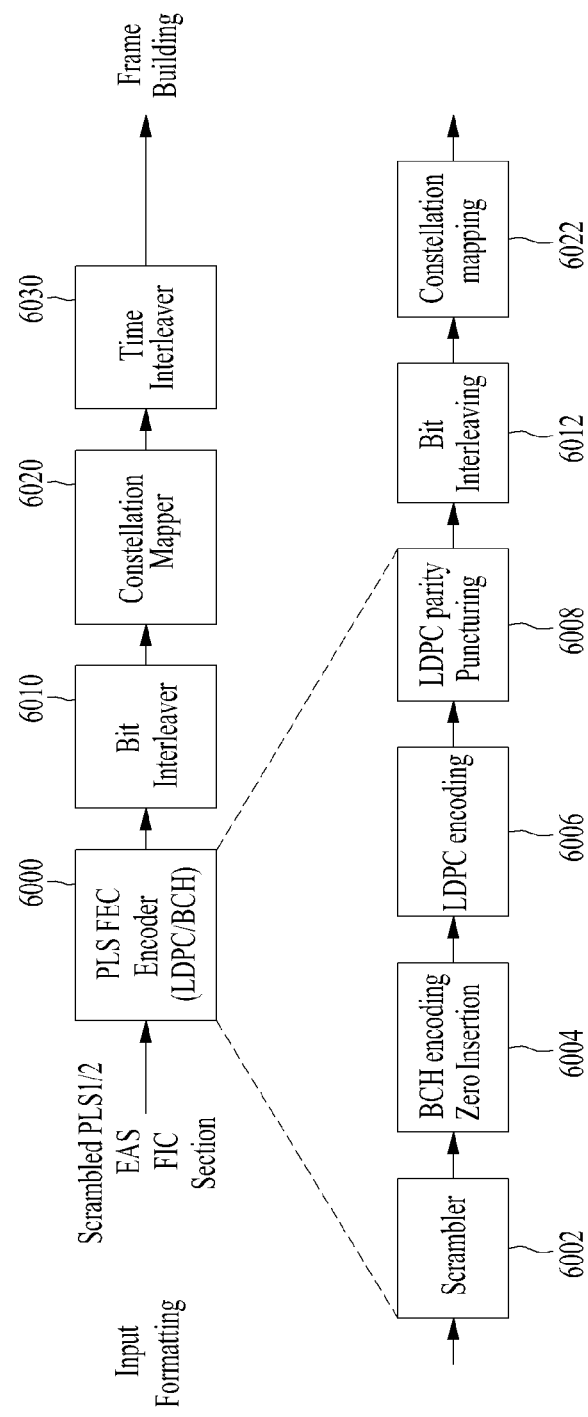
FIG. 5 illustrates a BICM block according to another embodiment of the present invention.

FIG. 5 illustrates a BICM block according to another embodiment of the present invention.

The BICM block illustrated in FIG. 6 corresponds to an embodiment of the BICM block 1010 described with reference to FIG. 1.

FIG. 5 illustrates a BICM block for protection of physical layer signaling (PLS), emergency alert channel (EAC) and fast information channel (FIC). EAC is a part of a frame that carries EAS information data and FIC is a logical channel in a frame that carries the mapping information between a service and the corresponding base DP. Details of the EAC and FIC will be described later.

Figure 6:
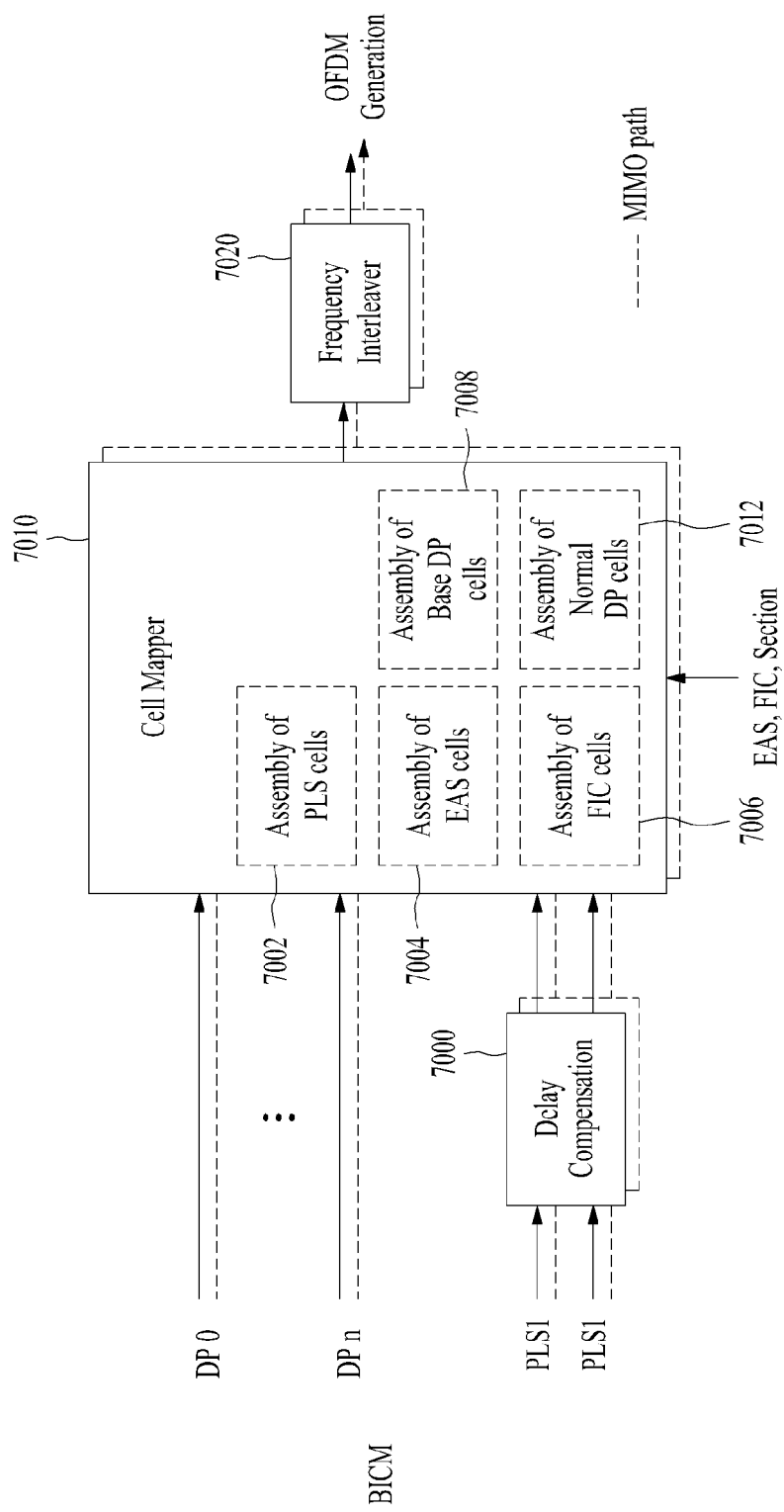
FIG. 6 illustrates a frame building block according to one embodiment of the present invention.

Referring to FIG. 6, the BICM block for protection of PLS, EAC and FIC can include a PLS FEC encoder 6000, a bit interleaver 6010 and a constellation mapper 6020.

Also, the PLS FEC encoder 6000 can include a scrambler 6002, a BCH encoding/zero insertion block 6005, an LDPC encoding block 6006 and an LDPC parity puncturing block. Bit interleaving 6012 and constellation mapping 6022 are then performed. Description will be given of each block of the BICM block.

The PLS FEC encoder 6000 can encode the scrambled PLS 1/2 data, EAC and FIC section.

The scrambler can scramble PLS1 data and PLS2 data before BCH encoding and shortened and punctured LDPC encoding.

The BCH encoding/zero insertion block can perform outer encoding on the scrambled PLS 1/2 data using the shortened BCH code for PLS protection and insert zero bits after the BCH encoding. For PLS1 data only, the output bits of the zero insertion may be permutted before LDPC encoding.

The LDPC encoding block can encode the output of the BCH encoding/zero insertion block using LDPC code. To generate a complete coded block, Cldpc, parity bits, Pldpc are encoded systematically from each zero-inserted PLS information block, Ildpc, and appended after it.

$$C_{ldpc}=[I_{ldpc}P_{ldpc}]=[i_0,i_1,\ldots,i_{K_{ldpc}-1},p_0,p_1,\ldots p_{N_{ldpc}-K_{ldpc}-1}]$$ [Equation 1]

The LDPC code parameters for PLS1 and PLS2 are as following table 4.

TABLE 4

| Signaling Type | Ksig | Kbch | Nbch_parity | Kldpc (=Nbch) | Nldpc | Nldpc_parity | code rate | Qldpc |
|---|---|---|---|---|---|---|---|---|
| PLS1 | 342 | 1020 | 60 | 1080 | 4320 | 3240 | 1/4 | 36 |
| PLS2 | <1021 | | | | | | | |
| | >1020 | 2100 | | 2160 | 7200 | 5040 | 3/10 | 56 |

The LDPC parity puncturing block can perform puncturing on the PLS1 data and PLS 2 data When shortening is applied to the PLS1 data protection, some LDPC parity bits are punctured after LDPC encoding. Also, for the PLS2 data protection, the LDPC parity bits of PLS2 are punctured after LDPC encoding. These punctured bits are not transmitted.

The bit interleaver 6010 can interleave the each shortened and punctured PLS1 data and PLS2 data.

The constellation mapper 6020 can map the bit interleaved PLS1 data and PLS2 data onto constellations.

The above-described blocks may be omitted or replaced by blocks having similar or identical functions.

FIG. 6 illustrates a frame building block according to one embodiment of the present invention.

The frame building block illustrated in FIG. 6 corresponds to an embodiment of the frame building block 1020 described with reference to FIG. 1.

Referring to FIG. 6, the frame building block can include a delay compensation block 7000, a cell mapper 7010 and a frequency interleaver 7020. Description will be given of each block of the frame building block.

The delay compensation block 7000 can adjust the timing between the data pipes and the corresponding PLS data to ensure that they are co-timed at the transmitter end. The PLS data is delayed by the same amount as data pipes are by addressing the delays of data pipes caused by the Input Formatting block and BICM block. The delay of the BICM block is mainly due to the time interleaver 5050. In-band signaling data carries information of the next TI group so that they are carried one frame ahead of the DPs to be signaled. The Delay Compensating block delays in-band signaling data accordingly.

The cell mapper 7010 includes an assembly of PLS cells 7002, an assembly of EAS cells 7004, an assembly of FIC cells 7006, an assembly of Base DP cells 7008, and an assembly of Normal DP cells 7012, and thus can map PLS, EAC, FIC, DPs, auxiliary streams and dummy cells into the active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. Service signaling data (such as PSI (program specific information)/SI) can be separately gathered and sent by a data pipe. The cell mapper 7010 operates according to the dynamic information produced by the scheduler and the configuration of the frame structure. Details of the frame will be described later.

The frequency interleaver 7020 can randomly interleave data cells received from the cell mapper 7010 to provide frequency diversity. Also, the frequency interleaver 7020 can operate on very OFDM symbol pair comprised of two sequential OFDM symbols using a different interleaving-seed order to get maximum interleaving gain in a single frame.

The above-described blocks may be omitted or replaced by blocks having similar or identical functions.

Figure 7:
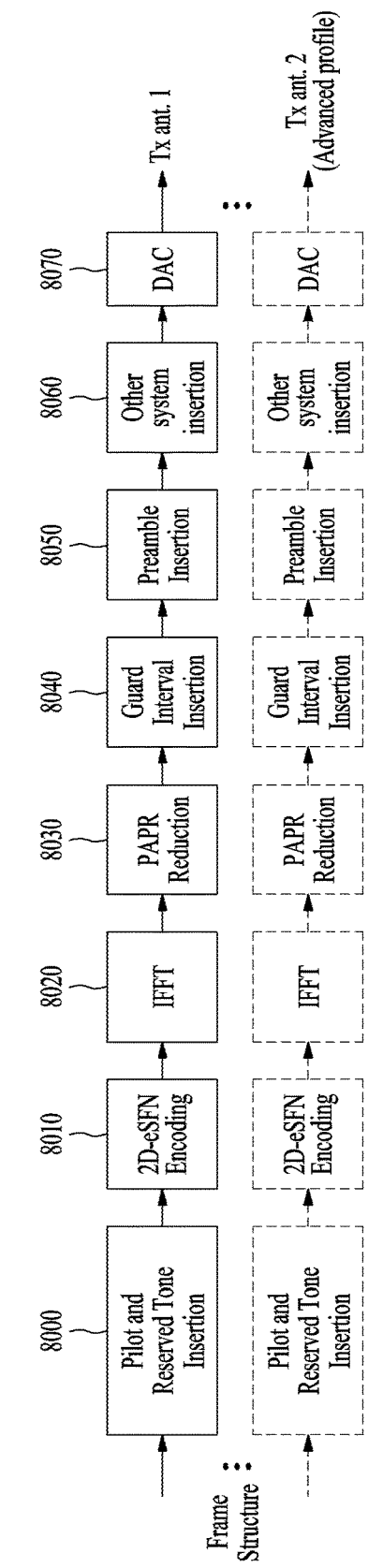
FIG. 7 illustrates an OFDM generation block according to an embodiment of the present invention.

FIG. 7 illustrates an OFDM generation block according to an embodiment of the present invention.

The OFDM generation block illustrated in FIG. 7 corresponds to an embodiment of the OFDM generation block 1030 described with reference to FIG. 1.

The OFDM generation block modulates the OFDM carriers by the cells produced by the Frame Building block, inserts the pilots, and produces the time domain signal for transmission. Also, this block subsequently inserts guard intervals, and applies PAPR (Peak-to-Average Power Radio) reduction processing to produce the final RF signal.

Referring to FIG. 7, the OFDM generation block can include a pilot and reserved tone insertion block 8000, a 2D-eSFN encoding block 8010, an IFFT (Inverse Fast Fourier Transform) block 8020, a PAPR reduction block 8030, a guard interval insertion block 8040, a preamble insertion block 8050, other system insertion block 8060 and a DAC block 8070.

The other system insertion block 8060 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc.

Figure 8:
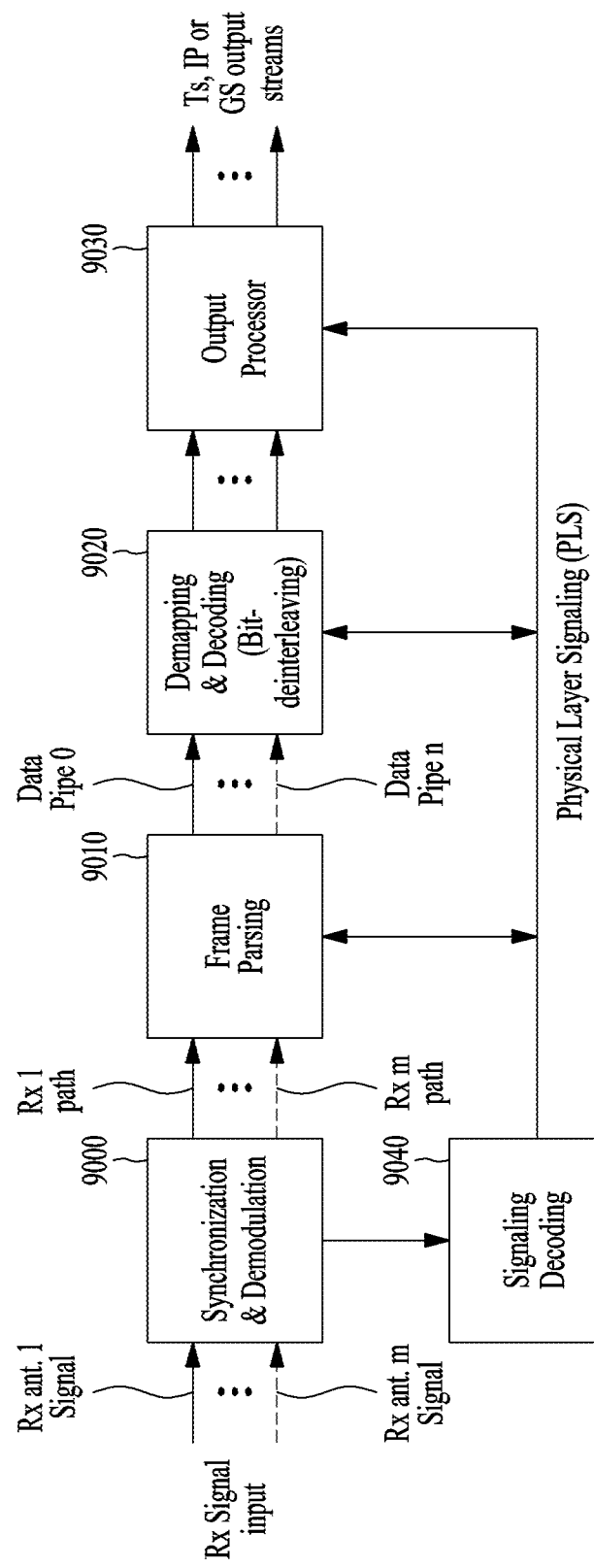
FIG. 8 illustrates a structure of an apparatus for receiving broadcast signals for future broadcast services according to an embodiment of the present invention.

FIG. 8 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1.

The apparatus for receiving broadcast signals for future broadcast services according to an embodiment of the present invention can include a synchronization & demodulation module 9000, a frame parsing module 9010, a demapping & decoding module 9020, an output processor 9030 and a signaling decoding module 9040. A description will be given of operation of each module of the apparatus for receiving broadcast signals.

The synchronization & demodulation module 9000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 9010 can parse input signal frames and extract data through which a service selected by a user is transmitted. If the apparatus for transmitting broadcast signals performs interleaving, the frame parsing module 9010 can carry out deinterleaving corresponding to a reverse procedure of interleaving. In this case, the positions of a signal and data that need to be extracted can be obtained by decoding data output from the signaling decoding module 9040 to restore scheduling information generated by the apparatus for transmitting broadcast signals.

The demapping & decoding module 9020 can convert the input signals into bit domain data and then deinterleave the same as necessary. The demapping & decoding module 9020 can perform demapping for mapping applied for transmission efficiency and correct an error generated on a transmission channel through decoding. In this case, the demapping & decoding module 9020 can obtain transmission parameters necessary for demapping and decoding by decoding the data output from the signaling decoding module 9040.

The output processor 9030 can perform reverse procedures of various compression/signal processing procedures which are applied by the apparatus for transmitting broadcast signals to improve transmission efficiency. In this case, the output processor 9030 can acquire necessary control information from data output from the signaling decoding module 9040. The output of the output processor 8300 corresponds to a signal input to the apparatus for transmitting broadcast signals and may be MPEG-TSs, IP streams (v4 or v6) and generic streams.

The signaling decoding module 9040 can obtain PLS information from the signal demodulated by the synchronization & demodulation module 9000. As described above, the frame parsing module 9010, demapping & decoding module 9020 and output processor 9030 can execute functions thereof using the data output from the signaling decoding module 9040.

Figure 9:
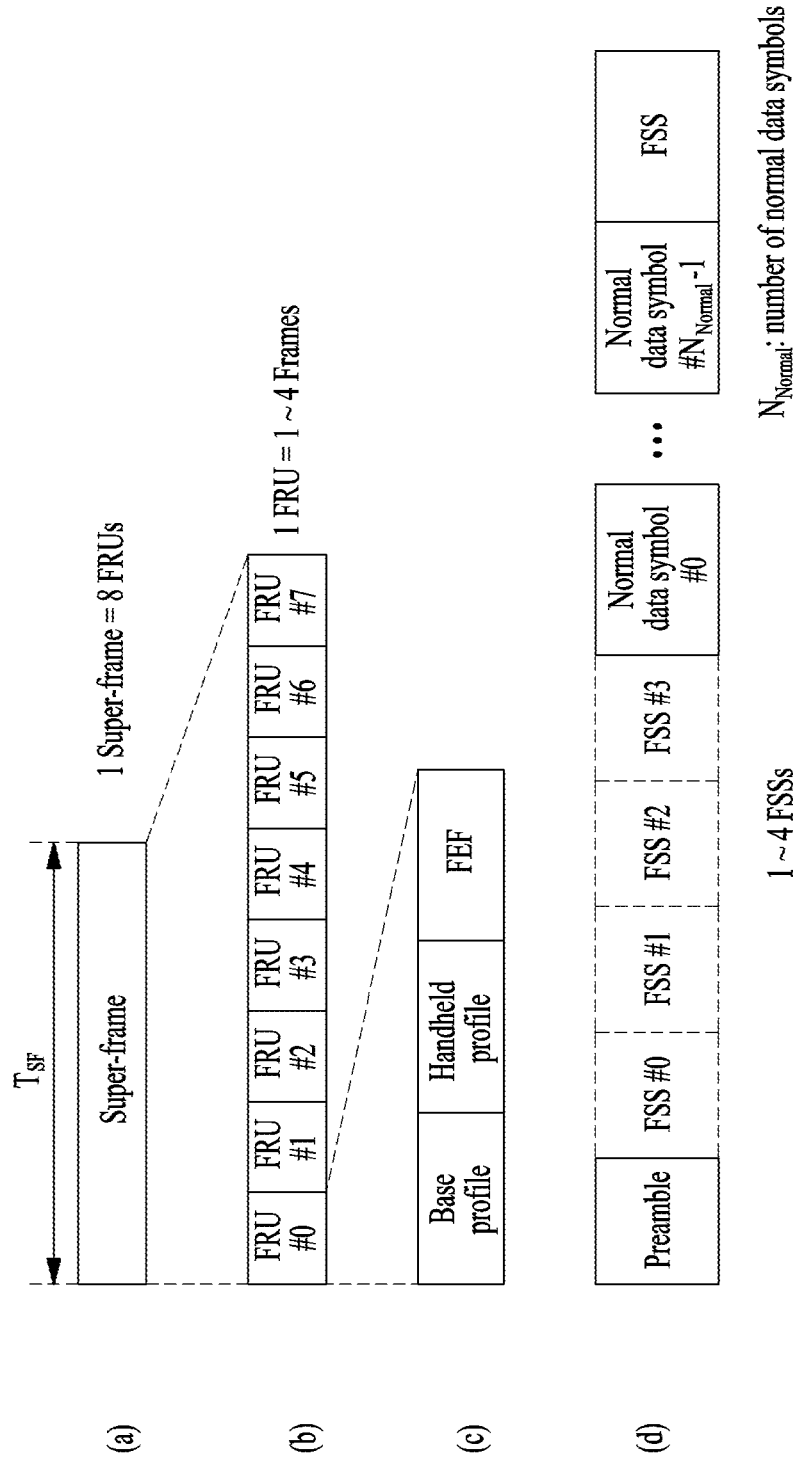
FIG. 9 illustrates a frame structure according to an embodiment of the present invention.

FIG. 9 illustrates a frame structure according to an embodiment of the present invention.

FIG. 9 shows an example configuration of the frame types and FRUs in a super-frame. (a) shows a super frame according to an embodiment of the present invention, (b) shows FRU (Frame Repetition Unit) according to an embodiment of the present invention, (c) shows frames of variable PHY profiles in the FRU and (d) shows a structure of a frame.

A super-frame may be composed of eight FRUs. The FRU is a basic multiplexing unit for TDM of the frames, and is repeated eight times in a super-frame.

Each frame in the FRU belongs to one of the PHY profiles, (base, handheld, advanced) or FEF. The maximum allowed number of the frames in the FRU is four and a given PHY profile can appear any number of times from zero times to four times in the FRU (e.g., base, base, handheld, advanced). PHY profile definitions can be extended using reserved values of the PHY_PROFILE in the preamble, if required.

The FEF part is inserted at the end of the FRU, if included. When the FEF is included in the FRU, the minimum number of FEFs is 8 in a super-frame. It is not recommended that FEF parts be adjacent to each other.

One frame is further divided into a number of OFDM symbols and a preamble. As shown in (d), the frame comprises a preamble, one or more frame signaling symbols (FSS), normal data symbols and a frame edge symbol (FES).

The preamble is a special symbol that enables fast Futurecast UTB system signal detection and provides a set of basic transmission parameters for efficient transmission and reception of the signal. The detailed description of the preamble will be will be described later.

The main purpose of the FSS(s) is to carry the PLS data. For fast synchronization and channel estimation, and hence fast decoding of PLS data, the FSS has more dense pilot pattern than the normal data symbol. The FES has exactly the same pilots as the FSS, which enables frequency-only interpolation within the FES and temporal interpolation, without extrapolation, for symbols immediately preceding the FES.

Figures 10, 11:
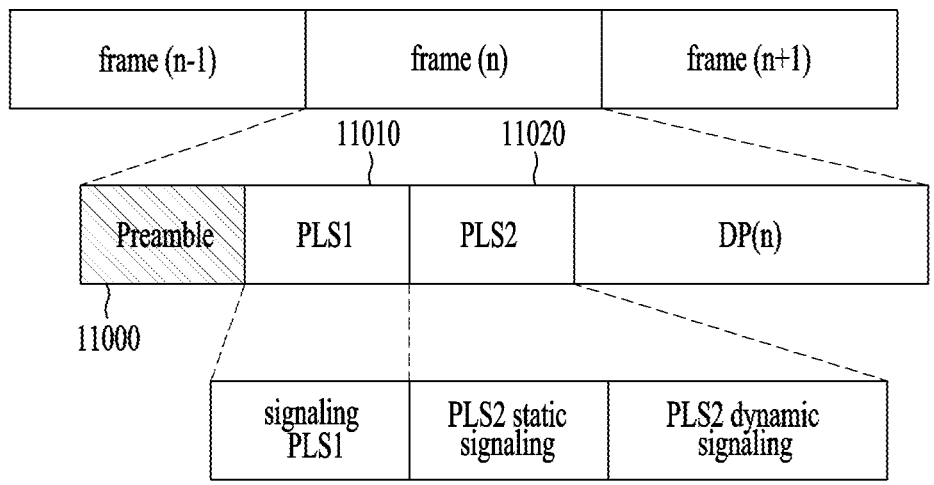
FIG. 10 illustrates a signaling hierarchy structure of the frame according to an embodiment of the present invention.
FIG. 11 illustrates preamble signaling data according to an embodiment of the present invention.

FIG. 10 illustrates a signaling hierarchy structure of the frame according to an embodiment of the present invention.

FIG. 10 illustrates the signaling hierarchy structure, which is split into three main parts: the preamble signaling data 11000, the PLS1 data 11010 and the PLS2 data 11020. The purpose of the preamble, which is carried by the preamble symbol in every frame, is to indicate the transmission type and basic transmission parameters of that frame. The PLS1 enables the receiver to access and decode the PLS2 data, which contains the parameters to access the DP of interest. The PLS2 is carried in every frame and split into two main parts: PLS2-STAT data and PLS2-DYN data. The static and dynamic portion of PLS2 data is followed by padding, if necessary.

FIG. 11 illustrates preamble signaling data according to an embodiment of the present invention.

Preamble signaling data carries 21 bits of information that are needed to enable the receiver to access PLS data and trace DPs within the frame structure. Details of the preamble signaling data are as follows:

PHY_PROFILE: This 3-bit field indicates the PHY profile type of the current frame. The mapping of different PHY profile types is given in below table 5.

TABLE 5

| Value | PHY profile |
| --- | --- |
| 000 | Base profile |
| 001 | Handheld profile |
| 010 | Advanced profiled |
| 011~110 | Reserved |
| 111 | FEF |

FFT_SIZE: This 2 bit field indicates the FFT size of the current frame within a frame-group, as described in below table 6.

TABLE 6

| Value | FFT size |
|---|---|
| 00 | 8K FFT |
| 01 | 16K FFT |
| 10 | 32K FFT |
| 11 | Reserved |

GI_FRACTION: This 3 bit field indicates the guard interval fraction value in the current super-frame, as described in below table 7.

TABLE 7

| Value | GI_FRACTION |
|---|---|
| 000 | 1/5 |
| 001 | 1/10 |
| 010 | 1/20 |
| 011 | 1/40 |
| 100 | 1/80 |
| 101 | 1/160 |
| 110~111 | Reserved |

EAC_FLAG: This 1 bit field indicates whether the EAC is provided in the current frame. If this field is set to '1', emergency alert service (EAS) is provided in the current frame. If this field set to '0', EAS is not carried in the current frame. This field can be switched dynamically within a super-frame.

PILOT_MODE: This 1-bit field indicates whether the pilot mode is mobile mode or fixed mode for the current frame in the current frame-group. If this field is set to '0', mobile pilot mode is used. If the field is set to '1', the fixed pilot mode is used.

PAPR_FLAG: This 1-bit field indicates whether PAPR reduction is used for the current frame in the current frame-group. If this field is set to value '1', tone reservation is used for PAPR reduction. If this field is set to '0', PAPR reduction is not used.

FRU_CONFIGURE: This 3-bit field indicates the PHY profile type configurations of the frame repetition units (FRU) that are present in the current super-frame. All profile types conveyed in the current super-frame are identified in this field in all preambles in the current super-frame. The 3-bit field has a different definition for each profile, as show in below table 8.

TABLE 8

| | Current PHY_PRO-FILE = '000' (base) | Current PHY_PRO-FILE = '001' (handheld) | Current PHY_PRO-FILE = '010' (advanced) | Current PHY_PRO-FILE = '111' (FEF) |
|---|---|---|---|---|
| FRU_CON-FIGURE = 000 | Only base profile present | Only handheld profile present | Only advanced profile present | Only FEF present |
| FRU_CON-FIGURE = 1XX | Handheld profile present | Base profile present | Base profile present | Base profile present |
| FRU_CON-FIGURE = X1X | Advanced profile present | Advanced profile present | Handheld profile present | Handheld profile present |

TABLE 8-continued

| | Current PHY_PRO-FILE = '000' (base) | Current PHY_PRO-FILE = '001' (handheld) | Current PHY_PRO-FILE = '010' (advanced) | Current PHY_PRO-FILE = '111' (FEF) |
|---|---|---|---|---|
| FRU_CON-FIGURE = XX1 | FEF present | FEF present | FEF present | Advanced profile present |

RESERVED: This 7-bit field is reserved for future use.

FIG. 12 illustrates PLS1 data according to an embodiment of the present invention.

PLS1 data provides basic transmission parameters including parameters required to enable the reception and decoding of the PLS2. As above mentioned, the PLS1 data remain unchanged for the entire duration of one frame-group. The detailed definition of the signaling fields of the PLS1 data are as follows:

PREAMBLE_DATA: This 20-bit field is a copy of the preamble signaling data excluding the EAC_FLAG.

NUM_FRAME_FRU: This 2-bit field indicates the number of the frames per FRU.

PAYLOAD_TYPE: This 3-bit field indicates the format of the payload data carried in the frame-group. PAYLOAD_TYPE is signaled as shown in table 9.

TABLE 9

| value | Payload type |
|---|---|
| 1XX | TS stream is transmitted |
| X1X | IP stream is transmitted |
| XX1 | GS stream is transmitted |

NUM_FSS: This 2-bit field indicates the number of FSS symbols in the current frame.

SYSTEM_VERSION: This 8-bit field indicates the version of the transmitted signal format. The SYSTEM_VERSION is divided into two 4-bit fields, which are a major version and a minor version.

Major version: The MSB four bits of SYSTEM_VERSION field indicate major version information. A change in the major version field indicates a non-backward-compatible change. The default value is '0000'. For the version described in this standard, the value is set to '0000'.

Minor version: The LSB four bits of SYSTEM_VERSION field indicate minor version information. A change in the minor version field is backward-compatible.

CELL_ID: This is a 16-bit field which uniquely identifies a geographic cell in an ATSC network. An ATSC cell coverage area may consist of one or more frequencies, depending on the number of frequencies used per Futurecast UTB system. If the value of the CELL_ID is not known or unspecified, this field is set to '0'.

NETWORK_ID: This is a 16-bit field which uniquely identifies the current ATSC network.

SYSTEM_ID: This 16-bit field uniquely identifies the Futurecast UTB system within the ATSC network. The Futurecast UTB system is the terrestrial broadcast system whose input is one or more input streams (TS, IP, GS) and whose output is an RF signal. The Futurecast UTB system carries one or more PHY profiles and FEF, if any. The same Futurecast UTB system may carry different input streams and use different RF frequencies in different geographical areas, allowing local service insertion. The frame structure and scheduling is controlled in one place and is identical for all transmissions within a Futurecast UTB system. One or more Futurecast UTB systems may have the same SYSTEM_ID meaning that they all have the same physical layer structure and configuration.

The following loop consists of FRU_PHY_PROFILE, FRU_FRAME_LENGTH, FRU_GI_FRACTION, and RESERVED which are used to indicate the FRU configuration and the length of each frame type. The loop size is fixed so that four PHY profiles (including a FEF) are signaled within the FRU. If NUM_FRAME_FRU is less than 4, the unused fields are filled with zeros.

FRU_PHY_PROFILE: This 3-bit field indicates the PHY profile type of the (i+1)th (i is the loop index) frame of the associated FRU. This field uses the same signaling format as shown in the table 8.

FRU_FRAME_LENGTH: This 2-bit field indicates the length of the (i+1)th frame of the associated FRU. Using FRU_FRAME_LENGTH together with FRU_GI_FRACTION, the exact value of the frame duration can be obtained.

FRU_GI_FRACTION: This 3-bit field indicates the guard interval fraction value of the (i+1)th frame of the associated FRU. FRU_GI_FRACTION is signaled according to the table 7.

RESERVED: This 4-bit field is reserved for future use.

The following fields provide parameters for decoding the PLS2 data.

PLS2_FEC_TYPE: This 2-bit field indicates the FEC type used by the PLS2 protection. The FEC type is signaled according to table 10. The details of the LDPC codes will be described later.

TABLE 10

| Content | PLS2 FEC type |
| --- | --- |
| 00 | 4K-1/4 and 7K-3/10 LDPC codes |
| 01~11 | Reserved |

PLS2_MOD: This 3-bit field indicates the modulation type used by the PLS2. The modulation type is signaled according to table 11.

TABLE 11

| Value | PLS2_MODE |
| --- | --- |
| 000 | BPSK |
| 001 | QPSK |
| 010 | QAM-16 |
| 011 | NUQ-64 |
| 100~111 | Reserved |

PLS2_SIZE_CELL: This 15-bit field indicates Ctotal_partial_block, the size (specified as the number of QAM cells) of the collection of full coded blocks for PLS2 that is carried in the current frame-group. This value is constant during the entire duration of the current frame-group.

PLS2_STAT_SIZE_BIT: This 14-bit field indicates the size, in bits, of the PLS2-STAT for the current frame-group. This value is constant during the entire duration of the current frame-group.

PLS2_DYN_SIZE_BIT: This 14-bit field indicates the size, in bits, of the PLS2-DYN for the current frame-group. This value is constant during the entire duration of the current frame-group.

PLS2_REP_FLAG: This 1-bit flag indicates whether the PLS2 repetition mode is used in the current frame-group. When this field is set to value '1', the PLS2 repetition mode is activated. When this field is set to value '0', the PLS2 repetition mode is deactivated.

PLS2_REP_SIZE_CELL: This 15-bit field indicates Ctotal_partial_block, the size (specified as the number of QAM cells) of the collection of partial coded blocks for PLS2 carried in every frame of the current frame-group, when PLS2 repetition is used. If repetition is not used, the value of this field is equal to 0. This value is constant during the entire duration of the current frame-group.

PLS2_NEXT_FEC_TYPE: This 2-bit field indicates the FEC type used for PLS2 that is carried in every frame of the next frame-group. The FEC type is signaled according to the table 10.

PLS2_NEXT_MOD: This 3-bit field indicates the modulation type used for PLS2 that is carried in every frame of the next frame-group. The modulation type is signaled according to the table 11.

PLS2_NEXT_REP_FLAG: This 1-bit flag indicates whether the PLS2 repetition mode is used in the next frame-group. When this field is set to value '1', the PLS2 repetition mode is activated. When this field is set to value '0', the PLS2 repetition mode is deactivated.

PLS2_NEXT_REP_SIZE_CELL: This 15-bit field indicates Ctotal_full_block, The size (specified as the number of QAM cells) of the collection of full coded blocks for PLS2 that is carried in every frame of the next frame-group, when PLS2 repetition is used. If repetition is not used in the next frame-group, the value of this field is equal to 0. This value is constant during the entire duration of the current frame-group.

PLS2_NEXT_REP_STAT_SIZE_BIT: This 14-bit field indicates the size, in bits, of the PLS2-STAT for the next frame-group. This value is constant in the current frame-group.

PLS2_NEXT_REP_DYN_SIZE_BIT: This 14-bit field indicates the size, in bits, of the PLS2-DYN for the next frame-group. This value is constant in the current frame-group.

PLS2_AP_MODE: This 2-bit field indicates whether additional parity is provided for PLS2 in the current frame-group. This value is constant during the entire duration of the current frame-group. The below table 12 gives the values of this field. When this field is set to '00', additional parity is not used for the PLS2 in the current frame-group.

TABLE 12

| Value | PLS2-AP mode |
| --- | --- |
| 00 | AP is not provided |
| 01 | AP1 mode |
| 10~11 | Reserved |

PLS2_AP_SIZE_CELL: This 15-bit field indicates the size (specified as the number of QAM cells) of the additional parity bits of the PLS2. This value is constant during the entire duration of the current frame-group.

PLS2_NEXT_AP_MODE: This 2-bit field indicates whether additional parity is provided for PLS2 signaling in every frame of next frame-group. This value is constant during the entire duration of the current frame-group. The table 12 defines the values of this field PLS2_NEXT_AP_SIZE_CELL: This 15-bit field indicates the size (specified as the number of QAM cells) of the additional parity bits of the PLS2 in every frame of the next frame-group. This value is constant during the entire duration of the current frame-group.

RESERVED: This 32-bit field is reserved for future use.

CRC_32: A 32-bit error detection code, which is applied to the entire PLS1 signaling.

FIG. 13 illustrates PLS2 data according to an embodiment of the present invention.

FIG. 13 illustrates PLS2-STAT data of the PLS2 data. The PLS2-STAT data are the same within a frame-group, while the PLS2-DYN data provide information that is specific for the current frame.

The details of fields of the PLS2-STAT data are as follows:

FIC_FLAG: This 1-bit field indicates whether the FIC is used in the current frame-group. If this field is set to '1', the FIC is provided in the current frame. If this field set to '0', the FIC is not carried in the current frame. This value is constant during the entire duration of the current frame-group.

AUX_FLAG: This 1-bit field indicates whether the auxiliary stream(s) is used in the current frame-group. If this field is set to '1', the auxiliary stream is provided in the current frame. If this field set to '0', the auxiliary stream is not carried in the current frame. This value is constant during the entire duration of current frame-group.

NUM_DP: This 6-bit field indicates the number of DPs carried within the current frame. The value of this field ranges from 1 to 64, and the number of DPs is NUM_DP+1.

DP_ID: This 6-bit field identifies uniquely a DP within a PHY profile.

DP_TYPE: This 3-bit field indicates the type of the DP. This is signaled according to the below table 13.

TABLE 13

| Value | DP Type |
| --- | --- |
| 000 | DP Type 1 |
| 001 | DP Type 2 |
| 010~111 | reserved |

DP_GROUP_ID: This 8-bit field identifies the DP group with which the current DP is associated. This can be used by a receiver to access the DPs of the service components associated with a particular service, which will have the same DP_GROUP_ID.

BASE_DP_ID: This 6-bit field indicates the DP carrying service signaling data (such as PSI/SI) used in the Management layer. The DP indicated by BASE_DP_ID may be either a normal DP carrying the service signaling data along with the service data or a dedicated DP carrying only the service signaling data DP_FEC_TYPE: This 2-bit field indicates the FEC type used by the associated DP. The FEC type is signaled according to the below table 14.

TABLE 14

| Value | FEC_TYPE |
| --- | --- |
| 00 | 16K LDPC |
| 01 | 64K LDPC |
| 10~11 | Reserved |

DP_COD: This 4-bit field indicates the code rate used by the associated DP. The code rate is signaled according to the below table 15.

TABLE 15

| Value | Code rate |
| --- | --- |
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001~1111 | Reserved |

DP_MOD: This 4-bit field indicates the modulation used by the associated DP. The modulation is signaled according to the below table 16.

TABLE 16

| Value | Modulation |
| --- | --- |
| 0000 | QPSK |
| 0001 | QAM-16 |
| 0010 | NUQ-64 |
| 0011 | NUQ-256 |
| 0100 | NUQ-1024 |
| 0101 | NUC-16 |
| 0110 | NUC-64 |
| 0111 | NUC-256 |
| 1000 | NUC-1024 |
| 1001~1111 | reserved |

DP_SSD_FLAG: This 1-bit field indicates whether the SSD mode is used in the associated DP. If this field is set to value '1', SSD is used. If this field is set to value '0', SSD is not used.

The following field appears only if PHY_PROFILE is equal to '010', which indicates the advanced profile:

DP_MIMO: This 3-bit field indicates which type of MIMO encoding process is applied to the associated DP. The type of MIMO encoding process is signaled according to the table 17.

TABLE 17

| Value | MIMO encoding |
| --- | --- |
| 000 | FR-SM |
| 001 | FRFD-SM |
| 010~111 | reserved |

DP_TI_TYPE: This 1-bit field indicates the type of time-interleaving. A value of '0' indicates that one TI group corresponds to one frame and contains one or more TI-blocks. A value of '1' indicates that one TI group is carried in more than one frame and contains only one TI-block.

DP_TI_LENGTH: The use of this 2-bit field (the allowed values are only 1, 2, 4, 8) is determined by the values set within the DP_TI_TYPE field as follows:

If the DP_TI_TYPE is set to the value '1', this field indicates PI, the number of the frames to which each TI group is mapped, and there is one TI-block per TI group (NTI=1). The allowed PI values with 2-bit field are defined in the below table 18.

If the DP_TI_TYPE is set to the value '0', this field indicates the number of TI-blocks NTI per TI group, and there is one TI group per frame (PI=1). The allowed PI values with 2-bit field are defined in the below table 18.

TABLE 18

| 2-bit field | PI | NTI |
| --- | --- | --- |
| 00 | 1 | 1 |
| 01 | 2 | 2 |
| 10 | 4 | 3 |
| 11 | 8 | 4 |

DP_FRAME_INTERVAL: This 2-bit field indicates the frame interval (HUMP) within the frame-group for the associated DP and the allowed values are 1, 2, 4, 8 (the corresponding 2-bit field is '00', '01', '10', or '11', respectively). For DPs that do not appear every frame of the frame-group, the value of this field is equal to the interval between successive frames. For example, if a DP appears on the frames 1, 5, 9, 13, etc., this field is set to '4'. For DPs that appear in every frame, this field is set to '1'.

DP_TI_BYPASS: This 1-bit field determines the availability of time interleaver 5050. If time interleaving is not used for a DP, it is set to '1'. Whereas if time interleaving is used it is set to '0'.

DP_FIRST_FRAME_IDX: This 5-bit field indicates the index of the first frame of the super-frame in which the current DP occurs. The value of DP_FIRST_FRAME_IDX ranges from 0 to 31

DP_NUM_BLOCK_MAX: This 10-bit field indicates the maximum value of DP_NUM_BLOCKS for this DP. The value of this field has the same range as DP_NUM_B-LOCKS.

DP_PAYLOAD_TYPE: This 2-bit field indicates the type of the payload data carried by the given DP. DP_PAYLOAD_TYPE is signaled according to the below table 19.

TABLE 19

| Value | Payload Type |
| --- | --- |
| 00 | TS. |
| 01 | IP |
| 10 | GS |
| 11 | reserved |

DP_INBAND_MODE: This 2-bit field indicates whether the current DP carries in-band signaling information. The in-band signaling type is signaled according to the below table 20.

TABLE 20

| Value | In-band mode |
| --- | --- |
| 00 | In-band signaling is not carried. |
| 01 | INBAND-PLS is carried only |
| 10 | INBAND-ISSY is carried only |
| 11 | INBAND-PLS and INBAND-ISSY are carried |

DP_PROTOCOL_TYPE: This 2-bit field indicates the protocol type of the payload carried by the given DP. It is signaled according to the below table 21 when input payload types are selected.

TABLE 21

| Value | If DP_PAYLOAD_TYPE Is TS | If DP_PAYLOAD_TYPE Is IP | If DP_PAYLOAD_TYPE Is GS |
| --- | --- | --- | --- |
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_CRC_MODE: This 2-bit field indicates whether CRC encoding is used in the Input Formatting block. The CRC mode is signaled according to the below table 22.

TABLE 22

| Value | CRC mode |
| --- | --- |
| 00 | Not used |
| 01 | CRC-8 |
| 10 | CRC-16 |
| 11 | CRC-32 |

DNP_MODE: This 2-bit field indicates the null-packet deletion mode used by the associated DP when DP_PAYLOAD_TYPE is set to TS ('00'). DNP_MODE is signaled according to the below table 23. If DP_PAYLOAD_TYPE is not TS ('00'), DNP_MODE is set to the value '00'.

TABLE 23

| Value | Null-packet deletion mode |
| --- | --- |
| 00 | Not used |
| 01 | DNP-NORMAL |
| 10 | DNP-OFFSET |
| 11 | reserved |

ISSY_MODE: This 2-bit field indicates the ISSY mode used by the associated DP when DP_PAYLOAD_TYPE is set to TS ('00'). The ISSY_MODE is signaled according to the below table 24 If DP_PAYLOAD_TYPE is not TS ('00'), ISSY_MODE is set to the value '00'.

TABLE 24

| Value | ISSY mode |
| --- | --- |
| 00 | Not used |
| 01 | ISSY-UP |
| 10 | ISSY-BBF |
| 11 | reserved |

HC_MODE_TS: This 2-bit field indicates the TS header compression mode used by the associated DP when DP_PAYLOAD_TYPE is set to TS ('00'). The HC_MODE_TS is signaled according to the below table 25.

TABLE 25

| Value | Header compression mode |
| --- | --- |
| 00 | HC_MODE_TS 1 |
| 01 | HC_MODE_TS 2 |
| 10 | HC_MODE_TS 3 |
| 11 | HC_MODE_TS 4 |

TABLE 26

| Value | Header compression mode |
| --- | --- |
| 00 | No compression |
| 01 | HC_MODE_IP 1 |
| 10~11 | reserved |

PID: This 13-bit field indicates the PID number for TS header compression when DP_PAYLOAD_TYPE is set to TS ('00') and HC_MODE_TS is set to '01' or '10'.

RESERVED: This 8-bit field is reserved for future use.

The following field appears only if FIC_FLAG is equal to '1':

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use.

The following field appears only if AUX_FLAG is equal to '1':

NUM_AUX: This 4-bit field indicates the number of auxiliary streams. Zero means no auxiliary streams are used.

AUX_CONFIG_RFU: This 8-bit field is reserved for future use.

AUX_STREAM_TYPE: This 4-bit is reserved for future use for indicating the type of the current auxiliary stream.

AUX_PRIVATE_CONFIG: This 28-bit field is reserved for future use for signaling auxiliary streams.

Figures 14, 15:
FIG. 14 illustrates PLS2 data according to another embodiment of the present invention.
FIG. 15 illustrates a logical structure of a frame according to an embodiment of the present invention.

FIG. 14 illustrates PLS2 data according to another embodiment of the present invention.

FIG. 14 illustrates PLS2-DYN data of the PLS2 data. The values of the PLS2-DYN data may change during the duration of one frame-group, while the size of fields remains constant.

The details of fields of the PLS2-DYN data are as follows:

FRAME_INDEX: This 5-bit field indicates the frame index of the current frame within the super-frame. The index of the first frame of the super-frame is set to '0'.

PLS_CHANGE_COUNTER: This 4-bit field indicates the number of super-frames ahead where the configuration will change. The next super-frame with changes in the configuration is indicated by the value signaled within this field. If this field is set to the value '0000', it means that no scheduled change is foreseen: e.g., value '1' indicates that there is a change in the next super-frame.

FIC_CHANGE_COUNTER: This 4-bit field indicates the number of super-frames ahead where the configuration (i.e., the contents of the FIC) will change. The next super-frame with changes in the configuration is indicated by the value signaled within this field. If this field is set to the value '0000', it means that no scheduled change is foreseen: e.g. value '0001' indicates that there is a change in the next super-frame.

RESERVED: This 16-bit field is reserved for future use.

The following fields appear in the loop over NUM_DP, which describe the parameters associated with the DP carried in the current frame.

DP_ID: This 6-bit field indicates uniquely the DP within a PHY profile.

DP_START: This 15-bit (or 13-bit) field indicates the start position of the first of the DPs using the DPU addressing scheme. The DP_START field has differing length according to the PHY profile and FFT size as shown in the below table 27.

TABLE 27

|  | DP_START field size | |
| --- | --- | --- |
| PHY profile | 64K | 16K |
| Base | 13 bit | 15 bit |
| Handheld | — | 13 bit |
| Advanced | 13 bit | 15 bit |

DP_NUM_BLOCK: This 10-bit field indicates the number of FEC blocks in the current TI group for the current DP. The value of DP_NUM_BLOCK ranges from 0 to 1023

RESERVED: This 8-bit field is reserved for future use.

The following fields indicate the FIC parameters associated with the EAC.

EAC_FLAG: This 1-bit field indicates the existence of the EAC in the current frame. This bit is the same value as the EAC_FLAG in the preamble.

EAS_WAKE_UP_VERSION_NUM: This 8-bit field indicates the version number of a wake-up indication.

If the EAC_FLAG field is equal to '1', the following 12 bits are allocated for EAC_LENGTH_BYTE field. If the EAC_FLAG field is equal to '0', the following 12 bits are allocated for EAC_COUNTER.

EAC_LENGTH_BYTE: This 12-bit field indicates the length, in byte, of the EAC.

EAC_COUNTER: This 12-bit field indicates the number of the frames before the frame where the EAC arrives.

The following field appears only if the AUX_FLAG field is equal to '1':

AUX_PRIVATE_DYN: This 48-bit field is reserved for future use for signaling auxiliary streams. The meaning of this field depends on the value of AUX_STREAM_TYPE in the configurable PLS2-STAT.

CRC_32: A 32-bit error detection code, which is applied to the entire PLS2.

FIG. 15 illustrates a logical structure of a frame according to an embodiment of the present invention.

As above mentioned, the PLS, EAC, FIC, DPs, auxiliary streams and dummy cells are mapped into the active carriers of the OFDM symbols in the frame. The PLS1 and PLS2 are first mapped into one or more FSS(s). After that, EAC cells, if any, are mapped immediately following the PLS field, followed next by FIC cells, if any. The DPs are mapped next after the PLS or EAC, FIC, if any. Type 1 DPs follows first, and Type 2 DPs next. The details of a type of the DP will be described later. In some case, DPs may carry some special data for EAS or service signaling data. The auxiliary stream or streams, if any, follow the DPs, which in turn are followed by dummy cells. Mapping them all together in the above mentioned order, i.e. PLS, EAC, FIC, DPs, auxiliary streams and dummy data cells exactly fill the cell capacity in the frame.

Figure 16:
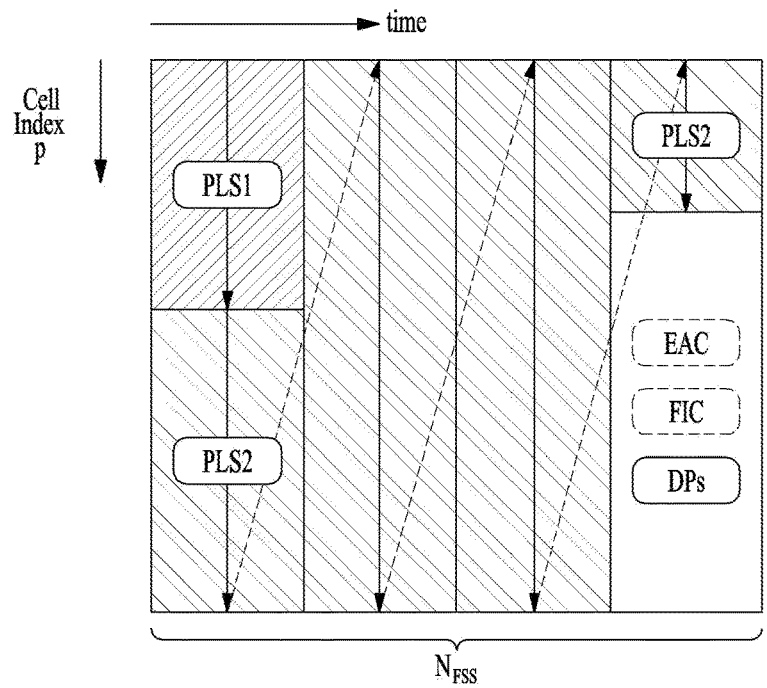
FIG. 16 illustrates PLS mapping according to an embodiment of the present invention.

FIG. 16 illustrates PLS mapping according to an embodiment of the present invention.

PLS cells are mapped to the active carriers of FSS(s). Depending on the number of cells occupied by PLS, one or more symbols are designated as FSS(s), and the number of FSS(s) NFSS is signaled by NUM_FSS in PLS1. The FSS is a special symbol for carrying PLS cells. Since robustness and latency are critical issues in the PLS, the FSS(s) has higher density of pilots allowing fast synchronization and frequency-only interpolation within the FSS.

PLS cells are mapped to active carriers of the NFSS FSS(s) in a top-down manner as shown in an example in FIG. 16. The PLS1 cells are mapped first from the first cell of the first FSS in an increasing order of the cell index. The PLS2 cells follow immediately after the last cell of the PLS1 and mapping continues downward until the last cell index of the first FSS. If the total number of required PLS cells exceeds the number of active carriers of one FSS, mapping proceeds to the next FSS and continues in exactly the same manner as the first FSS.

After PLS mapping is completed, DPs are carried next. If EAC, FIC or both are present in the current frame, they are placed between PLS and "normal" DPs.

Figure 17:
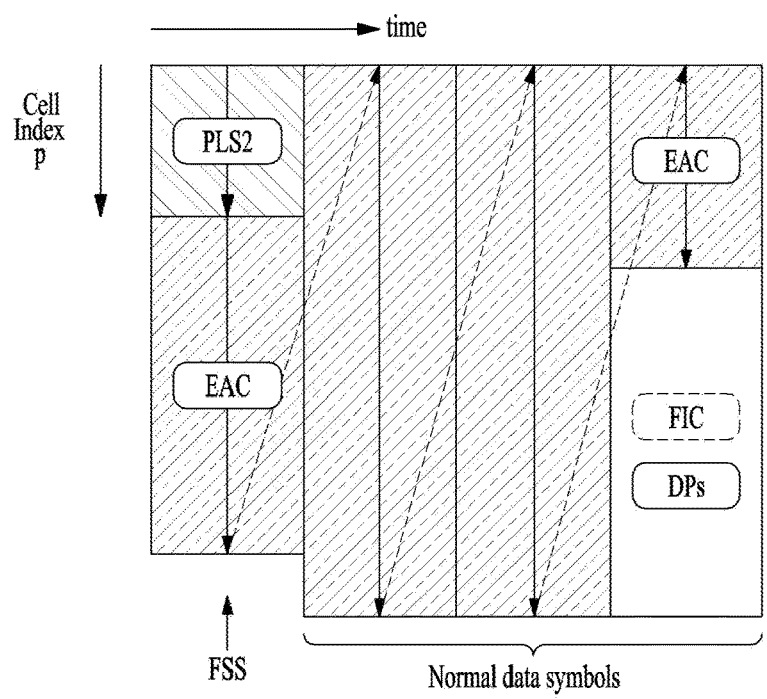
FIG. 17 illustrates EAC mapping according to an embodiment of the present invention.

FIG. 17 illustrates EAC mapping according to an embodiment of the present invention.

EAC is a dedicated channel for carrying EAS messages and links to the DPs for EAS. EAS support is provided but EAC itself may or may not be present in every frame. EAC, if any, is mapped immediately after the PLS2 cells. EAC is not preceded by any of the FIC, DPs, auxiliary streams or dummy cells other than the PLS cells. The procedure of mapping the EAC cells is exactly the same as that of the PLS.

The EAC cells are mapped from the next cell of the PLS2 in increasing order of the cell index as shown in the example in FIG. 17. Depending on the EAS message size, EAC cells may occupy a few symbols, as shown in FIG. 17.

EAC cells follow immediately after the last cell of the PLS2, and mapping continues downward until the last cell index of the last FSS. If the total number of required EAC cells exceeds the number of remaining active carriers of the last FSS mapping proceeds to the next symbol and continues in exactly the same manner as FSS(s). The next symbol for mapping in this case is the normal data symbol, which has more active carriers than a FSS.

After EAC mapping is completed, the FIC is carried next, if any exists. If FIC is not transmitted (as signaled in the PLS2 field), DPs follow immediately after the last cell of the EAC.

FIG. 18 illustrates FIC mapping according to an embodiment of the present invention.

(a) shows an example mapping of FIC cell without EAC and (b) shows an example mapping of FIC cell with EAC.

FIC is a dedicated channel for carrying cross-layer information to enable fast service acquisition and channel scanning. This information primarily includes channel binding information between DPs and the services of each broadcaster. For fast scan, a receiver can decode FIC and obtain information such as broadcaster ID, number of services, and BASE_DP_ID. For fast service acquisition, in addition to FIC, base DP can be decoded using BASE_DP_ID. Other than the content it carries, a base DP is encoded and mapped to a frame in exactly the same way as a normal DP. Therefore, no additional description is required for a base DP. The FIC data is generated and consumed in the Management Layer. The content of FIC data is as described in the Management Layer specification.

The FIC data is optional and the use of FIC is signaled by the FIC_FLAG parameter in the static part of the PLS2. If FIC is used, FIC_FLAG is set to '1' and the signaling field for FIC is defined in the static part of PLS2. Signaled in this field are FIC_VERSION, and FIC_LENGTH_BYTE. FIC uses the same modulation, coding and time interleaving parameters as PLS2. FIC shares the same signaling parameters such as PLS2 MOD and PLS2 FEC. FIC data, if any, is mapped immediately after PLS2 or EAC if any. FIC is not preceded by any normal DPs, auxiliary streams or dummy cells. The method of mapping FIC cells is exactly the same as that of EAC which is again the same as PLS.

Without EAC after PLS, FIC cells are mapped from the next cell of the PLS2 in an increasing order of the cell index as shown in an example in (a). Depending on the FIC data size, FIC cells may be mapped over a few symbols, as shown in (b).

FIC cells follow immediately after the last cell of the PLS2, and mapping continues downward until the last cell index of the last FSS. If the total number of required FIC cells exceeds the number of remaining active carriers of the last FSS, mapping proceeds to the next symbol and continues in exactly the same manner as FSS(s). The next symbol for mapping in this case is the normal data symbol which has more active carriers than a FSS.

If EAS messages are transmitted in the current frame, EAC precedes FIC, and FIC cells are mapped from the next cell of the EAC in an increasing order of the cell index as shown in (b).

After FIC mapping is completed, one or more DPs are mapped, followed by auxiliary streams, if any, and dummy cells.

Figure 19:
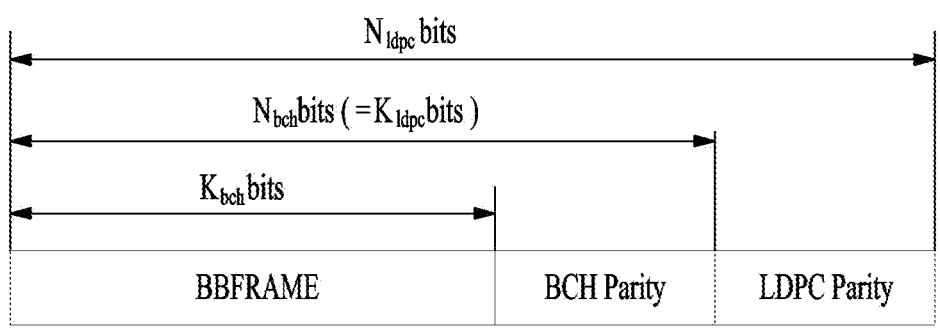
FIG. 19 illustrates an FEC structure according to an embodiment of the present invention.

FIG. 19 illustrates an FEC structure according to an embodiment of the present invention.

FIG. 19 illustrates an FEC structure according to an embodiment of the present invention before bit interleaving. As above mentioned, Data FEC encoder may perform the FEC encoding on the input BBF to generate FECBLOCK procedure using outer coding (BCH), and inner coding (LDPC). The illustrated FEC structure corresponds to the FECBLOCK. Also, the FECBLOCK and the FEC structure have same value corresponding to a length of LDPC codeword.

Figure 22:
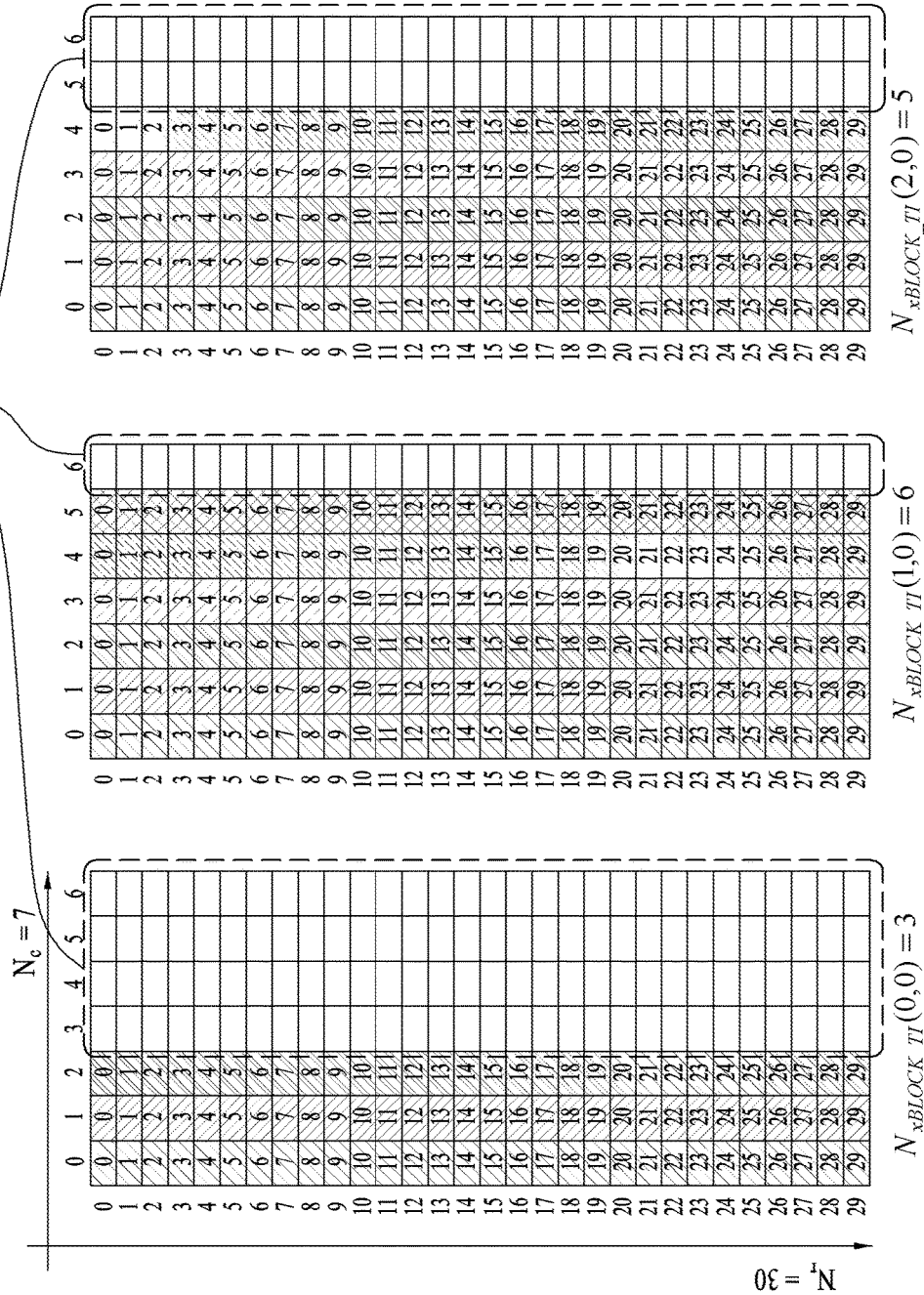
FIG. 22 illustrates an operation of a twisted row-column block interleaver according to another embodiment of the present invention.

The BCH encoding is applied to each BBF (Kbch bits), and then LDPC encoding is applied to BCH-encoded BBF (Kldpc bits=Nbch bits) as illustrated in FIG. 22.

The value of Nldpc is either 64800 bits (long FECBLOCK) or 16200 bits (short FECBLOCK).

The below table 28 and table 29 show FEC encoding parameters for a long FECBLOCK and a short FECBLOCK, respectively.

TABLE 28

| LDPC Rate | Nldpc | Kldpc | Kbch | BCH error correction capability | Nbch − Kbch |
|---|---|---|---|---|---|
| 5/15 | 64800 | 21600 | 21408 | 12 | 192 |
| 6/15 |  | 25920 | 25728 |  |  |
| 7/15 |  | 30240 | 30048 |  |  |
| 8/15 |  | 34560 | 34368 |  |  |
| 9/15 |  | 38880 | 38688 |  |  |
| 10/15 |  | 43200 | 43008 |  |  |
| 11/15 |  | 47520 | 47328 |  |  |
| 12/15 |  | 51840 | 51648 |  |  |
| 13/15 |  | 56160 | 55968 |  |  |

TABLE 29

| LDPC Rate | Nldpc | Kldpc | Kbch | BCH error correction capability | Nbch − Kbch |
|---|---|---|---|---|---|
| 5/15 | 16200 | 5400 | 5232 | 12 | 168 |
| 6/15 |  | 6480 | 6312 |  |  |
| 7/15 |  | 7560 | 7392 |  |  |
| 8/15 |  | 8640 | 8472 |  |  |
| 9/15 |  | 9720 | 9552 |  |  |
| 10/15 |  | 10800 | 10632 |  |  |
| 11/15 |  | 11880 | 11712 |  |  |
| 12/15 |  | 12960 | 12792 |  |  |
| 13/15 |  | 14040 | 13872 |  |  |

The details of operations of the BCH encoding and LDPC encoding are as follows:

A 12-error correcting BCH code is used for outer encoding of the BBF. The BCH generator polynomial for short FECBLOCK and long FECBLOCK are obtained by multiplying together all polynomials.

LDPC code is used to encode the output of the outer BCH encoding. To generate a completed Bldpc (FECBLOCK), Pldpc (parity bits) is encoded systematically from each Ildpc (BCH-encoded BBF), and appended to Ildpc. The completed Bldpc (FECBLOCK) is expressed by the following equation.

$$B_{ldpc}=[I_{ldpc}P_{ldpc}]=[i_0,i_1,\ldots,i_{K_{ldpc}-1},p_0,p_1,\ldots,p_{N_{ldpc}-K_{ldpc}-1}]$$ [Equation 2]

The parameters for long FECBLOCK and short FECBLOCK are given in the above table 28 and 29, respectively.

The detailed procedure to calculate Nldpc−Kldpc parity bits for long FECBLOCK, is as follows:

1) Initialize the parity bits, $$p_0=p_1=p_2=\ldots=p_{N_{ldpc}-K_{ldpc}-1}=0$$ [Equation 3]

2) Accumulate the first information bit—i0, at parity bit addresses specified in the first row of an addresses of parity check matrix. The details of addresses of parity check matrix will be described later. For example, for rate 13/15:

$$p_{983} = p_{983} \oplus i_0 \quad p_{2815} = p_{2815} \oplus i_0$$
$$p_{4837} = p_{4837} \oplus i_0 \quad p_{4989} = p_{4989} \oplus i_0$$
$$p_{6138} = p_{6138} \oplus i_0 \quad p_{6458} = p_{6458} \oplus i_0$$
$$p_{6921} = p_{6921} \oplus i_0 \quad p_{6974} = p_{6974} \oplus i_0$$
$$p_{7572} = p_{7572} \oplus i_0 \quad p_{8260} = p_{8260} \oplus i_0$$
$$p_{8496} = p_{8496} \oplus i_0$$

[Equation 4]

3) For the next 359 information bits, is, s=1, 2, . . . , 359 accumulate is at parity bit addresses using following equation.

$$\{x+(s \bmod 360) \times Q_{ldpc}\} \bmod(N_{ldpc}-K_{ldpc})$$ [Equation 5]

where x denotes the address of the parity bit accumulator corresponding to the first bit i0, and Qldpc is a code rate dependent constant specified in the addresses of parity check matrix. Continuing with the example, Qldpc=24 for rate 13/15, so for information bit i1, the following operations are performed:

$$p_{1007} = p_{1007} \oplus i_1 \quad p_{2839} = p_{2839} \oplus i_1$$
$$p_{4861} = p_{4861} \oplus i_1 \quad p_{5013} = p_{5013} \oplus i_1$$
$$p_{6162} = p_{6162} \oplus i_1 \quad p_{6482} = p_{6482} \oplus i_1$$
$$p_{6945} = p_{6945} \oplus i_1 \quad p_{6998} = p_{6998} \oplus i_1$$
$$p_{7596} = p_{7596} \oplus i_1 \quad p_{8284} = p_{8284} \oplus i_1$$
$$p_{8520} = p_{8520} \oplus i_1$$

[Equation 6]

4) For the 361st information bit i360, the addresses of the parity bit accumulators are given in the second row of the addresses of parity check matrix. In a similar manner the addresses of the parity bit accumulators for the following 359 information bits is, s=361, 362, . . . , 719 are obtained using the equation 6, where x denotes the address of the parity bit accumulator corresponding to the information bit i360, i.e., the entries in the second row of the addresses of parity check matrix.

5) In a similar manner, for every group of 360 new information bits, a new row from addresses of parity check matrixes used to find the addresses of the parity bit accumulators.

After all of the information bits are exhausted, the final parity bits are obtained as follows:

6) Sequentially perform the following operations starting with i=1

$$p_i=p_i \oplus p_{i-1}, i=1,2,\ldots,N_{ldpc}-K_{ldpc}-1$$ [Equation 7]

where final content of pi, i=0, 1, . . . Nldpc−Kldpc−1 is equal to the parity bit pi.

TABLE 30

| Code Rate | Qldpc |
| --- | --- |
| 5/15 | 120 |
| 6/15 | 108 |
| 7/15 | 96 |
| 8/15 | 84 |
| 9/15 | 72 |
| 10/15 | 60 |
| 11/15 | 48 |
| 12/15 | 36 |
| 13/15 | 24 |

This LDPC encoding procedure for a short FECBLOCK is in accordance with the LDPC encoding procedure for the long FECBLOCK, except replacing the table 30 with table 31, and replacing the addresses of parity check matrix for the long FECBLOCK with the addresses of parity check matrix for the short FECBLOCK.

TABLE 31

| Code Rate | Qldpc |
| --- | --- |
| 5/15 | 30 |
| 6/15 | 27 |
| 7/15 | 24 |
| 8/15 | 21 |
| 9/15 | 18 |
| 10/15 | 15 |
| 11/15 | 12 |
| 12/15 | 9 |
| 13/15 | 6 |

Figure 20:
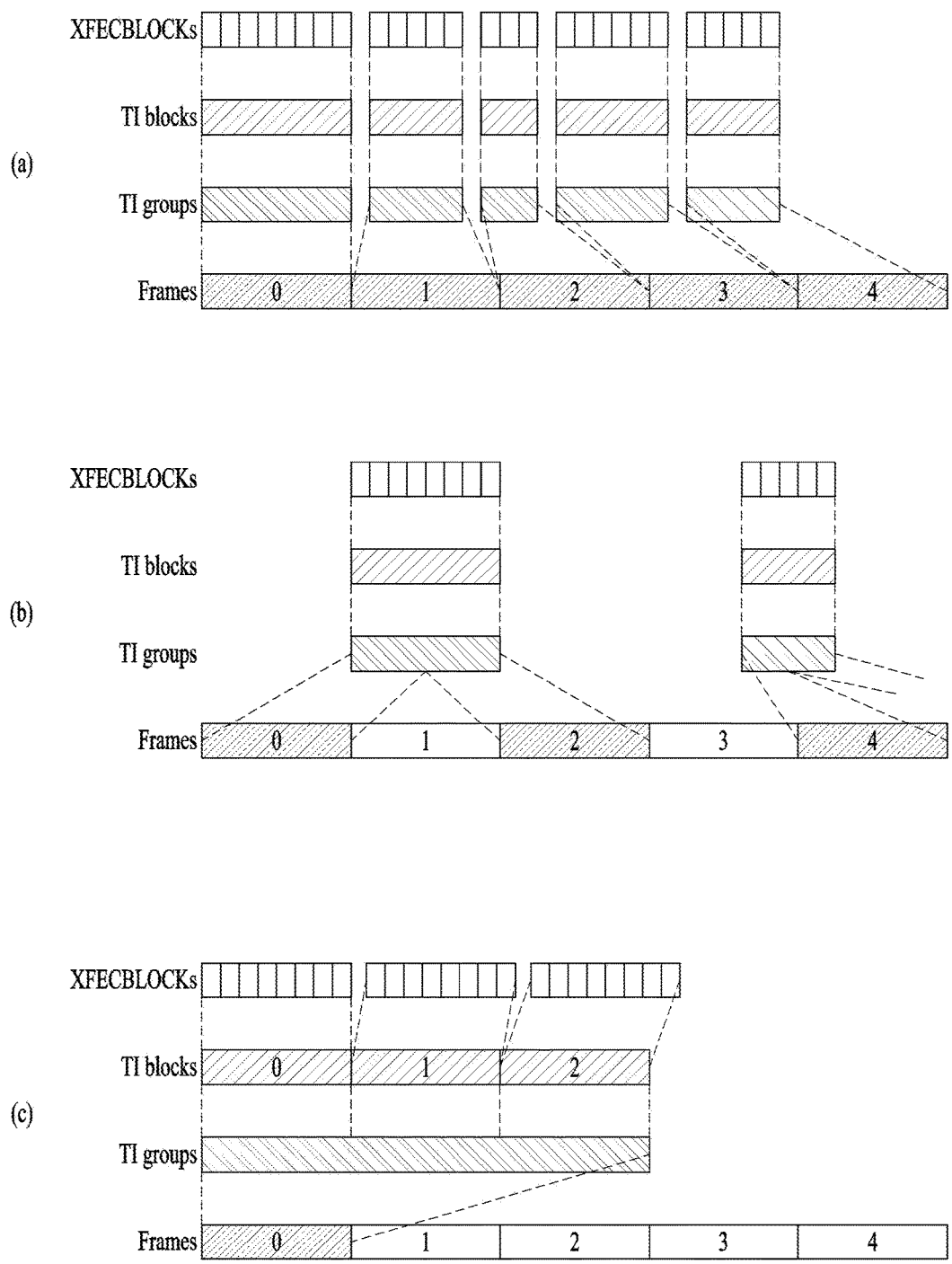
FIG. 20 illustrates a time interleaving according to an embodiment of the present invention.

FIG. 20 illustrates a time interleaving according to an embodiment of the present invention.

(a) to (c) show examples of TI mode.

The time interleaver operates at the DP level. The parameters of time interleaving (TI) may be set differently for each DP.

The following parameters, which appear in part of the PLS2-STAT data, configure the TI:

DP_TI_TYPE (allowed values: 0 or 1): Represents the TI mode; '0' indicates the mode with multiple TI blocks (more than one TI block) per TI group. In this case, one TI group is directly mapped to one frame (no inter-frame interleaving). '1' indicates the mode with only one TI block per TI group. In this case, the TI block may be spread over more than one frame (inter-frame interleaving).

DP_TI_LENGTH: If DP_TI_TYPE='0', this parameter is the number of TI blocks NTI per TI group. For DP_TI_TYPE='1', this parameter is the number of frames PI spread from one TI group.

DP_NUM_BLOCK_MAX (allowed values: 0 to 1023): Represents the maximum number of XFECBLOCKs per TI group.

DP_FRAME_INTERVAL (allowed values: 1, 2, 4, 8): Represents the number of the frames IJUMP between two successive frames carrying the same DP of a given PHY profile.

DP_TI_BYPASS (allowed values: 0 or 1): If time interleaving is not used for a DP, this parameter is set to '1'. It is set to '0' if time interleaving is used.

Additionally, the parameter DP_NUM_BLOCK from the PLS2-DYN data is used to represent the number of XFECBLOCKs carried by one TI group of the DP.

When time interleaving is not used for a DP, the following TI group, time interleaving operation, and TI mode are not considered. However, the Delay Compensation block for the dynamic configuration information from the scheduler will still be required. In each DP, the XFECBLOCKs received from the SSD/MIMO encoding are grouped into TI groups. That is, each TI group is a set of an integer number of XFECBLOCKs and will contain a dynamically variable number of XFECBLOCKs. The number of XFECBLOCKs in the TI group of index n is denoted by NxBLOCK_Group (n) and is signaled as DP_NUM_BLOCK in the PLS2-DYN data. Note that NxBLOCK_Group(n) may vary from the minimum value of 0 to the maximum value NxBLOCK_Group_MAX (corresponding to DP_NUM_BLOCK_MAX) of which the largest value is 1023.

Each TI group is either mapped directly onto one frame or spread over PI frames. Each TI group is also divided into more than one TI blocks(NTI), where each TI block corresponds to one usage of time interleaver memory. The TI blocks within the TI group may contain slightly different numbers of XFECBLOCKs. If the TI group is divided into multiple TI blocks, it is directly mapped to only one frame. There are three options for time interleaving (except the extra option of skipping the time interleaving) as shown in the below table 32.

TABLE 32

| Modes | Descriptions |
|---|---|
| Option-1 | Each TI group contains one TI block and is mapped directly to one frame as shown in (a). This option is signaled in the PLS2-STAT by DP_TI_TYPE = '0' and DP_TI_LENGTH = '1'(NTI = 1). |
| Option-2 | Each TI group contains one TI block and is mapped to more than one frame. (b) shows an example, where one TI group is mapped to two frames, i.e., DP_TI_LENGTH = '2' (PI = 2) and DP_FRAME_INTERVAL (IJUMP = 2). This provides greater time diversity for low data-rate services. This option is signaled in the PLS2-STAT by DP_TI_TYPE = '1'. |
| Option-3 | Each TI group is divided into multiple TI blocks and is mapped directly to one frame as shown in (c). Each TI block may use full TI memory, so as to provide the maximum bit-rate for a DP. This option is signaled in the PLS2-STAT signaling by DP_TI_TYPE = '0' and DP_TI_LENGTH = NTI, while PI = 1. |

Typically, the time interleaver will also act as a buffer for DP data prior to the process of frame building. This is achieved by means of two memory banks for each DP. The first TI-block is written to the first bank. The second TI-block is written to the second bank while the first bank is being read from and so on.

The TI is a twisted row-column block interleaver. For the sth TI block of the nth TI group, the number of rows $N_r$ of a TI memory is equal to the number of cells $N_{cells}$, i.e., $N_r = N_{cells}$ while the number of columns $N_c$ is equal to the number $N_{xBLOCK\_TI}(n,s)$.

Figure 21:
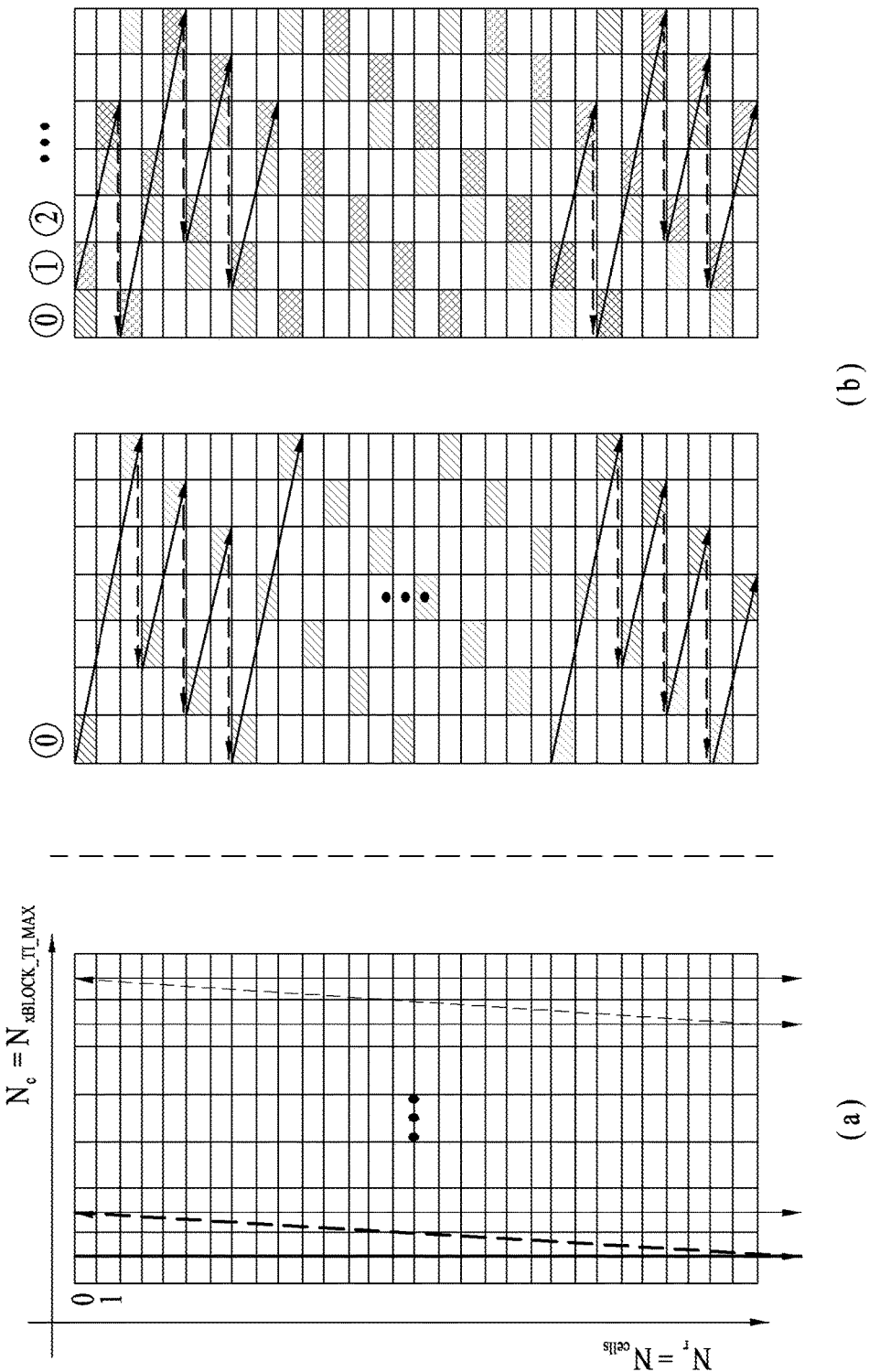
FIG. 21 illustrates the basic operation of a twisted row-column block interleaver according to an embodiment of the present invention.

FIG. 21 illustrates the basic operation of a twisted row-column block interleaver according to an embodiment of the present invention.

FIG. 21 (a) shows a writing operation in the time interleaver and FIG. 21(b) shows a reading operation in the time interleaver The first XFECBLOCK is written column-wise into the first column of the TI memory, and the second XFECBLOCK is written into the next column, and so on as shown in (a). Then, in the interleaving array, cells are read out diagonal-wise. During diagonal-wise reading from the first row (rightwards along the row beginning with the left-most column) to the last row, $N_r$ cells are read out as shown in (b). In detail, assuming $z_{n,s,i}$ (I=0, . . . , $N_r N_c$) as the TI memory cell position to be read sequentially, the reading process in such an interleaving array is performed by calculating the row index $R_{n,s,i}$, the column index $C_{n,s,i}$, and the associated twisting parameter $T_{n,s,i}$ as follows equation.

$$\text{GENERATE}(R_{n,s,i}, C_{n,s,i}) = \quad \text{[Equation 8]}$$
$$\{$$
$$R_{n,s,i} = \text{mod}(i, N_r),$$
$$T_{n,s,i} = \text{mod}(S_{shift} \times R_{n,s,i}, N_c),$$
$$C_{n,s,i} = \text{mod}\left(T_{n,s,i} + \left\lfloor \frac{i}{N_r} \right\rfloor, N_c\right)$$
$$\}$$

where $S_{shift}$ is a common shift value for the diagonal-wise reading process regardless of $N_{xBLOCK\_TI}(n,s)$, and it is determined by $N_{xBLOCK\_TI\_MAX}$ given in the PLS2-STAT as follows equation.

[Equation 9]
$$\text{for} \begin{cases} N'_{xBLOCK\_TI\_MAX} = \\ N_{xBLOCK\_TI\_MAX} + 1 \end{cases}, \text{if } N_{xBLOCK\_TI\_MAX} \text{mod} 2 = 0$$
$$\begin{cases} N'_{xBLOCK\_TI\_MAX} = \\ N_{xBLOCK\_TI\_MAX} \end{cases}, \text{if } N_{xBLOCK\_TI\_MAX} \text{mod} 2 = 1$$

$$S_{shift} = \frac{N'_{xBLOCK\_TI\_MAX} - 1}{2}$$

As a result, the cell positions to be read are calculated by a coordinate as $z_{n,s,i} = N_r C_{n,s,i} + R_{n,s,i}$.

FIG. 22 illustrates an operation of a twisted row-column block interleaver according to another embodiment of the present invention.

More specifically, FIG. 22 illustrates the interleaving array in the TI memory for each TI group, including virtual XFECBLOCKs when $N_{xBLOCK\_TI}(0,0)=3$, $N_{xBLOCK\_TI}(1,0)=6$, $N_{xBLOCK\_TI}(2,0)=5$.

The variable number $N_{xBLOCK\_TI}(n,s)=N_r$ will be less than or equal to $N'_{xBLOCK\_TI\_MAX}$. Thus, in order to achieve a single-memory deinterleaving at the receiver side, regardless of $N_{xBLOCK\_TI}(n,s)$, the interleaving array for use in a twisted row-column block interleaver is set to the size of $N_r \times N_c = N_{cells} \times N'_{xBLOCK\_TI\_MAX}$ by inserting the virtual XFECBLOCKs into the TI memory and the reading process is accomplished as follow equation.

$$
\begin{aligned}
&p = 0; \\
&\text{for } i = 0;\ i < N_{cells}N'_{xBLOCK\_TI\_MAX};\ i = i + 1 \\
&\{\text{GENERATE } (R_{n,s,i},\ C_{n,s,i}); \\
&V_i = N_r C_{n,s,j} + R_{n,s,j} \\
&\quad \text{if } V_i < N_{cells}N_{xBLOCK\_TI}\,(n,s) \\
&\quad \{ \\
&\quad\quad Z_{n,s,p} = V_i;\ p = p + 1; \\
&\quad \} \\
&\}
\end{aligned}
$$

[Equation10]

The number of TI groups is set to 3. The option of time interleaver is signaled in the PLS2-STAT data by DP_TI_TYPE='0', DP_FRAME_INTERVAL='1', and DP_TI_LENGTH='1', i.e., NTI=1, IJUMP=1, and PI=1. The number of XFECBLOCKs, each of which has Ncells=30 cells, per TI group is signaled in the PLS2-DYN data by NxBLOCK_TI(0,0)=3, NxBLOCK_TI(1,0)=6, and NxBLOCK_TI(2,0)=5, respectively. The maximum number of XFECBLOCK is signaled in the PLS2-STAT data by NxBLOCK_Group_MAX, which leads to $\lfloor N_{xBLOCK\_Group\_MAX}/N_{TI} \rfloor = N_{xBLOCK\_TI\_MAX} = 6$.

Figure 23:
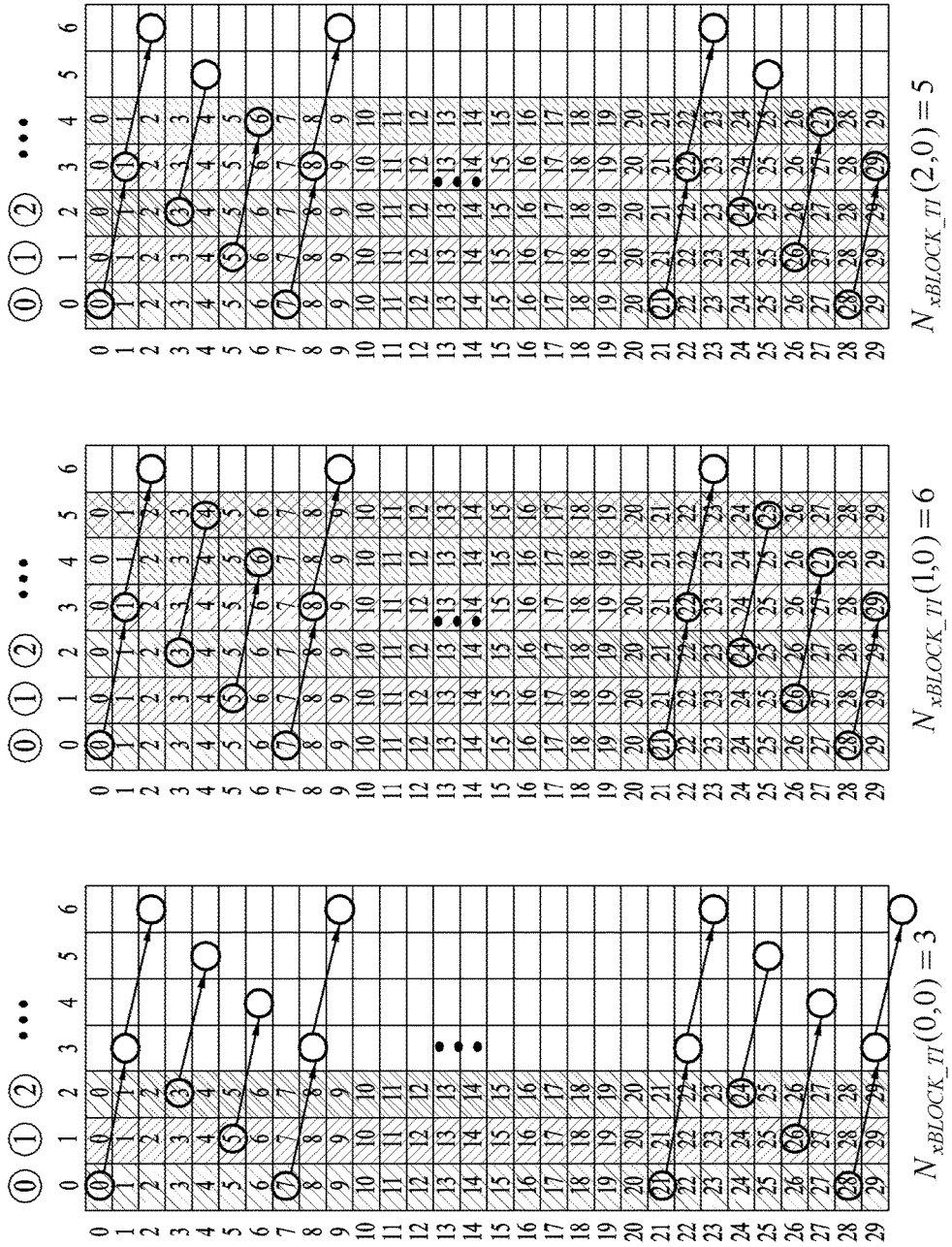
FIG. 23 illustrates a diagonal-wise reading pattern of a twisted row-column block interleaver according to an embodiment of the present invention.

FIG. 23 illustrates a diagonal-wise reading pattern of a twisted row-column block interleaver according to an embodiment of the present invention.

More specifically FIG. 23 shows a diagonal-wise reading pattern from each interleaving array with parameters of $N'_{xBLOCK\_TI\_MAX}=7$ and Sshift=(7−1)/2=3. Note that in the reading process shown as pseudocode above, if $V_i \geq N_{cells}N_{xBLOCK\_TI}(n,s)$, the value of Vi is skipped and the next calculated value of Vi is used.

Figure 24:
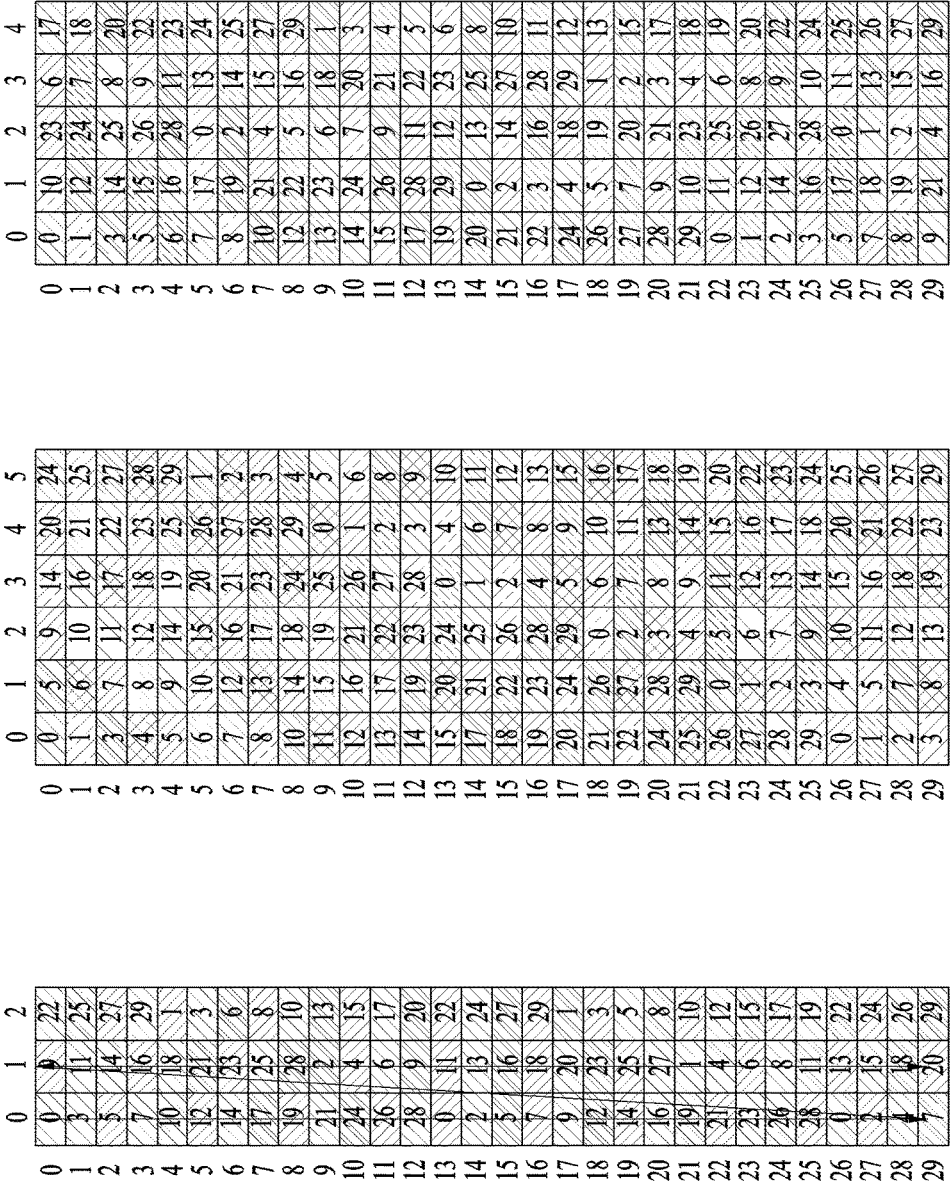
FIG. 24 illustrates interleaved XFECBLOCKs from each interleaving array according to an embodiment of the present invention.

FIG. 24 illustrates interlaved XFECBLOCKs from each interleaving array according to an embodiment of the present invention.

FIG. 24 illustrates the interleaved XFECBLOCKs from each interleaving array with parameters of $N'_{xBLOCK\_TI\_MAX}=7$ and Sshift=3.

Figure 25:
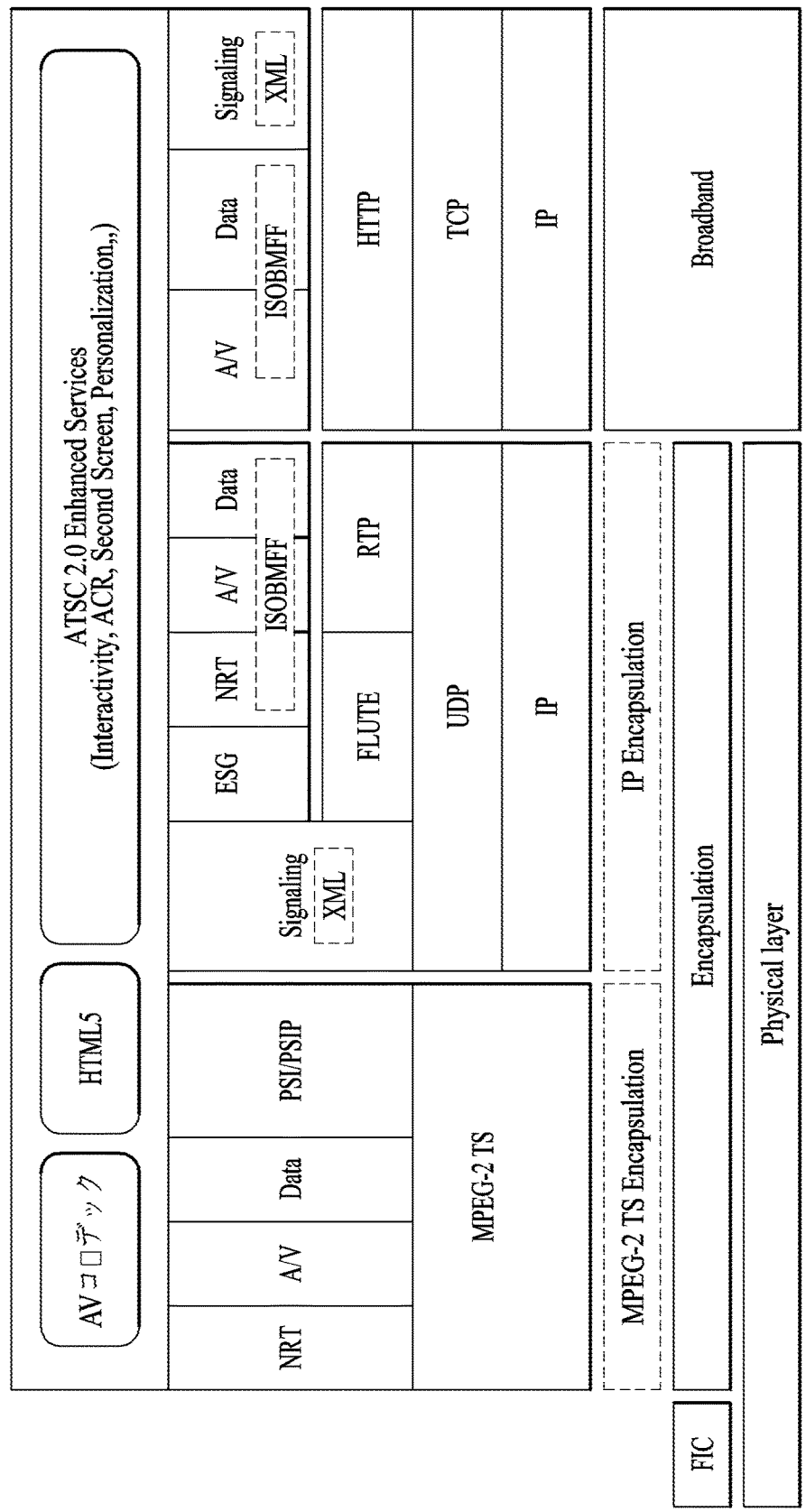
FIG. 25 is a diagram showing a protocol stack supporting a broadcast service according to one embodiment of the present invention.

FIG. 25 is a diagram showing a protocol stack supporting a broadcast service according to one embodiment of the present invention.

The broadcast service according to one embodiment of the present invention may provide not only audio/video (A/V) data but also additional services such as an HTML5 application, an interactivity service, an ACR service, a second screen service and a personalization service.

Such a broadcast service may be transmitted via a physical layer which is a broadcast signal of a terrestrial wave, a satellite, etc. In addition, the broadcast service according to one embodiment of the present invention may be transmitted via an Internet communication network (broadband).

When the broadcast service is transmitted via the physical layer which is the broadcast signal of the terrestrial wave, the satellite, etc., a broadcast reception device may demodulate a broadcast signal to extract an encapsulated MPEG-2 transport stream (TS) and an encapsulated IP datagram. The broadcast reception device may extract a user datagram protocol (UDP) datagram from the IP datagram. The broadcast reception device may extract signaling information from the UDP datagram. At this time, the signaling information may be in XML format. In addition, the broadcast reception device may extract an asynchronous layered coding/layered coding transport (ALC/LCT) packet from the UDP datagram. The broadcast reception device may extract a file delivery over unidirectional transport (FLUTE) packet from the ALC/LCT packet. At this time, the FLUTE packet may include real-time audio/video/subtitle data, non-real time (NRT) data and electronic service guide (ESG) data. In addition, the broadcast reception device may extract a real-time transport protocol (RTCP) packet and an RTP control protocol (RTCP) packet from the UDP datagram. The broadcast reception device may extract A/V data and supplementary data from the real-time transport packet such as the RTP/RTCP packet. At this time, at least one of the NRT data, the A/V data and the supplementary data may be in ISO base media file format (BMFF). In addition, the broadcast reception device may extract signaling information such as NRT data, A/V or PSI/PSIP from the MPEG-2 TS packet or the IP packet. At this time, the signaling information may be in XML or binary format.

When the broadcast service is transmitted via the Internet communication network (broadband), the broadcast reception device may receive an IP packet from the Internet communication network. The broadcast reception device may extract a TCP packet from the IP packet. The broadcast reception device may extract an HTTP packet from the TCP packet. The broadcast reception device may extract A/V, supplementary data, signaling data, etc. from the HTTP packet. At this time, at least one of the A/V and the supplementary data may be in ISO BMFF. In addition, the signaling information may be in XML format.

Figure 26:
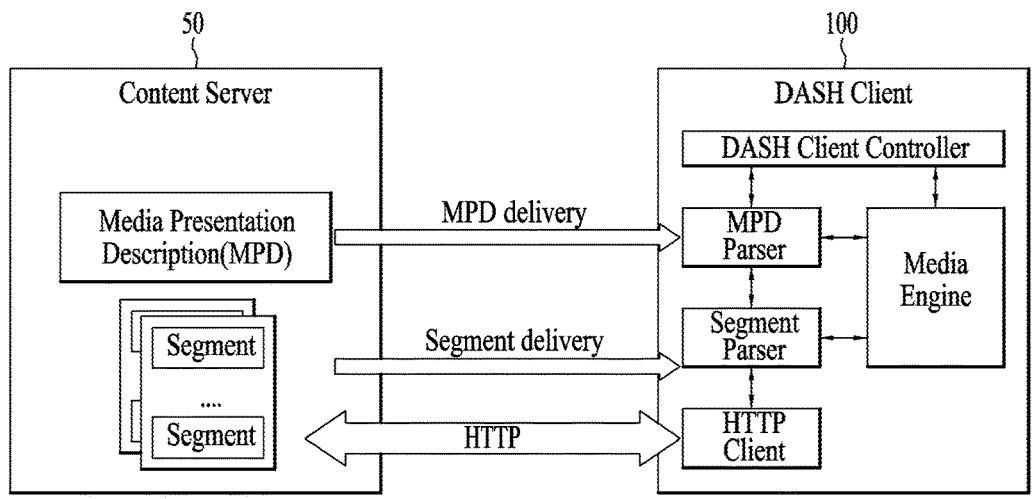
FIG. 26 is a diagram showing a transport layer of a broadcast service according to one embodiment of the present invention.

FIG. 26 is a diagram showing a transport layer of a broadcast service according to one embodiment of the present invention.

Transmission and reception of media content via the IP network according to one embodiment of the present invention is divided into transmission and reception of a transport packet including actual media content and transmission and reception of media content presentation information. The broadcast reception device 100 receives media content presentation information and receives a transport packet including media content. At this time, the media content presentation information indicates information necessary for media content presentation. The media content presentation information may include at least one of spatial information and temporal information necessary for media content presentation. The broadcast reception device 100 presents the media content based on the media content presentation information.

In a detailed embodiment, the media content may be transmitted and received via the IP network according to the MMT standard. At this time, the content server 50 transmits a presentation information (PI) document including the media content presentation information. In addition, the content server 50 transmits an MMT protocol (MMTP) packet including media content according to a request of the broadcast reception device 100. The broadcast reception device 100 receives a PI document. The broadcast reception device 100 receives a transport packet including media content. The broadcast reception device 100 extracts the media content from the transport packet including the media content. The broadcast reception device 100 presents the media content based on the PI document.

In another detailed embodiment, as in the embodiment of FIG. 26, the media content may be transmitted and received via the IP network according to the MPEG-DASH standard. In FIG. 26, the content server 50 transmits a media presentation description (MPD) including the media content presentation information. In a detailed embodiment, the MPD may be transmitted by an external server other than the content server 50. The content server 50 transmits a segment including media content according to a request of the broadcast reception device 100. The broadcast reception device 100 receives the MPD. The broadcast reception device 100 requests the media content from the content server based on the MPD. The broadcast reception device 100 receives the transport packet including the media content according to the request. The broadcast reception device 100 presents the media content based on the MPD. The broadcast reception device 100 may include a DASH client in the controller 110. The DASH client may include an MPD parser for parsing the MPD, a segment parser for parsing a segment, an HTTP client for transmitting an HTTP request message and receiving an HTTP response message via an IP transmitter/receiver 130 and a media engine for presenting media.

Figure 27:
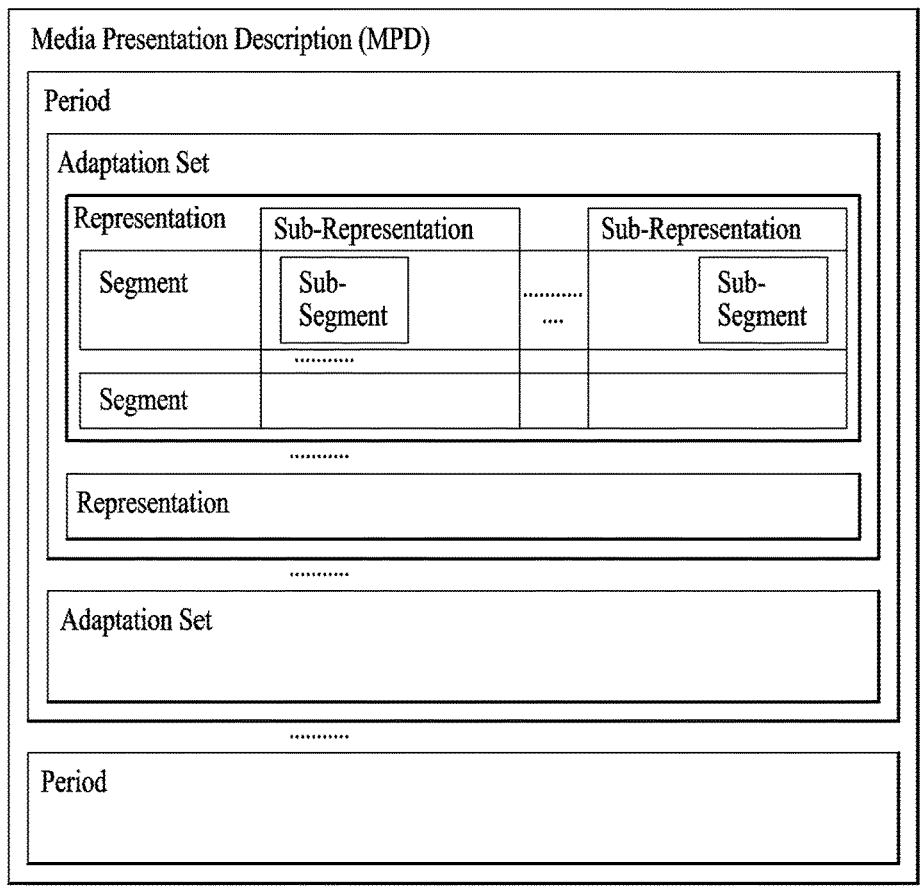
FIG. 27 is a diagram showing the configuration of a media content transmission and reception system via an IP network according to one embodiment of the present invention.

FIG. 27 is a diagram showing the structure of a media presentation description (MPD) according to one embodiment of the present invention. The MPD may include a period element, an adaptation set element and a representation element.

The period element includes information on a period. The MPD may include information on a plurality of periods. The period indicates a consecutive time interval of media content presentation.

The adaptation set element includes information on an adaptation set. The MPD may include information on a plurality of adaptation sets. The adaptation set is a set of media components including one or more interchangeable media content components. The adaptation set may include one or more representations. Each adaptation set may include audio of different languages or subtitles of different languages.

The representation element includes information on a representation. The MPD may include information on a plurality of representations. The representation is a set of one or more media components and a plurality of differently encoded representations may exist in the same media content component. Meanwhile, if bitstream switching is possible, the broadcast reception device 100 may switch from a received representation to another representation based on information updated during media content presentation. In particular, the broadcast reception device 100 may switch a received representation into another representation according to bandwidth environment. The representation may be divided into a plurality of segments.

The segment is a unit of media content data. The representation may be transmitted as a segment or a portion of a segment according to the request of the media content receiver 30 using an HTTP GET or HTTP partial GET method defined in HTTP 1.1 (RFC 2616).

In addition, the segment may include a plurality of sub segments. The sub segment may mean a smallest unit indexed at a segment level. The segment may include an initialization segment, a media segment, an index segment, a bitstream switching segment, etc.

Figure 28:
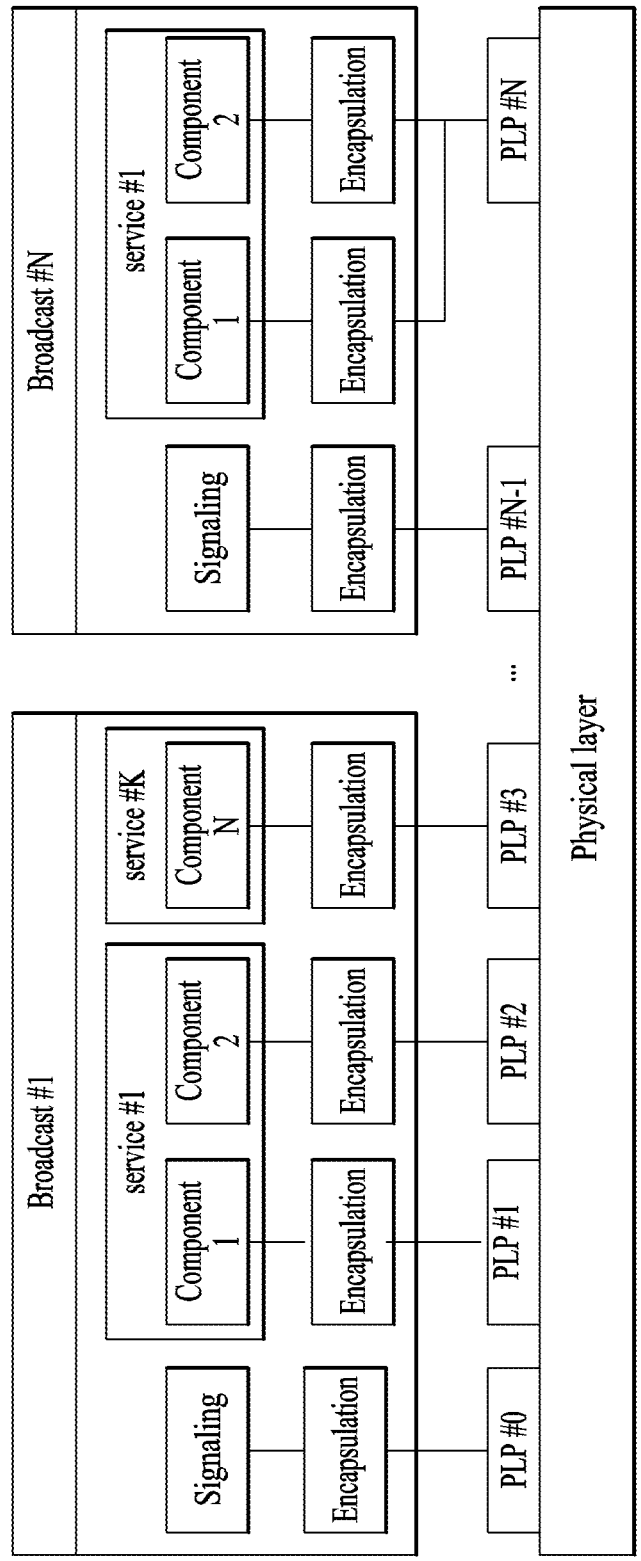
FIG. 28 is a diagram showing the structure of a media presentation description (MPD) according to one embodiment of the present invention.

FIG. 28 is a diagram showing a transport layer of a broadcast service according to one embodiment of the present invention.

A broadcast transmission device 300 may transmit a broadcast service via a broadcast signal composed of a plurality of layers. Among the plurality of layers for transmitting the broadcast service, a transport layer for transmitting and receiving a raw broadcast signal via a physical medium may be referred to as a physical layer. The broadcast transmission device 300 may transmit a broadcast service and broadcast service related data via one or more physical layer pipes (PLPs) over one or a plurality of frequencies. At this time, the PLP is a series of logical data delivery paths capable of being identified on the physical layer. The PLP may also be referred to as a data pipe. One broadcast service may include a plurality of components. At this time, each component may be any one of audio, video and data components. Each broadcaster may transmit an encapsulated broadcast service via one or a plurality of PLPs using the broadcast transmission device 300. More specifically, the broadcaster may transmit a plurality of components included in one service through a plurality of PLPs using the broadcast transmission device 300. Alternatively, the broadcaster may transmit a plurality of components included in one service via one PLP using the broadcast transmission device 300. For example, in the embodiment of FIG. 28, Broadcast #1 may transmit signaling information via one PLP (PLP #0) using the broadcast transmission device 300. In addition, in the embodiment of FIG. 28, Broadcast #1 transmits Component 1 and Component 2 included in a first broadcast service via different PLPs PLP #1 and PLP #2 using the broadcast transmission device 300. In the embodiment of FIG. 28, Broadcast #N transmits Component 1 and Component 2 included in Services #1 via PLP #N. At this time, a real-time broadcast service may be encapsulated into any one of IP, user datagram protocol (UDP) and protocol for real-time content transmission, e.g., real-time transport protocol (RTP). Even non-real-time content and non-real-time data may be encapsulated into any one packet of an IP, a user datagram protocol (UDP) and a content transmission protocol, e.g., FLUTE. Accordingly, the physical layer frame transmitted by the broadcast transmission device 300 may include a plurality of PLPs for delivering one or more components. Accordingly, the broadcast reception device 100 should confirm all PLPs in order to scan the broadcast service for acquiring broadcast service connection information. Therefore, there is a need for a broadcast transmission method and a broadcast reception method for enabling the broadcast reception device 100 to efficiently scan the broadcast service.

Figure 29:
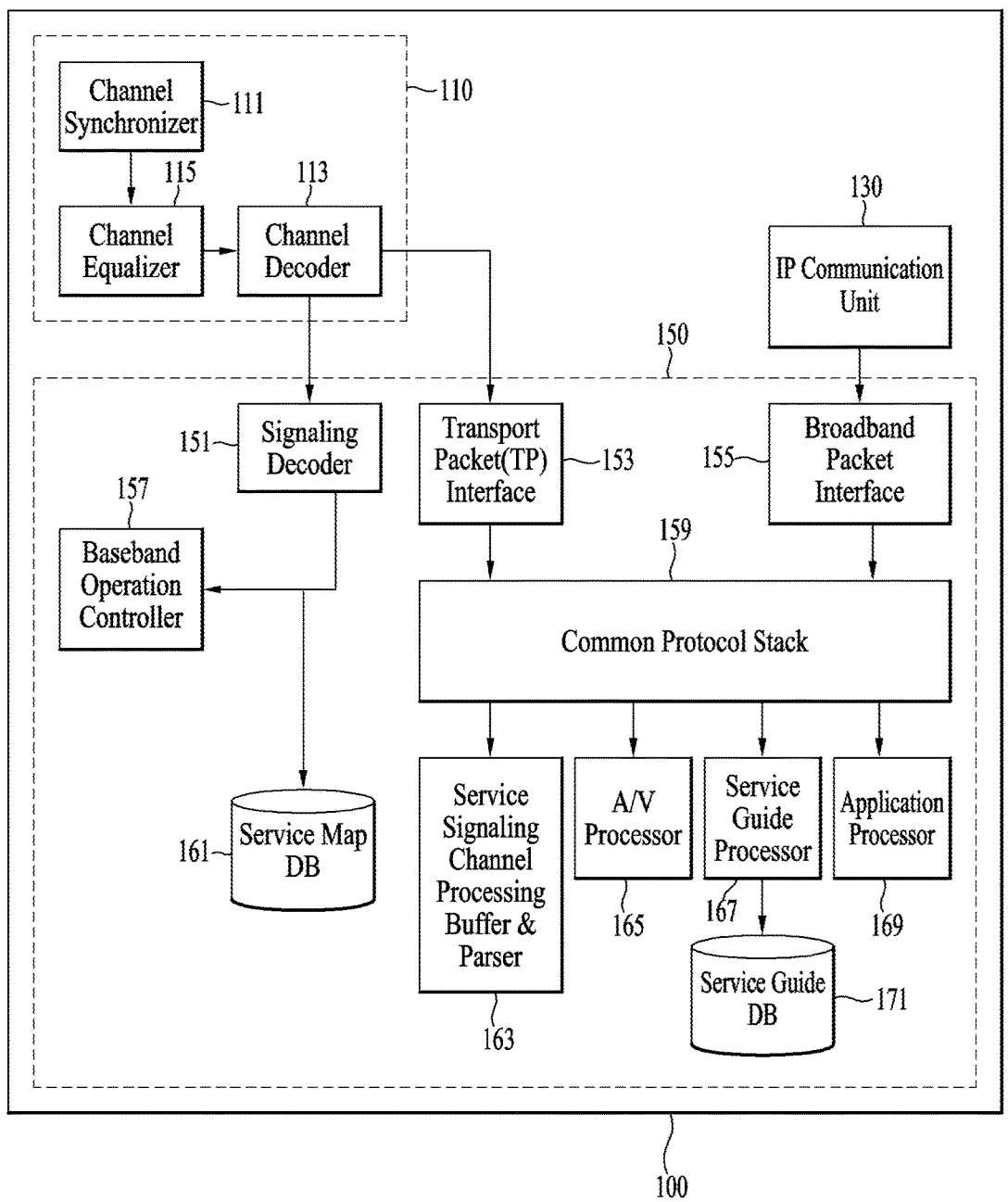
FIG. 29 is a diagram showing the configuration of a broadcast reception device according to one embodiment of the present invention.

FIG. 29 is a diagram showing the configuration of a broadcast reception device according to one embodiment of the present invention.

In the embodiment of FIG. 29, the broadcast reception device 100 includes a receiver 120 and a controller 150. The receiver 120 includes a broadcast receiver 110 and an Internet protocol (IP) communication unit 130.

The broadcast receiver 110 includes a channel synchronizer 111, a channel equalizer 113 and a channel decoder 115.

The channel synchronizer 110 synchronizes a symbol frequency with timing in a manner that a broadcast signal received at baseband can be decoded.

The channel equalizer 113 compensates for distortion of the synchronized broadcast signal. More specifically, the channel equalizer 113 compensates for distortion of the synchronized broadcast signal by multipath, Dopper effect, etc.

The channel decoder 115 decodes the broadcast signal, distortion of which is compensated for. More specifically, the channel decoder 115 extracts a transport frame from the broadcast signal, distortion of which is compensated for. At this time, the channel decoder 115 may perform forward error correction (FEC).

The IP communication unit 130 receives and transmits data via an Internet network.

The controller 150 includes a signaling decoder 151, a transport packet interface 153, a broadband packet interface 155, a baseband operation controller 157, a common protocol stack 159, a service map database 161, a service signaling channel processing buffer and parser 163, an A/V processor 165, a broadcast service guide processor 167, an application processor 169 and a service guide database 171.

The signaling decoder 151 decodes the signaling data of the broadcast signal.

The transport packet interface 153 extracts a transport packet from the broadcast signal. At this time, the transport packet interface 153 may extract data such as signaling information or an IP datagram from the extracted transport packet.

The broadband packet interface 155 extracts an IP packet from the data received from the Internet network. At this time, the broadband packet interface 155 may extract signaling information or an IP datagram from the IP packet.

The baseband operation controller 157 controls operation related to reception of broadcast information from the baseband.

The common protocol stack 159 extracts audio or video from the transport packet.

The A/V processor 547 processes audio or video.

The service signaling channel processing buffer and parser 163 parses and buffers signaling information for signaling a broadcast service. More specifically, the service signaling channel processing buffer and parser 163 may parse and buffer signaling information for signaling the broadcast service from the IP datagram.

The service map database 165 stores a broadcast service list including information on broadcast services.

The service guide processor 167 processes terrestrial broadcast service guide data of the program of a terrestrial broadcast service.

The application processor 169 extracts and processes application related information from the broadcast signal.

The service guide database 171 stores program information of the broadcast service.

Figure 30:
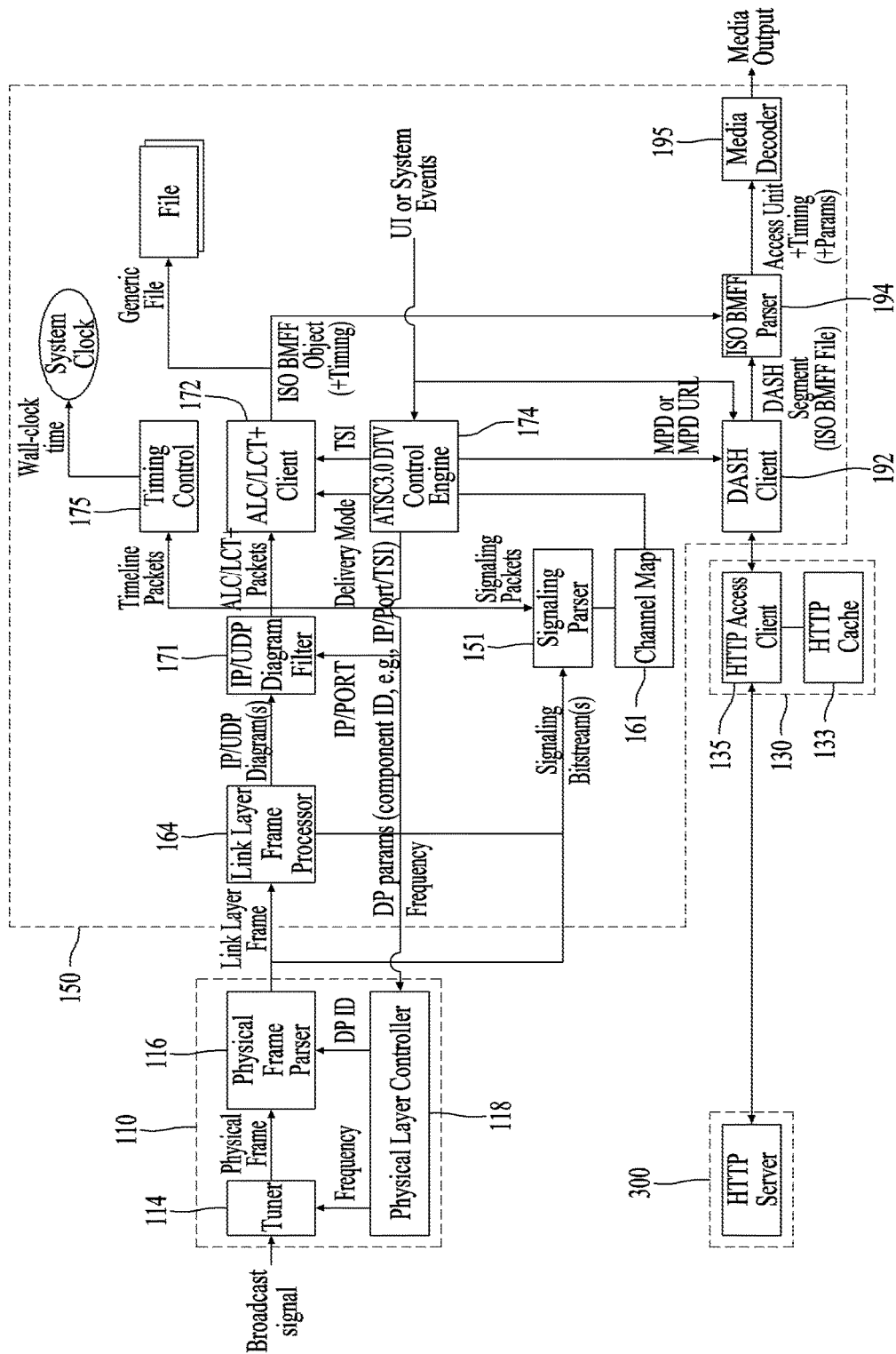
FIGS. 30 to 31 are diagrams showing the configuration of a broadcast reception device according to another embodiment of the present invention.
Figure 31:
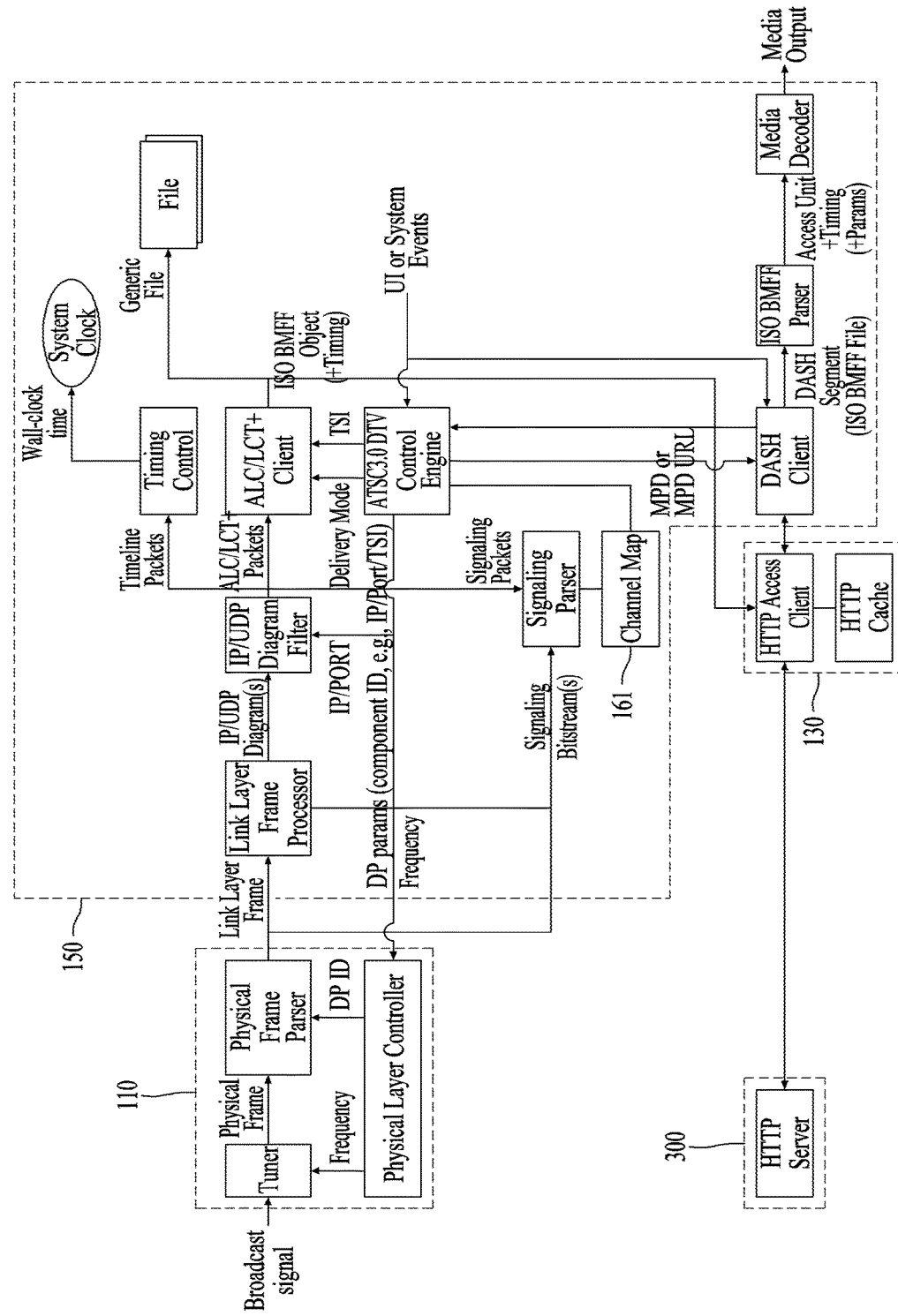

FIGS. 30 to 31 are diagrams showing the configuration of a broadcast reception device according to another embodiment of the present invention.

In the embodiment of FIGS. 30 to 31, the broadcast reception device 100 includes a broadcast receiver 110, an Internet protocol communication unit 130 and a controller 150.

The broadcast receiver 110 may include a tuner 114, a physical frame parser 116 and a physical layer controller 118.

The tuner 114 receives a broadcast signal via a broadcast channel and extracts a physical frame. The physical frame is a transmission unit of a physical layer. The physical frame parser 116 parses the received physical frame and acquires a link layer frame.

The physical layer controller 118 controls operation of the tuner 114 and the physical frame parser 116. In one embodiment, the physical layer controller 118 may control the tuner 114 using RF information of the broadcast channel. More specifically, when the physical layer controller 118 transmits frequency information to the tuner 114, the tuner 114 may acquire the physical frame corresponding to the received frequency information from the broadcast signal.

In another embodiment, the physical layer controller 118 may control operation of the physical layer parser 116 via the identifier of a physical layer pipe. More specifically, the physical layer controller 118 transmits identification information for identifying a specific physical layer pipe among a plurality of physical layer pipes configuring the physical layer pipe to the physical frame parser 116. The physical frame parser 116 may identify the physical layer pipe based on the received identification information and acquire a link layer frame from the identified physical layer pipe.

The controller 150 includes a link layer frame parser 164, an IP/UDP datagram filter 171, a DTV control engine 174, an ALC/LCT+ client 172, a timing control unit 175, a DASH client 192, an ISO BMFF parser 194 and a media decoder 195.

The link layer frame parser 164 extracts data from the link layer frame. More specifically, the link layer frame parser 164 may acquire link layer signaling from the link layer frame. In addition, the link layer frame parser 164 may acquire an IP/UDP datagram from the link layer frame.

The IP/UDP datagram filter 171 filters a specific IP/UDP datagram from the IP/UDP datagram received from the link layer frame parser 164.

The ALC/LCT+ client 172 processes an application layer transport packet. The application layer transport packet may include an ALC/LCT+ packet. More specifically, the ALC/LCT+ client 172 may collect a plurality of application layer transport packets and generate one or more ISO BMFF media file format objects.

The timing control unit 175 processes a packet including system time information. The timing control unit 175 controls a system clock according to the processed result.

The DASH client 182 processes real-time streaming or adaptive media streaming. More specifically, the DASH client 192 may process adaptive media streaming based on the HTTP and acquires a DASH segment. At this time, the DASH segment may be in the form of an ISO BMFF object.

The ISO BMFF parser 194 extracts audio/video data from the ISO BMFF object received from the DASH client 192. At this time, the ISO BMFF parser 194 may extract audio/video data in access units. In addition, the ISO BMFF 194 may acquire timing information for audio/video from the ISO BMFF object.

The media decoder 195 decodes the received audio and video data. In addition, the media decoder 195 presents the decoded result via a media output unit.

The DTV control engine 174 is an interface between modules. More specifically, the DTV control engine 174 may deliver parameters necessary for operation of each module to control operation of each module.

The Internet protocol communication unit 130 may include an HTTP access client 135. The HTTP access client 135 may transmit/receive a request or a response to the request to/from an HTTP server.

Figure 32:
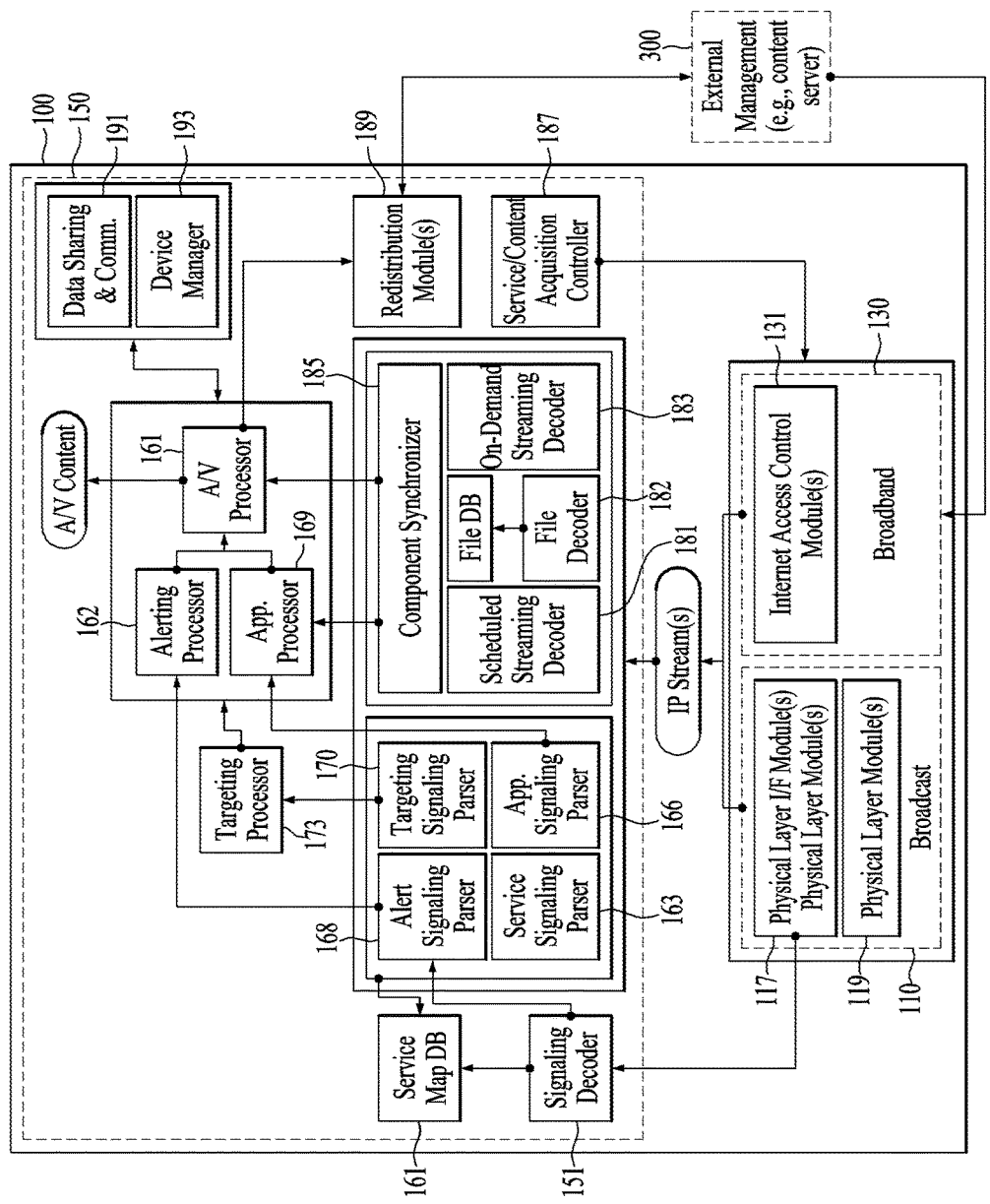
FIG. 32 is a diagram showing the configuration of a broadcast reception device according to another embodiment of the present invention.

FIG. 32 is a diagram showing the configuration of a broadcast reception device according to another embodiment of the present invention.

In the embodiment of FIG. 32, the broadcast reception device 100 includes a broadcast receiver 110, an Internet protocol (IP) communication unit 130 and a controller 150.

The broadcast receiver 110 may include one or a plurality of processors, one or a plurality of circuits and one or a plurality of hardware modules for performing a plurality of functions performed by the broadcast receiver 110. More specifically, the broadcast receiver 110 may be a system on chip (SOC) in which several semiconductor parts are integrated. At this time, the SOC may be a semiconductor device in which various multimedia parts such as graphics, audio, video, modem, etc., a processor, and a semiconductor memory such as a DRAM are integrated. The broadcast receiver 110 may include a physical layer module 119 and a physical layer IP frame module 117. The physical layer module 119 receives and processes a broadcast related signal via a broadcast channel of a broadcast network. The physical layer IP frame module 117 converts a data packet of an IP datagram acquired from the physical layer module 119 into a specific frame. For example, the physical layer module 119 may convert the IP datagram, etc. into an RS frame, a GSE, etc.

The IP communication unit 130 may include one or a plurality of processors, one or a plurality of circuits and one or a plurality of hardware modules for performing a plurality of functions performed by the IP communication unit 130. More specifically, the IP communication unit 130 may be a system on chip (SOC) in which several semiconductor parts are integrated. At this time, the SOC may be a semiconductor device in which various multimedia parts such as graphics, audio, video, modem, etc., a processor, and a semiconductor memory such as a DRAM are integrated. The IP communication unit 130 may include an Internet access control module 131. The Internet access control module 131 controls operation of the broadcast reception device 100 for acquiring at least one of a service, content and signaling data via an Internet communication network (broadband).

The controller 150 may include one or a plurality of processors, one or a plurality of circuits and one or a plurality of hardware modules for performing a plurality of functions performed by the controller 150. More specifically, the controller 150 may be a system on chip (SOC) in which several semiconductor parts are integrated. At this time, the SOC may be a semiconductor device in which various multimedia parts such as graphics, audio, video, modem, etc., a processor, and a semiconductor memory such as a DRAM are integrated. The controller 150 may include at least one of a signaling decoder 151, a service map database 161, a service signaling channel parser 163, an application signaling parser 166, an alert signaling parser 168, a targeting signaling parser 170, a targeting processor 173, an A/V processor 161, an alert processor 162, an application processor 169, a scheduled streaming decoder 181, a file decoder 182, a user request streaming decoder 183, a file database 184, a component synchronizer 185, a service/content acquisition controller 187, a redistribution module 189, a device manager 193 and a data sharing unit 191.

The service/content acquisition controller 187 controls operation of a receiver for acquiring a service, content and signaling data related to the service or content acquired via the broadcast network or the Internet communication network.

The signaling decoder 151 decodes the signaling information.

The service signaling parser 163 parses the service signaling information.

The application signaling parser 166 extracts and parses the signaling information related to the service. At this time, the signaling information related to the service may be signaling information related to service scan. In addition, the signaling information related to the service may be signaling information related to the content provided via the service.

The alert signaling parser 168 extracts and parses the signaling information related to alert.

The targeting signaling parser 170 extracts and parses information for personalization of the service or content or information for signaling targeting information.

The targeting processor 173 processes information for personalizing the service content.

The alert processor 162 processes signaling information related to alert.

The application processor 169 controls execution of an application and application related information. More specifically, the application processor 169 processes the state of the downloaded application and display parameters.

The A/V processor 161 processes operation related to rendering of audio/video based on the decoded audio or video, application data, etc.

The scheduled streaming decoder 181 decodes scheduled streaming which is content streamed according to the schedule previously decided by a content provider such as a broadcaster.

The file decoder 182 decodes the decoded file. In particular, the file decoder 182 decodes the file downloaded via the Internet communication network.

The user request streaming decoder 183 decodes content (on demand content) provided by a user request.

The file database 184 stores the file. More specifically, the file database 184 may store the file downloaded via the Internet communication network.

The component synchronizer 185 synchronizes content or services. More specifically, the component synchronizer 185 synchronizes the presentation time of the content acquired via at least one of the scheduled streaming decoder 181, the file decoder 182 and the user request streaming decoder 183.

The service/content acquisition controller 187 controls operation of the receiver for acquiring at least one of a service, content and signaling information related to the service or content.

The redistribution module 189 performs operation for supporting acquisition of at least one of the service, content, information related to the service and information related to the content when the service or the content is not received via the broadcast network. More specifically, the redistribution module may request at least one of the service, the content, the information related to the service and the information related to the content from an external management device 300. At this time, the external management device 300 may be a content server.

The device manager 193 manages a connectable external device. More specifically, the device manager 193 may perform at least one of addition, deletion and update of the external device. In addition, the external device may be connected to and exchange data with the broadcast reception device 100.

The data sharing unit 191 may perform data transmission operation between the broadcast reception device 100 and the external device and processes exchange related information. More specifically, the data sharing unit 191 may transmit A/V data or signaling information to the external device. In addition, the data sharing unit 191 may receive A/V data or signaling information from the external device.

FIG. 33 is a diagram showing a broadcast transport frame according to one embodiment of the present invention.

In the embodiment of FIG. 33, the broadcast transport frame includes a P1 part, an L1 part, a common PLP part, an interleaved PLP (scheduled & interleaved PLP) part and an auxiliary data part.

In the embodiment of FIG. 33, the broadcast transmission device transmits information on transport signal detection via the P1 part of the broadcast transport frame. In addition, the broadcast transmission device may transmit tuning information for broadcast signal tuning via the P1 part.

In the embodiment of FIG. 33, the broadcast transmission device transmits the configuration of the broadcast transport frame and the characteristics of each PLP via the L1 part. At this time, the broadcast reception device 100 may decode the L1 part based on P1 and acquire the configuration of the broadcast transport frame and the characteristics of each PLP.

In the embodiment of FIG. 33, the broadcast transmission device may transmit information commonly applied to the PLPs via the common PLP part. According to the detailed embodiment, the broadcast transmission frame may not include the common PLP part.

In the embodiment of FIG. 33, the broadcast transmission device transmits a plurality of components included in a broadcast service via the interleaved PLP part. At this time, the interleaved PLP part includes a plurality of PLPs.

In the embodiment of FIG. 33, the broadcast transmission device may signal information on through which PLP the component configuring the broadcast service is signaled via the L1 part or the common PLP part. The broadcast reception device 100 should decode the plurality of PLPs of the interleaved PLP part in order to acquire the detailed broadcast service information, for broadcast service scan.

Unlike the embodiment of FIG. 33, the broadcast transmission device may transmit a broadcast transport frame including a separate part including information on the component included in the broadcast service and the broadcast service transmitted via the broadcast transport frame. At this time, the broadcast reception device 100 may rapidly acquire the broadcast service and information on the components included in the broadcast service via a separate part. This will be described with reference to FIG. 32.

FIG. 34 is a diagram showing a broadcast transport frame according to another embodiment of the present invention.

In the embodiment of FIG. 34, the broadcast transport frame includes a P1 part, an L1 part, a fast information channel (FIC) part, an interleaved PLP (scheduled & interleaved PLP) part and an auxiliary data part.

Parts other than the FIC part are equal to those of the embodiment of FIG. 33.

The broadcast transmission device transmits fast information via the FIC part. The fast information may include configuration information of the broadcast stream transmitted via the transport frame, brief broadcast service information and service signaling related to the service/component. The broadcast reception device 100 may scan the broadcast service based on the FIC part. More specifically, the broadcast reception device 100 may extract the information on the broadcast service from the FIC part.

Figure 35:
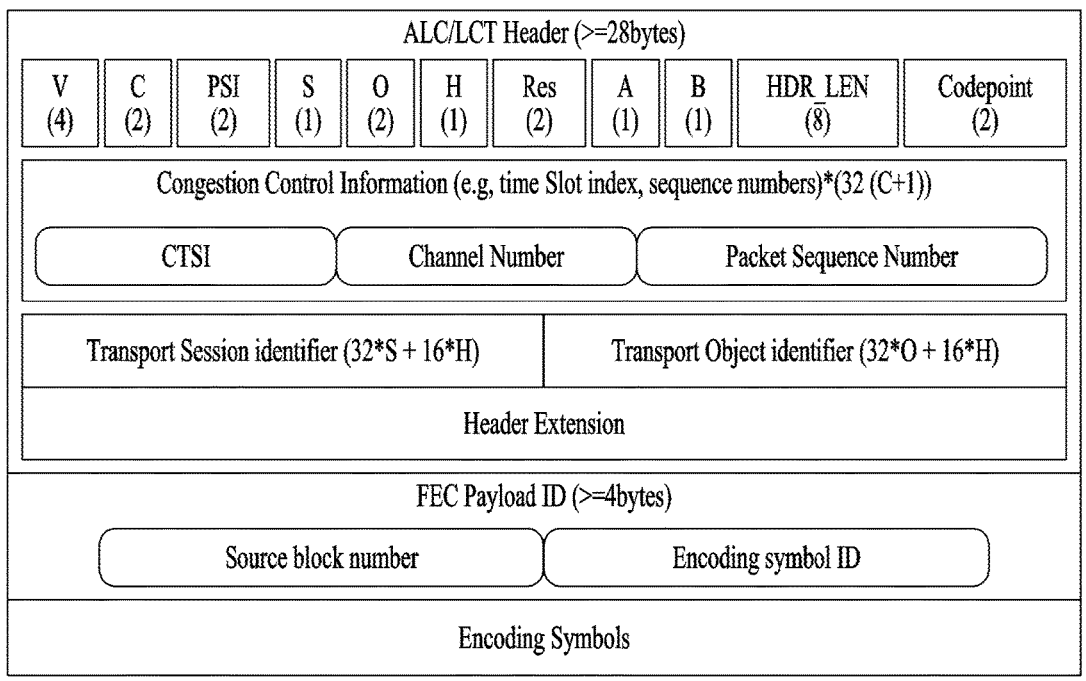
FIG. 35 is a diagram showing the configuration of a transport packet according to one embodiment of the present invention.

FIG. 35 is a diagram showing the configuration of a transport packet according to one embodiment of the present invention. The transport packet shown in FIG. 35 may use a transport protocol supporting reliable data transmission. In a detailed embodiment, the reliable data transmission protocol may be asynchronous layered coding (ALC). In another embodiment, the reliable data transmission protocol may be layered coding transport (LCT).

The packet header according to one embodiment of the present invention may include version information of the packet. More specifically, the packet header may include version information of the transport packet which uses the transport protocol. In the embodiment, the above-described information may be a V field. In addition, the V field may have a size of 4 bits.

In addition, the packet header according to one embodiment of the present invention may include information associated with the length of congestion control information. More specifically, the packet header may include the length of the congestion control information and information on a multiple of the basic unit of the length of the congestion control information.

In a detailed embodiment, the above-described information may be a C field. In one embodiment, the C field may be set to 0x00. In this case, the length of the congestion control information is 32 bits. In another embodiment, the C field may be set to 0x01. In this case, the length of the congestion control information may be 64 bits. In another embodiment, the C field may be set to 0x02. In this case, the length of the congestion control information may be 96 bits. In another embodiment, the C field may be set to 0x03. In this case, the length of the congestion control information may be 128 bits. The C field may have a size of 2 bits.

In addition, the packet header according to one embodiment may include information specialized for the protocol. In a detailed embodiment, the above-described information may be a PSI field. In addition, the PSI field may have a size of 2 bits.

In addition, the packet header according to one embodiment of the present invention may include information associated with the length of the field indicating the identification information of the transport session. More specifically, the packet header may include multiple information of the field indicating the identification information of the transport session. The above-described information may be an S field. The S field may have a size of 1 bit.

In addition, the packet header according to one embodiment of the present invention may include information associated with the length of the field indicating the identification information of the transport object. More specifically, the packet header may include multiple information multiplied with the basic unit of the length of the identification information of the transport object. The above-described information may be an O field. The O field may have a size of 2 bits.

In addition, the packet header according to one embodiment of the present invention may include additional information associated with the length of the field indicating the identification information of the transport session. The packet header may include additional information associated with the length of the field indicating the identification information of the transport object. The additional information may be information indicating whether half-word is added. Since the field indicating the identification information of the transport packet and the field indicating the identification information of the transport object should be present, the S field and the H field or the O field and the H field may not simultaneously indicate 0 (zero).

In addition, the packet header according to one embodiment of the present invention may include information indicating that the session is finished or is about to be finished. The above-described information may be an A field. In a detailed embodiment, the A field may be set to 1 in order to indicate that the session is finished or is about to be finished. Accordingly, generally, the A field may be set to 0. When the broadcast transmission device sets the A field to 1, it is indicated that the last packet is being transmitted via the session. When the A field is set to 1, the broadcast transmission device should maintain the A field to 1 until transmission of all packets following the corresponding packet is finished. In addition, the broadcast reception device may recognize that the broadcast transmission device is about to stop packet transmission via the session when the A field is set to 1. In other words, the broadcast reception device may recognize that packet transmission is no longer performed when the A field is set to 1. In one embodiment, the A field may have a size of 1 bit.

In addition, the packet header according to one embodiment of the present invention may include information indicating that object transmission is finished or is about to be finished. The above-described information may be a B field. In a detailed embodiment, the broadcast transmission device may set the B field to 1 when object transmission is about to be finished. Accordingly, generally, the B field may be set to 0. When the information for identifying the transport object is not present in the transport packet, the B field may be set to 1. This may indicate that transmission of the object in the session identified by out-of-band information is about to be finished. In addition, the B field may be set to 1 when the last packet for the object is transmitted. In addition, the B field may be set to 1 when the last packet for the object is transmitted for several seconds. The broadcast transmission device should set the B field to 1 until transmission of the packet following the corresponding packet is finished, when the B field of the packet for a specific object is set to 1. The broadcast reception device 100 may recognize that the broadcast transmission device will stop transmission of the packet for the object when the B field is set to 1. In other words, the broadcast reception device 100 may recognize that the object is no longer transmitted via the session, from the B field set to 1. In one embodiment, the B field may have a size of 1 bit.

In addition, the packet header according to one embodiment of the present invention may include information indicating the total length of the header. The above-described information may be an HDR_LEN field. The HDR_LEN field may be a multiple of 32 bits. In a detailed embodiment, when the HDR_LEN field is set to 5, the total length of the packet header may be 160 bits which is a multiple of 32. In addition, the HDR_LEN field may be 8 bits.

In addition, the packet header according one embodiment of the present invention may include information related to encoding or decoding of the payload included in the corresponding packet. The above-described information may be referred to as a codepoint field. In one embodiment, the codepoint field may have a size of 8 bits.

In addition, the packet header according to one embodiment of the present invention may include congestion control information. The above-described information may be referred to as a congestion control information (hereinafter, CCI) field. In a detailed embodiment, the CCI field may include at least one of a current time slot index (CTSI) field, a channel number field and a packet sequence number field.

In addition, the packet header according to one embodiment of the present invention may include information for identifying the transport session. The above-described information may be a transport session identifier (hereinafter, TSI). In addition, the field in the packet header including TSI information may be a TSI field.

In addition, the packet header according to one embodiment of the present invention may include information for identifying the object transmitted via the transport session. The above-described information may be a transport object identifier (hereinafter, TOI). In addition, the field in the packet header including the TOI information may be a TOI field.

In addition, the packet header according to one embodiment of the present invention may include information for transmitting additional information. The above-described information may be referred to as a header extension field. In one embodiment, the additional information may be time information related to presentation of the transport object. In another embodiment, the additional information may be time information related to decoding of the transport object.

In addition, the transport packet according to one embodiment of the present invention may include payload identification information. In one embodiment, the identification information may be payload identification information associated with a forward error correction (FEC) scheme. Here, FEC is a type of the payload format defined in RFC 5109. The FEC may be used in the RTP or SRTP. The above-described information may be an FEC payload ID field.

In one embodiment, the FEC payload ID field may include information for identifying the source block of the object. The above-described information may be a source block number field. For example, when the source block number field is set to N, the source block in the object may be numbered from 0 to N−1.

In another embodiment, the FEC payload ID field may include information for identifying a specific encoding symbol. The above-described information may be an encoding ID field.

In addition, in one embodiment of the present invention, the transport packet may include data in a payload. The field including the above-described data may be an encoding symbol(s) field. In one embodiment, the broadcast reception device 100 may extract the encoding symbol(s) field and reconfigure the object. More specifically, the data in the encoding symbol(s) field may be generated from the source block transmitted via the packet payload.

FIG. 36 is a diagram showing the configuration of a service signaling message according to one embodiment of the present invention. More specifically, FIG. 36 shows the syntax of the service signaling message header according to one embodiment of the present invention. The service signaling message according to one embodiment of the present invention may include a signaling message header and a signaling message. At this time, the signaling message may be represented in binary or XML format. In addition, the service signaling message may be included in the payload of the transport protocol packet.

The signaling message header according to the embodiment of FIG. 36 may include the identification information for identifying the signaling message. For example, the signaling message may be in the form of a section. In this case, the identification information of the signaling message may indicate the identifier (ID) of the signaling table section. The field indicating the identification information of the signaling message may be signaling_id. In a detailed embodiment, the signaling_id field may have a size of 8 bits.

The signaling message header according to the embodiment of FIG. 36 may include length information indicating the length of the signaling message. The field indicating the length information of the signaling message may be signaling_length. In a detailed embodiment, the signaling_length field may have a size of 12 bits.

In addition, the signaling message header according to the embodiment of FIG. 36 may include identifier extension information for extending the identifier of the signaling message. At this time, the identifier extension information may be information for identifying signaling along with signaling identifier information. The field indicating the identifier extension information of the signaling message may be signaling_id_extension.

At this time, the identifier extension information may include protocol version information of the signaling message. The field indicating the protocol version information of the signaling message may be protocol_version. In a detailed embodiment, the protocol_version field may have a size of 8 bits.

In addition, the signaling message header according to the embodiment of FIG. 36 may include the version information of the signaling message. The version information of the signaling message may be changed when the information included in the signaling message is changed. The field indicating the version information of the signaling message may be version_number. In a detailed embodiment, the version_number field may have a size of 5 bits.

In addition, the signaling message header according to the embodiment of FIG. 36 may include information indicating whether the signaling message is currently available. The field indicating whether the signaling message is available may be current_next_indicator. For example, when the current_next_indicator field is 1, the current_next_indicator field may indicate that the signaling message is available. As another example, when the current_next_indicator field is 0, the current_next_indicator field may indicate that the signaling message is not available and another signaling message including the same signaling identification information, signaling identifier extension information or fragment number information is available.

In addition, the signaling message header according to the embodiment of FIG. 36 may include fragment number information of the signaling message. One signaling message may be divided into a plurality of fragments and transmitted. Accordingly, information for identifying the plurality of fragments by the receiver may be fragment number information. The field indicating the fragment number information may be a fragment_number field. In a detailed embodiment, the fragment_number field may have a size of 8 bits.

In addition, the signaling message header according to the embodiment of FIG. 36 may include number information of a last fragment when one signaling message is divided into a plurality of fragments. For example, when information on a last fragment number is 3, this indicates that the signaling message is divided into three fragments. In addition, this may indicate that the fragment including the fragment number of 3 includes the last data of the signaling message. The field indicating the number information of the last fragment may be last_fragment_number. In a detailed embodiment, the last_fragment_number field may have a size of 8 bits.

FIG. 37 is a diagram showing the configuration of a service signaling message according to one embodiment of the present invention. More specifically, FIG. 37 shows the syntax of the service signaling message header according to one embodiment of the present invention. The service signaling message according to one embodiment of the present invention may include a signaling message header and a signaling message. At this time, the signaling message may be represented in binary or XML format. In addition, the service signaling message may be included in the payload of the transport protocol packet.

The signaling message header according to the embodiment of FIG. 37 may include identifier information for identifying the signaling message. For example, the signaling message may be in the form of a section. In this case, the identifier information of the signaling message may indicate the identifier (ID) of the signaling table section. The field indicating the identifier information of the signaling message may be signaling_id. In a detailed embodiment, the signaling_id field may have a size of 8 bits.

The signaling message header according to the embodiment of FIG. 37 may include length information indicating the length of the signaling message. The field indicating the length information of the signaling message may be signaling_length. In a detailed embodiment, the signaling_length field may have a size of 12 bits.

The signaling message header according to the embodiment of FIG. 37 may have identifier extension information for extending the identifier of the signaling message. At this time, the identifier extension information may be information for identifying signaling along with signaling identifier information. The field indicating the identifier extension information of the signaling message may be signaling_id_extension.

At this time, the identifier extension information may include protocol version information of the signaling message. The field indicating the protocol version information of the signaling message may be protocol_version. In a detailed embodiment, the protocol_version field may have a size of 8 bits.

In addition, the signaling message header according to the embodiment of FIG. 37 may include the version information of the signaling message. The version information of the signaling message may be changed when the information included in the signaling message is changed. The field indicating the version information of the signaling message may be version_number. In a detailed embodiment, the version_number field may have a size of 5 bits.

In addition, the signaling message header according to the embodiment of FIG. 37 may include information indicating whether the signaling message is currently available. The field indicating whether the signaling message is available may be current_next_indicator. For example, when the current_next_indicator field is 1, the current_next_indicator field may indicate that the signaling message is available. As another example, when the current_next_indicator field is 0, the current_next_indicator field may indicate that the signaling message is not available and another signaling message including the same signaling identification information, signaling identifier extension information or fragment number information is available.

In addition, the signaling message header according to the embodiment of FIG. 37 may include the format information of the signaling message included in the payload. As described above, the signaling message may be represented in binary or XML format. In addition, the signaling message may be represented in other formats. Accordingly, the format information may indicate the format of the signaling message included in the payload and may indicate binary, XML, etc., for example. The field indicating the format information may be a payload_format field. In a detailed embodiment, the payload_format field may have a size of 2 bits.

In addition, the signaling message header according to the embodiment of FIG. 37 may include valid time information of the signaling message included in the payload. The valid time information of the signaling message may include information on the valid time of the signaling message. After the time defined in this field, the signaling message is no longer valid. The field indicating the valid time information may be an expiration field. In a detailed embodiment, the expiration field may have a size of 32 bits.

In addition, the signaling message header according to the embodiment of FIG. 37 may include fragment number information of the signaling message. One signaling message may be divided into a plurality of fragments and transmitted. Information for identifying the plurality of fragments by the receiver may be fragment number information. The field indicating the fragment number information may be a fragment_number field. In a detailed embodiment, the fragment_number field may have a size of 8 bits.

In addition, the signaling message header according to the embodiment of FIG. 37 may include number information of a last fragment when one signaling message is divided into a plurality of fragments. For example, when information on a last fragment number is 3, this indicates that the signaling message is divided into three fragments. In addition, this may indicate that the fragment including the fragment number of 3 includes the last data of the signaling message. The field indicating the number information of the last fragment may be last_fragment_number. In a detailed embodiment, the last_fragment_number field may have a size of 8 bits.

FIG. 38 is a diagram showing the configuration of a broadcast service signaling message in a next generation broadcast system according to one embodiment of the present invention. The broadcast service signaling message according to one embodiment is for a broadcast service signaling method for enabling the broadcast reception device 100 to receive at least one of a broadcast service and content in the next generation broadcast system.

The broadcast service signaling method according to the embodiment of FIG. 38 may be based on the configuration of the signaling message shown in FIG. 36. The broadcast service signaling message according to the embodiment of FIG. 38 may be transmitted via a service signaling channel. At this time, the service signaling channel may be a physical layer pipe for directly transmitting the service signaling information for broadcast service scan without passing through other layers. In a detailed embodiment, the service signaling channel may be referred to as at least one of a fast information channel (FIC), low layer signaling (LLS) and an application layer transport session. The broadcast service signaling message according to the embodiment of FIG. 38 may be in an XML format.

The service signaling message according to the embodiment of FIG. 38 may include information on the number of services included therein. More specifically, one service signaling message may include a plurality of services and include information on the number of services included therein. The information on the number of services may be a num_services field. In a detailed embodiment, the num_services field may have a size of 8 bits.

In addition, the service signaling message according to the embodiment of FIG. 38 may include identifier information of the service. The identifier information may be a service_id field. In a detailed embodiment, the service_id field may have a size of 16 bits.

In addition, the service signaling message according to the embodiment of FIG. 38 may include service type information. The service type information may be a service_type field. In a detailed embodiment, when the service_type field has a value of 0x00, the service type indicated by the signaling message may be a scheduled audio service.

In another embodiment, when the service_type field has a value of 0x01, the service type indicated by the signaling message may be a scheduled audio/video service. At this time, the scheduled audio/video service may be an audio/video service broadcast according to a predetermined schedule.

In another embodiment, when the service_type field has a value of 0x02, the service type indicated by the signaling message may be an on-demand service. At this time, the on-demand service may be an audio/video service presented by the request of the user. In addition, the on-demand service may be a service having a concept opposed to that of the scheduled audio/video service.

In another embodiment, when the service_type field has a value of 0x03, the service type indicated by the signaling message may be an app-based service. At this time, the app-based service is not a real-time broadcast service but is a non-real-time service and is provided via an application. The app-based service may include at least one of a service associated with a real-time broadcast service and a service not associated with the real-time broadcast service. The broadcast reception device 100 may download an application and provide an app-based service.

In another embodiment, when the service_type field has a value of 0x04, the service type indicated by the signaling message may be a rights issuer service. At this time, the rights issuer service may be provided to only a person who has rights to receive a service.

In another embodiment, when the service_type field has a value of 0x05, the service type indicated by the signaling message may be a service guide service. At this time, the service guide service may provide information on a provided service. For example, the information on the provided service may be a broadcast schedule.

In addition, the service signaling message according to the embodiment of FIG. 38 may include service name information. The service name information may be a short_service_name field.

In addition, the service signaling message according to the embodiment of FIG. 38 may include length information of the short_service_name field. The length information of the short_service_name field may be a short_service_name length field.

In addition, the service signaling message according to the embodiment of FIG. 38 may include may include broadcast service channel number information associated with a service. The associated broadcast service channel number information may be a channel number field.

In addition, the service signaling message according to the embodiment of FIG. 38 may include data necessary for the broadcast reception device to acquire a timebase or a signaling message according to the transport mode. The data necessary to acquire the timebase or the signaling message may be a bootstrap( ) field.

The transport mode may be at least one of a timebase transport mode and a signaling transmission mode. The timebase transport mode may be a transport mode for timebase including metadata on a timeline used for a broadcast service. The timeline is a series of time information for media content. More specifically, the timeline may be a series of reference times which is a media content presentation criterion. Information on the timebase transport mode may be a timebase_transport_mode field.

In addition, the signaling transmission mode may be a mode for transmitting a signaling message used in a broadcast service. The information on the signaling transport mode may be a signaling_transport_mode field.

FIG. 39 is a diagram showing the meaning of the value of a timebase_transport_mode field and a signaling_transport_mode field in a service signaling message according to one embodiment of the present invention.

The timebase transport mode may include a mode in which the broadcast reception device 100 acquires the timebase of the broadcast service via an IP datagram in the same broadcast stream. According to the embodiment, when the timebase_transport_mode field has a value of 0x00, the timebase_transport_mode field may indicate that the broadcast reception device may acquire the timebase of the broadcast service via the IP datagram in the same broadcast stream.

In addition, the signaling transport mode may include a mode in which the broadcast reception device 100 acquires the signaling message used for the broadcast service via an IP datagram in the same broadcast stream. According to another embodiment, when the signaling_transport_mode field has a value of 0x00, the signaling_transport_mode field may indicate that the broadcast reception device acquires the signaling message used for the broadcast service via the IP datagram in the same broadcast stream. The same broadcast stream may mean the same broadcast stream as the broadcast stream used for the broadcast reception device to receive the current service signaling message. In addition, the IP datagram may be a transport unit in which the component configuring the broadcast service or content is encapsulated according to the Internet protocol. In this case, the bootstrap( ) field of the timebase and the signaling message may follow the shown syntax. The shown syntax may be represented in XML format.

FIG. 40 is a diagram showing the syntax of the bootstrap( ) field when the timebase_transport_mode field and the signaling_transport_mode field have a value of 0x00 in one embodiment of the present invention.

In the embodiment, bootstrap data may include information on an IP address format of an IP datagram including the timebase or the signaling message. The information on the IP address format may be an IP_version_flag field. The information on the IP address format may indicate that the IP address format of the IP datagram is IPv4. In one embodiment, when the information on the IP address format is 0, the information on the IP address may indicate that the IP address format of the IP datagram is IPv4. The information on the IP address format may indicate that the IP address format of the IP datagram is IPv6. In one embodiment, when the information on the IP address format is 1, the information on the IP address may indicate that the IP address format of the IP datagram is IPv6.

In the embodiment, the bootstrap data may include information indicating whether the IP datagram including the timebase or the signaling message includes a source IP address. At this time, the source IP address may be a source address of the IP datagram. Information indicating whether the IP datagram includes the source IP address may be a source_IP_address_flag field. In one embodiment, when the source_IP_address_flag field is 1, this may indicate that the IP datagram includes the source IP address.

In the embodiment, the bootstrap data may include information indicating whether the IP datagram including the timebase or the signaling message includes a destination IP address. At this time, the destination IP address may be a destination address of the IP datagram. Information indicating whether the IP datagram includes the destination IP address may be a destination_IP_address_flag field. In one embodiment, when the destination_IP_address_flag field is 1, this may indicate that the IP datagram includes the destination IP address.

In the embodiment, the bootstrap data may include source IP address information of the IP datagram including the timebase or the signaling message. The source IP address information may be a source_IP_address field.

In the embodiment of FIG. 39, the bootstrap data may include destination IP address information of the IP datagram including the timebase or the signaling message. The destination IP address information may be a destination_IP_address field.

In the embodiment, the bootstrap data may include information on the number of flow ports of the IP datagram including the timebase or the signaling message. At this time, the port may be a passage for receiving the flow of the IP datagram. The information indicating the number of user datagram protocol (UDP) ports of the IP datagram may be a port_num_count field.

In the embodiment, the bootstrap data may include information on a user data protocol (UDP) port number of the IP datagram including the timebase or the signaling message. The user datagram protocol (UDP) is a communication protocol for unidirectionally sending information via the Internet without exchanging information.

The description now returns to FIG. 39.

The timebase transport mode may include a mode in which the broadcast reception device 100 acquires the timebase of the broadcast service via the IP datagram in a different broadcast stream. According to another embodiment of FIG. 39, when the timebase_transport_mode field has a value of 0x01, the timebase_transport_mode field may indicate that the timebase of the broadcast service is acquired via the IP datagram in the different broadcast stream. The different broadcast stream may mean the broadcast stream different from the broadcast stream for receiving the current service signaling message.

In addition, the signaling transmission mode may include a mode in which the broadcast reception device 100 acquires the signaling message used for the broadcast service via the IP datagram in the different broadcast stream. According to another embodiment, when the signaling_transport_mode field has a value of 0x01, the signaling_transport_mode field may indicate that the signaling message used for the broadcast service is acquired via the IP datagram in the different broadcast stream. In this case, the bootstrap( ) field of the timebase and the signaling message may follow the syntax shown in FIG. 41. The syntax shown in FIG. 41 may be represented in XML format.

The bootstrap data according to the embodiment of FIG. 41 may include identifier information of a broadcaster for transmitting the signaling message. More specifically, the bootstrap data may include unique identifier information of a specific broadcaster for transmitting the signaling message via a specific frequency or a transport frame. The identifier information of the broadcaster may be a broadcasting_id_ field. In addition, the identifier information of the broadcaster may be identifier information of the transport stream for transmitting the broadcast service.

The description now returns to FIG. 39.

The timebase transport mode may include a mode in which the broadcast reception device 100 acquires the timebase via a session based flow in the same broadcast stream.

According to another embodiment of FIG. 39, when the timebase_transport_mode field has a value of 0x02, this may indicate that the timebase of the broadcast service is acquired via the session based flow in the same broadcast stream. The signaling transport mode may include a mode in which the broadcast reception device 100 acquires the signaling message via a session based flow in the same broadcast stream. The signaling transport mode may include a mode in which the broadcast reception device 100 acquires the signaling message used for the broadcast service via the session based flow in the same broadcast stream. When the signaling_transport_mode field has a value of 0x02, this may indicate that the signaling message used for the broadcast service is acquired via the application layer transport session based flow in the same broadcast stream. At this time, the application layer transport session based flow may be any one of an asynchronous layered coding (ALC)/layered coding transport (LCT) session and a file delivery over unidirectional transport (FLUTE) session.

In this case, the bootstrap( ) field of the timebase and the signaling message may follow the syntax shown in FIG. 42. The syntax shown in FIG. 42 may be represented in XML format.

The bootstrap data according to the embodiment of FIG. 42 may include transport session identifier information of an application layer for transmitting an application layer transport packet including the timebase or the signaling message. At this time, the session for transmitting the transport packet may be any one of an ALC/LCT session and a FLUTE session. The transport session identifier information of the application layer may be a tsi field.

The description now returns to FIG. 39.

The timebase transport mode may include a mode in which the broadcast reception device 100 acquires the timebase via a session based flow in the different broadcast stream. According to another embodiment of FIG. 39, when the timebase_transport_mode field has a value of 0x03, this may indicate that the timebase of the broadcast service is acquired via the session based flow in the different broadcast stream. The signaling transport mode may include a mode in which the broadcast reception device 100 acquires the signaling message via a session based flow in the same broadcast stream. When the signaling_transport_mode field has a value of 0x03, this may indicate that the signaling message used for the broadcast service is acquired via the application layer transport session based flow in the different broadcast stream. At this time, the application layer transport session based flow may be any one of an asynchronous layered coding (ALC)/layered coding transport (LCT) session and a file delivery over unidirectional transport (FLUTE) session.

In this case, the bootstrap( ) field of the timebase and the signaling message may follow the syntax shown in FIG. 43. The syntax shown in FIG. 43 may be represented in XML format.

The bootstrap data according to the embodiment of FIG. 43 may include identifier information of a broadcaster for transmitting the signaling message. More specifically, the bootstrap data may include unique identifier information of a specific broadcaster for transmitting the signaling message via a specific frequency or a transport frame. The identifier information of the broadcaster may be a broadcasting_id field. In addition, the identifier information of the broadcaster may be identifier information of the transport stream of the broadcast service.

The description returns to FIG. 39.

The timebase transport mode may include a mode in which the broadcast reception device 100 acquires the timebase via a packet based flow in the same broadcast stream. According to another embodiment of FIG. 39, when the timebase_transport_mode field has a value of 0x04, this may indicate that the timebase of the broadcast service is acquired via the packet based flow in the same broadcast stream. At this time, the packet based flow may be an MPEG media transport (MMT) packet flow.

The signaling transport mode may include a mode in which the broadcast reception device 100 acquires the signaling message via the packet based flow in the same broadcast stream. When the signaling_transport_mode field has a value of 0x04, this may indicate that the signaling message used for the broadcast service is acquired via the transport packet based flow in the same broadcast stream. At this time, the packet based flow may be an MMT packet flow.

In this case, the bootstrap( ) field of the timebase and the signaling message may follow the syntax shown in FIG. 44. The syntax shown in FIG. 44 may be represented in XML format.

The bootstrap data according to the embodiment of FIG. 44 may include identifier information of a transport packet for transmitting the timebase or the signaling message. The identifier information of the transport packet may be a packet_id field. The identifier information of the transport packet may be identifier information of the MPEG-2 transport stream.

The description returns to FIG. 39.

The timebase transport mode may include a mode in which the broadcast reception device 100 acquires the timebase via a packet based flow in the different broadcast stream.

According to another embodiment of FIG. 39, when the timebase_transport_mode field has a value of 0x05, this may indicate that the timebase of the broadcast service is acquired via the packet based flow in the different broadcast stream. At this time, the packet based flow may be an MPEG media transport packet flow.

The signaling transport mode may include a mode in which the broadcast reception device 100 acquires the signaling message via a packet based flow in the different broadcast stream. When the signaling_transport_mode field has a value of 0x05, this may indicate that the signaling message used for the broadcast service is acquired via the packet based flow in the different broadcast stream. At this time, the packet based flow may be an MMT packet flow.

In this case, the bootstrap( ) field of the timebase and the signaling message may follow the syntax shown in FIG. 45. The syntax shown in FIG. 45 may be represented in XML format.

The bootstrap data according to the embodiment of FIG. 45 may include identifier information of a broadcaster for transmitting the signaling message. More specifically, the bootstrap data may include unique identifier information of a specific broadcaster for transmitting the signaling message via a specific frequency or a transport frame. The identifier information of the broadcaster may be a broadcasting_id field. In addition, the identifier information of the broadcaster may be identifier information of the transport stream of the broadcast service.

The bootstrap data according to the embodiment of FIG. 45 may include identifier information of a transport packet for transmitting the timebase or the signaling message. The identifier information of the transport packet may be a packet_id field. The identifier information of the transport packet may be identifier information of an MPEG-2 transport stream.

The description returns to FIG. 39.

The timebase transport mode may include a mode in which the broadcast reception device 100 acquires the timebase via a URL.

According to another embodiment of FIG. 39, when the timebase_transport_mode field has a value of 0x06, this may indicate that the timebase of the broadcast service is acquired via the URL. The signaling transport mode may include a mode in which the broadcast reception device 100 acquires the signaling message via the URL. When the signaling_transport_mode field has a value of 0x06, this may indicate that the signaling message used for the broadcast service is acquired via the identifier for identifying the reception address of the signaling message used for the broadcast service. At this time, the identifier for identifying the reception address of the signaling message used for the broadcast service may be a URL.

In this case, the bootstrap( ) field of the timebase and the signaling message may follow the syntax shown in FIG. 46. The syntax shown in FIG. 46 may be represented in XML format.

The bootstrap data according to the embodiment of FIG. 46 may include length information of the URL where the timebase or the signaling message of the broadcast service is downloaded. The URL length information may be a URL_length field.

The bootstrap data according to the embodiment of FIG. 46 may include actual data of the URL where the timebase or the signaling message of the broadcast service is downloaded. The actual data of the URL may be a URL_char field.

FIG. 47 is a diagram showing a process of acquiring a timebase and a service signaling message in the embodiments of FIGS. 38 to 46.

As shown in FIG. 47, the broadcast reception device 100 according to one embodiment of the present invention may acquire the timebase via a packet based transport protocol. More specifically, the broadcast reception device 100 may acquire the timebase via an IP/UDP flow using a service signaling message. In addition, the broadcast reception device 100 according to one embodiment of the present invention may acquire a service related signaling message via a session based transport protocol. More specifically, the broadcast reception device 100 may acquire a service related signaling message via an ALC/LCT transport session.

FIG. 48 is a diagram showing the configuration of a broadcast service signaling message in a next generation broadcast system according to one embodiment of the present invention. The broadcast service signaling message according to one embodiment is for a service signaling method for enabling the broadcast reception device to receive a broadcast service and content in the next generation broadcast system. The broadcast service signaling method according to the embodiment may be based on the above-described signaling message configuration. The broadcast service signaling message according to the embodiment may be transmitted via a service signaling channel. At this time, the service signaling channel may be a physical layer pipe for directly transmitting the service signaling information for broadcast service scan without passing through other layers.

In a detailed embodiment, the signaling channel may be referred to as at least one of a fast information channel (FIC), low layer signaling (LLS) and an application layer transport session. The broadcast service signaling message according to the embodiment may be represented in XML format.

The service signaling message according to the embodiment of FIG. 48 may include information indicating whether the service signaling message includes information necessary to acquire the timebase. At this time, the timebase may include metadata on the timeline used for the broadcast service. The timeline is a series of time information for media content. Information indicating whether information for acquiring the timebase is included may be a timeline_transport_flag field. In one embodiment, when the timeline_transport_flag field has a value of 1, this may indicate that the service signaling message includes information for transmitting the timeline.

The service signaling message according to the embodiment of FIG. 48 may include data necessary for the broadcast reception device to acquire the timeline or the signaling message according to the transport mode. The data for acquiring the timeline or the signaling message may be a bootstrap_data( ) field.

The transport mode may be at least one of a timebase transport mode and a signaling transport mode. The timebase transport mode may be a transport mode for the timebase including metadata on the timeline used for the broadcast service. The information on the timebase transport mode may be a timebase_transport_mode field.

In addition, the signaling transport mode may be a mode for transmitting the signaling message used for the broadcast service. The information on the signaling transport mode may be a signaling_transport_mode field.

In addition, the meaning of the bootstrap_data( ) field according to the timeline_transport_mode field and the signaling_transport_mode field may be equal to the above description.

FIG. 49 is a diagram showing the configuration of a broadcast service signaling message in a next generation broadcast system according to one embodiment of the present invention. The broadcast service signaling message according to one embodiment is a service signaling method for enabling the broadcast reception device to receive a broadcast service and content in the next generation broadcast system. The broadcast service signaling method according to the embodiment may be based on the above-described signaling message configuration. The broadcast service signaling message according to the embodiment may be transmitted via a service signaling channel. At this time, the service signaling channel may be a physical layer pipe for directly transmitting the service signaling information for broadcast service scan without passing through other layers. In a detailed embodiment, the signaling channel may be referred to as at least one of a fast information channel (FIC), low layer signaling (LLS) and an application layer transport session. The broadcast service signaling message according to the embodiment of FIG. 48 may be represented in XML format.

The service signaling message according to the embodiment may include information indicating whether the service signaling message includes information necessary to acquire the timebase. At this time, the timebase may include metadata on the timeline used for the broadcast service. The timeline is a series of time information for media content. Information indicating whether information for acquiring the timebase is included may be a timeline_transport_flag field. In one embodiment, when the timeline_transport_flag field has a value of 1, this may indicate that the service signaling message includes information for transmitting the timeline.

The service signaling message according to the embodiment may include information indicating whether the signaling message includes data necessary to acquire the service signaling message. At this time, the signaling message may be media presentation data (MPD) used for the broadcast service or a signaling message related to an MPD URL. The information indicating whether the information necessary to acquire the signaling message is included may be an MPD_transport_flag field. In one embodiment, when the MPD_transport_flag field has a value of 1, this may indicate that the service signaling message includes MPD or information on transmission of the signaling message related to the MPD URL. HTTP based adaptive media streaming may be referred to as dynamic adaptive streaming over HTTP (DASH). In adaptive media streaming, detailed information for enabling the broadcast reception device to acquire the segment configuring the broadcast service and content may be referred to as MPD. The MPD may be represented in XML format. The MPD URL related signaling message may include address information capable of acquiring the MPD.

In addition, the service signaling message according to the embodiment may indicate whether the service signaling message includes acquisition path information of component data. At this time, the component may be the unit of content data for providing the broadcast service. The information indicating whether the acquisition path information of the component data is included may be a component_location_transport_flag field. In one embodiment, when the component_location_transport_flag field has a value of 1, the component_location_transport_flag field may indicate that the service signaling message includes the acquisition path information of the component data.

In addition, the service signaling message according to the embodiment may indicate whether information necessary to acquire an application related signaling message is included. The information indicating whether the information necessary to acquire the application related signaling message is included may be an app_signaling_transport_flag field. In one embodiment, when the app_signaling_transport_flag field has a value of 1, the app_signaling_transport_flag field may indicate that the service signaling message includes acquisition path information of the component data.

In addition, the service signaling message according to the embodiment may indicate whether signaling message transmission related information is included. The information indicating whether the signaling message transmission related information is included may be a signaling_transport_flag field. In one embodiment, when the signaling_transport_flag field has a value of 1, the signaling_transport_flag field may indicate that the service signaling message includes the signaling message transmission related information. When the service signaling message does not include the above-described MPD related signaling, component acquisition path information and application related signaling information, the broadcast reception device may acquire the MPD related signaling, component acquisition path information and application related signaling information via the signaling message transport path.

The service signaling message according to the embodiment may indicate a mode for transmitting the timebase used for the broadcast service. The information on the mode for transmitting the timebase may be a timebase_transport_mode field.

The service signaling message according to the embodiment may indicate a mode for transmitting an MPD or MPD URL related signaling message used for the broadcast service. The information on the mode for transmitting an MPD or MPD URL related signaling message may be an MPD_transport_mode field.

The service signaling message according to the embodiment may indicate a mode for transmitting a component location signaling message including the acquisition path of the component data used for the broadcast service. The information on the mode for transmitting the component location signaling message including the acquisition path of the component data may be a component_location_transport_mode field.

The service signaling message according to the embodiment may indicate a mode for transmitting an application related signaling message used for the broadcast service. The information for transmitting the application related signaling message may be an app_signaling_transport_mode field.

The service signaling message according to the embodiment may indicate a mode for transmitting a service related signaling message used for the broadcast service. The information on the mode for transmitting the service related signaling message may be a signaling_transport_mode field.

The meanings of the values of the timebase_transport_mode field, the MPD_transport_mode field, the component_location_transport_mode field, the app_signaling_transport_mode field and the signaling_transport_mode field will now be described.

FIG. 50 is a diagram showing the meaning of the value of each transport mode. The X_transport_mode may include a timebase_transport_mode, an MPD_transport_mode, a component_location_transport_mode, an app_signaling_transport_mode and a signaling_transport_mode. The detailed meaning of the value of each transport mode is equal to the above description.

The service signaling message according to the embodiment of FIG. 49 may include information necessary for the broadcast reception device to acquire the timeline or the signaling message according to the value of each mode. The information necessary to acquire the timebase or the signaling message may be a bootstrap_data( ) field. More specifically, the information included in the bootstrap_data( ) is equal to the above description.

FIG. 51 is a diagram showing the configuration of a signaling message for signaling a component data acquisition path of a broadcast service in a next generation broadcast system. In the next generation broadcast system, one broadcast service may be composed of one or more components. Based on the signaling message according to the embodiment, the broadcast reception device may acquire information on the acquisition path of the component data and related application in the broadcast stream. At this time, the signaling message according to the embodiment may be represented in XML format.

The signaling message according to the embodiment may include information indicating that the signaling message is a message for signaling a component location. The information indicating that the signaling message is the message for signaling the component location may be a signaling_id field. In a detailed embodiment, the signaling_id field may have a size of 8 bits.

In addition, the signaling message according to the embodiment may include extension information indicating that the signaling message is a message for signaling a component location. At this time, the extension information includes a protocol version of a message for signaling a component location. The extension information may be a signaling_id_extension field.

In addition, the signaling message according to the embodiment of FIG. 50 may include version information of the message for signaling the component location. At this time, the version information may indicate that the information of the message for signaling the component location has been changed. The version information may be a version_number field.

In addition, the signaling message according to the embodiment may include identifier information of an associated broadcast service. At this time, the identifier information of the associated broadcast service may be a service_id field.

In addition, the signaling message according to the embodiment may include the number of components associated with the broadcast service. At this time, the number of associated components may be a num_component field.

In addition, the signaling message according to the embodiment may include the identifier of each component. For example, the component identifier may be configured by combining the MPD@id, period@id and representation@id of MPEG DASH. At this time, the identifier information of each component may be a component_id field.

In addition, the signaling message according to the embodiment may include the length of the component_id field. At this time, the length information of the component_id field may be a component_id_length field.

In addition, the signaling message according to the embodiment may include frequency information indicating a frequency capable of acquiring the component data. The component data may include a DASH segment. At this time, the frequency information capable of acquiring the component data may be a frequency_number field.

In addition, the signaling message according to the embodiment may include a unique identifier of a broadcaster. The broadcaster may transmit component data via a transmitted transport frame or a specific frequency. At this time, the unique identifier information of the broadcaster may be a broadcast_id field.

In addition, the signaling message according to the embodiment may include the identifier of a physical layer pipe for transmitting component data. At this time, the identifier information of the physical layer pipe for transmitting the component data may be a datapipe_id field.

In addition, the signaling message according to the embodiment may include an IP address format of an IP datagram including component data. The information on the IP address format may be an IP_version_flag field. The information on the IP address format of the IP datagram may be an IP_version_flag field. In a detailed embodiment, when the value of the IP_version_flag field is 0, this may indicate IPv4 and, when the value of the IP_version_flag field is 1, this may indicate IPv6.

In addition, the signaling message according to the embodiment may include information indicating whether the IP datagram including the component data includes a source IP address. Information indicating whether the IP datagram includes the source IP address may be a source_IP_address_flag field. In one embodiment, when the source_IP_address_flag field is 1, this may indicate that the IP datagram includes the source IP address.

In addition, the signaling message according to the embodiment may include information indicating whether the IP datagram including the component data includes a destination IP address. Information indicating whether the IP datagram includes the destination IP address may be a destination_IP_address_flag field. In one embodiment, when the destination_IP_address_flag field is 1, this may indicate that the IP datagram includes the destination IP address.

In addition, the signaling message according to the embodiment may include source IP address information of the IP datagram including the component data. In one embodiment, when the source_IP_address_flag field has a value of 1, the signaling message may include source IP address information. The source IP address information may be a source_IP_address field.

In addition, the signaling message according to the embodiment may include destination IP address information of the IP datagram including the component data. In one embodiment, when the destination_IP_address_flag field has a value of 1, the signaling message may include destination IP address information. The destination IP address information may be a destination_IP_address field.

In addition, the signaling message according to the embodiment may include UDP port number information of the IP datagram including the component data. The UDP port number information may be a UDP_port_num field.

In addition, the signaling message according to the embodiment may include transport session identifier information of the application layer for transmitting the transport packet including the component data. The session for transmitting the transport packet may be at least one of an ALC/LCT session and a FLUTE session. The identifier information of the session may be a tsi field.

In addition, the signaling message according to the embodiment may include identifier information of the transport packet including the component data. The identifier information of the transport packet may be a packet_id field.

In addition, the signaling message according to the embodiment may include the number of application signaling messages associated with the broadcast service. At this time, the broadcast service may be identified according to the service_id field. The information on the number of application signaling messages may be a num_app_signaling field.

In addition, the signaling message according to the embodiment may include identifier information of the application signaling message. The identifier information of the application signaling message may be an app_signaling_id field.

In addition, the signaling message according to the embodiment may include length information of the app_signaling_id field. The length information of the app-signaling_id_field may be an app_signaling_id_length field.

In addition, the signaling message according to the embodiment may include data for the path capable of acquiring the data of the application included in the signaling message associated with the identifier of the application signaling message. The information on the path for acquiring the data of the application included in the signaling message associated with the identifier of the application signaling message may be an app_delivery-info( ) field.

FIG. 52 is a diagram showing the syntax of an app_delevery_info( ) field according to one embodiment of the present invention.

The data for the path capable of acquiring the data of the application included in the signaling message associated with the identifier of the application signaling message according to the embodiment may include information indicating whether the application or associated data is transmitted via different broadcast streams. The information indicating whether the application or associated data is transmitted via different broadcast streams may be a broadcasting_flag field.

In addition, the data for the path capable of acquiring the data of the application included in the signaling message associated with the identifier of the application signaling message according to the embodiment may include the IP address format of the IP datagram including the application or associated data. The information on the IP address format of the IP datagram may be an IP_version_flag field. In one embodiment, when the IP_version_flag field is 0, this may indicate that the IP datagram including the application or associated data uses IPv4 and, when the IP_version_flag field is 1, this may indicate that the IP datagram including the application or associated data uses IPv6.

In addition, the data for the path capable of acquiring the data of the application included in the signaling message associated with the identifier of the application signaling message according to the embodiment may include information indicating whether the IP datagram including the application or associated data includes a source IP address. At this time, the associated data may be data necessary to execute the application.

The information indicating whether the IP datagram including the application or associated data includes the source IP address may be a source_IP_address_flag field. In one embodiment, when the source_IP_address_flag field is 1, this may indicate that the IP datagram includes a source IP address.

In addition, the data for the path capable of acquiring the data of the application included in the signaling message associated with the identifier of the application signaling message according to the embodiment may include information indicating whether the IP datagram including the application or associated data includes a destination IP address. The information indicating whether the IP datagram including the application or associated data includes the destination IP address may be a destination_IP_address_flag field. In one embodiment, when the destination_IP_address_flag field is 1, this may indicate that the IP datagram includes a destination IP address.

In addition, the data for the path capable of acquiring the data of the application included in the signaling message associated with the identifier of the application signaling message according to the embodiment may include a unique identifier of a broadcaster for transmitting the application or associated identifier.

In order words, the data for the path capable of acquiring the data of the application included in the signaling message associated with the identifier of the application signaling message according to the embodiment may include the identifier of a broadcast service transport stream. The unique identifier information of the broadcaster for transmitting the application or associated data via a transmitted transport frame or a specific frequency may be a broadcast_id field.

In addition, the data for the path capable of acquiring the data of the application included in the signaling message associated with the identifier of the application signaling message according to the embodiment may include a source IP address of the IP datagram including the application or associated data, when the source_IP_address_flag field has a value of 1. The source IP address information of the IP datagram including the application or associated data may be a source_IP_address field.

In addition, the data for the path capable of acquiring the data of the application included in the signaling message associated with the identifier of the application signaling message according to the embodiment may include a destination IP address of the IP datagram including the application or associated data, when the destination_IP_address_flag field has a value of 1. The destination IP address information of the IP datagram including the application or associated data may be a destination_IP_address field.

In addition, the data for the path capable of acquiring the data of the application included in the signaling message associated with the identifier of the application signaling message according to the embodiment may include information on the number of flow ports of the IP datagram including the application or associated data. The information indicating the number of flow ports of the IP datagram including the application or associated data may be a port_num_count field.

In addition, the data for the path capable of acquiring the data of the application included in the signaling message associated with the identifier of the application signaling message according to the embodiment may include information on the UDP port number of the IP datagram including the application or associated data. The information on the UDP port number of the IP datagram including the application or associated data may be a destination UDP_port_number field.

In addition, the data for the path capable of acquiring the data of the application included in the signaling message associated with the identifier of the application signaling message according to the embodiment may include the identifier of a transport session for transmitting the application or associated data. The transport session for transmitting the application or associated data may be any one of an ALC/LCT session and a FLUTE session. The identifier information of the transport session for transmitting the application or associated data may be a tsi field.

FIG. 53 is a diagram showing the syntax of an app_delevery_info( ) field according to another embodiment of the present invention.

The data for the path capable of acquiring the data of the application included in the signaling message associated with the identifier of the application signaling message according to the embodiment may include the identifier of the transport packet for transmitting the application or associated data. The transport packet for transmitting the application or associated data may follow a protocol based on a packet based transport flow. For example, the packet based transport flow may include an MPEG media transport protocol. The identifier information of the transport packet for transmitting the application or associated data may be a packet_id field.

FIG. 54 is a diagram showing component location signaling including path information capable of acquiring one or more component data configuring a broadcast service. More specifically, FIG. 54 shows information on a path capable of acquiring component data including a DASH segment when one or more components configuring the broadcast service are represented by the DASH segment.

Figure 55:
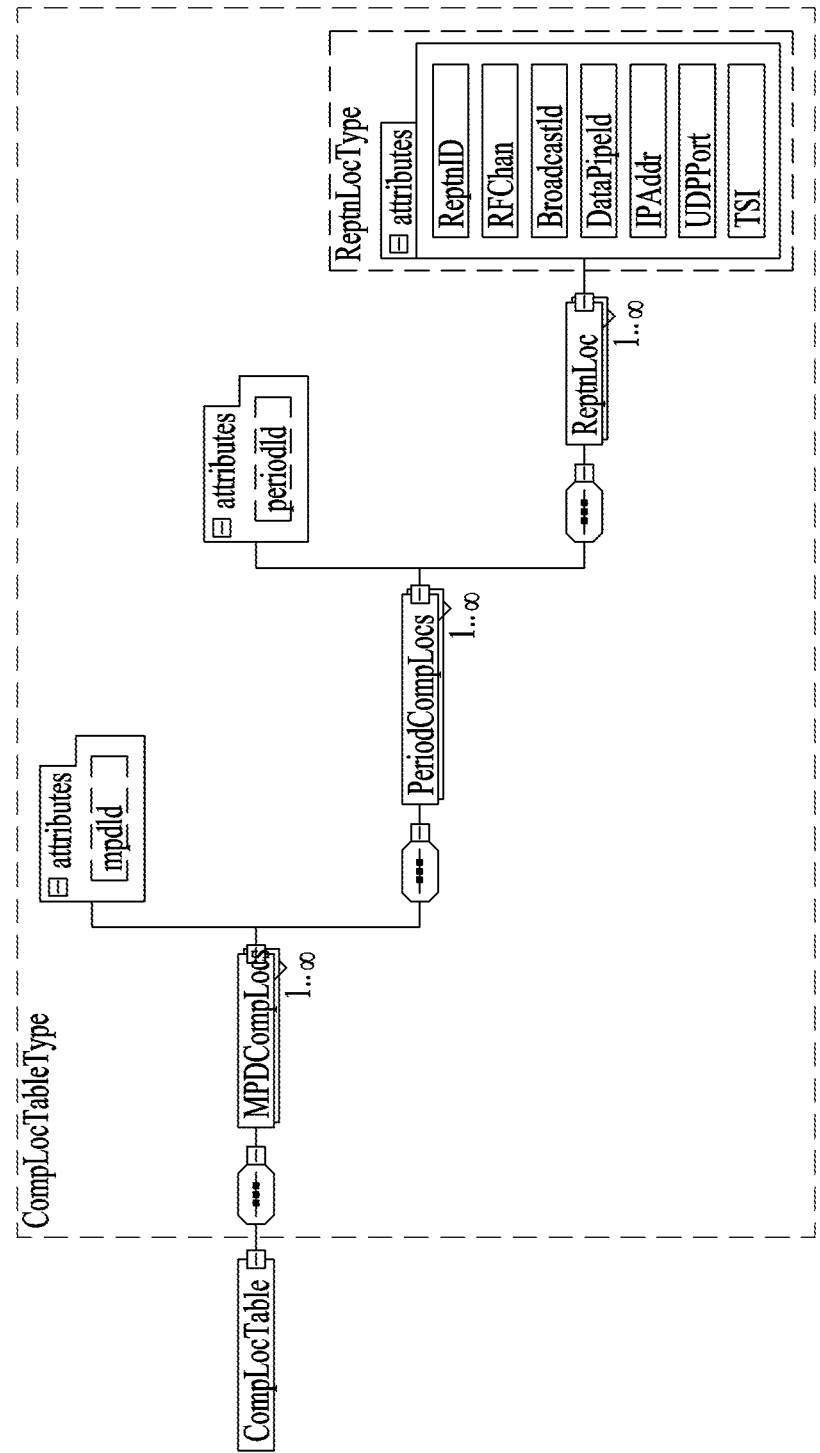
FIG. 55 is a diagram showing the configuration of the component location signaling of FIG. 54.

FIG. 55 is a diagram showing the configuration of the component location signaling of FIG. 54.

The component location signaling according to the embodiment may include identifier information of the MPEG DASH MPD associated with the broadcast service. The identifier information of the MPEG DASH MPD may be an mpdip field.

In addition, the component location signaling according to the embodiment may include the identifier of period attributes in the MPEG DASH MPD. The identifier information of the period attributes in the MPEG DASH MPD may be a periodid field.

In addition, the component location signaling according to the embodiment may include the identifier of representation attributes in the period indicated by the periodid field. The identifier information of the representation attributes in the period may be a ReptnID field.

In addition, the component location signaling according to the embodiment may include a frequency number capable of acquiring the DASH segment included in the representation attributes in the period indicated by the ReptnID field. The frequency number capable of acquiring the DASH segment may be an RF channel number. The information on the frequency number capable of acquiring the DASH segment may be an RFChan field.

In addition, the component location signaling according to the embodiment may include the unique identifier of the broadcaster for transmitting the DASH segment through a specific frequency or a transmitted transport frame. The information on the unique identifier of the broadcaster for transmitting the DASH segment may be a Broadcastingid field.

In addition, the component location signaling according to the embodiment may include the identifier of the physical layer pipe for delivering the DASH segment. The physical layer pipe may be a data pipe transmitted via the physical layer. The information on the identifier of the physical layer pipe for delivering the DASH segment may be a DataPipeId field.

In addition, the component location signaling according to the embodiment may include the destination IP address of the IP datagram including the DASH segment. The destination IP address information of the IP datagram including the DASH segment may be an IPAdd field.

In addition, the component location signaling according to the embodiment may include the UDP port number of the IP datagram including the DASH segment. The information on the UDP port number of the IP datagram including the DASH segment may be a UDPPort field.

In addition, the component location signaling according to the embodiment may include the identifier of the transport session for transmitting the transport packet including the DASH segment. The identifier of the session for transmitting the transport packet may be at least one of the ALC/LCT session and the FLUTE session. The information on the identifier of the session for transmitting the transport packet may be a TSI field.

In addition, the component location signaling according to the embodiment may include the identifier of the transport packet including the DASH segment. The information on the identifier of the transport packet may be a PacketId field.

FIG. 56 is a diagram showing other information included in signaling of a broadcast service in a next generation broadcast system in one embodiment of the present invention. The signaling of the service may include information on a service identifier (id), a service type, a service name, a channel number, a timebase location, a delivery mode, bootstrap info, MPD, an MPD signaling location, a component signaling location, an app signaling location and/or an object flow.

The service identifier may indicate information for identifying the service and may be expressed by id attributes.

The service type information may indicate the type of the service and may be expressed by serviceType attributes.

The service name information may indicate the name of the service and may be expressed by serviceName attributes.

The channel number information may indicate information on the channel number related to the service and may be expressed by channelNumber attributes.

The timebase location information may indicate the location where the timebase can be acquired and may be expressed by a TimebaseLocation element. Here, the timebase may indicate information indicating metadata to establish the timeline for synchronizing the components included in the service.

The delivery mode information included in the timebase location information may indicate the delivery mode of the timebase.

The bootstrap information included in the timebase location information may include the bootstrap information of the timebase according to the delivery mode.

The MPD may indicate the MPD associated with the service.

The MPD signaling location information may indicate the location where signaling related to the MPD or MPD URL can be acquired.

The delivery mode information included in the MPD signaling location may indicate the delivery mode of the MPD location signaling.

The bootstrap info information included in the MPD signaling location may include the bootstrap information of the MPD or the MPD URL according to the delivery mode.

The component signaling location information may indicate component location signaling information associated with the service.

The delivery mode information included in the component signaling location information may indicate the delivery mode of the component location signaling.

The bootstrap info information included in the component signaling location information may include the bootstrap information of the component location signaling according to the delivery mode.

The app signaling location information may indicate the location where the application signaling can be acquired.

The delivery mode information included in the app signaling location information may indicate the delivery mode of the application signaling.

The bootstrap info information included in the app signaling location information may include the bootstrap information of the application signaling according to the delivery mode.

The object flow information may include information on the related object flows for transmitting the components of the service.

FIG. 57 is a diagram showing a delivery mode included in service signaling of a next generation broadcast system according to one embodiment of the present invention.

As described above, the delivery mode may be included in each location element as attributes. The delivery mode may be distinguished as follows according to the value thereof.

When the value of the delivery mode is 0x00, this may indicate that IPv4/IPv6 flows are transmitted through the same broadcast or cellular network as the broadcast stream for receiving the service signaling message.

When the value of the delivery mode is 0x01, this may indicate that IPv4/IPv6 flows are transmitted through different broadcast networks.

When the value of the delivery mode is 0x02, this may indicate that session-based flows may be transmitted through the same broadcast network. Here, the session-based flow may mean an ALC/LCT or FLUTE session according to the embodiment.

When the value of the delivery mode is 0x03, this may indicate that session-based flows may be transmitted through different broadcast networks. Here, the session-based flow may mean an ALC/LCT or FLUTE session according to the embodiment.

When the value of the delivery mode is 0x04, this may indicate that packet-based flows may be transmitted through the same broadcast network. Here, the packet-based flow may mean MMT packet based transmission according to the embodiment.

When the value of the delivery mode is 0x05, this may indicate that packet-based flows may be transmitted through different broadcast networks. Here, the packet-based flow may mean MMT packet based transmission according to the embodiment.

When the value of the delivery mode is 0x06, this may indicate that the location is designated by the URL.

The values 0x07 to 0xFF of the delivery mode are not set and are used to indicate the other delivery modes.

As described above, the information included in the timebase location, the MPD signaling location, the component signaling location and the app signaling location element may be transmitted via the path equal to or different from that of the service signaling according to the delivery mode.

FIG. 58 is a diagram showing information on a bootstrap included in service signaling of a next generation broadcast system according to one embodiment of the present invention. The information on the bootstrap may be expressed by the BootstrapInfo element as follows.

The BootstrapInfo element described in the above-described signaling message may include information for enabling a receiver to acquire timebase information, MPD or MPD URL information, component signaling information, application signaling information, etc. That is, as described above, the BootstrapInfo may be included in each location element. Therefore, the BootstrapInfo element may include information on an IP address, a port number, a transport session identifier and/or an associated packet identifier.

More specifically, the BootstrapInfo element may include attributes such as RFchannel, broadcastID, datapipeID (PLPID), sourceIP, desitinationIP, destinationPort, tsi, URL, packetid, etc. The information included in the BootstrapInfo element may be changed according to the delivery mode included in the location element to which the BootstrapInfo element belongs.

The RFchannel attribute may include information on a radio frequency channel carrying a broadcast stream.

The broadcastID attribute may indicate the identifier of the broadcaster for transmitting the broadcast stream.

The datapipeID (PLPID) attribute may indicate the identifier of the physical layer data pipe carrying IP datagrams. The datapipeID may be expressed by PLPID and the PLPID may indicate the identifier of the physical layer pipe.

The sourceIP attribute may indicate the source address of the IP datagrams carrying associated data.

The destinationIP attribute may indicate the destination address of the IP datagrams carrying associated data.

The destinationPort attribute may indicate the destination port number of the IP datagrams carrying associated data.

The tsi attribute may indicate the identifier of the transport session for delivering transport packets carrying associated data.

The URL attribute may indicate the URL where associated data can be acquired.

The packetid attribute may indicate the identifier of the transport packets carrying associated data.

Hereinafter, the objectFlow element of the information included in the signaling for the broadcast service shown in FIG. 56 will be described with reference to FIG. 59.

FIG. 59 is a diagram showing information included in signaling for an object flow. Each object flow may be a flow for transmitting one or more components configuring the service. Therefore, one service may include information on one or more object flows.

The object flow may include id, objectFormat, contentType and/or contentEncoding attributes. In addition, the object flow may include a file element and the file element may include contentLocation and/or TOI attributes. In addition, the object flow may include a FileTemplate element and the FileTemplate element may include contentLocTemplate, startTOI, endTOI and/or scale attributes. In addition, the object flow may include an ObjectGroup element and the ObjectGroup element may include contentLocation, startTOI and/or end TOI attributes. In addition, the object flow may include the above-described BootstrapInfo element.

The id may indicate the identifier of the object flow. When the DASH segment is delivered via this object flow, the id can be equal to a combination of the MPD identifier, the period identifier and the DASH representation identifier.

The objectFormat may indicate the format of the objects in this object flow as described above.

The contentType may indicate the media content component type for this object flow.

The contentEncoding may indicate the encoding method of the objects delivered via this object flow.

The file element may include information on the file.

The contentLocation of the file element may indicate the location where the file can be acquired. When the DASH segment is delivered via this object flow, the contentLocation may be equal to the DASH segment URL.

The TOI attribute of the file element is a transport object identifier and may indicate the identifier of the transport object.

The FileTemplate element may include information on a file template.

The contentLocTemplate of the FileTemplate element may indicate the template used to generate the location where the file can be acquired.

The startTOI of the FileTemplate element may indicate a first TOI delivered via this object flow.

The endTOI of the FileTemplate element may indicate a last TOI delivered via this object flow.

The scale attribute of the FileTemplate element may indicate information on the scale between TIO values in this object flow.

The ObjectGroup element may include information on the group of the transport objects delivered via this object flow.

The contentLocation of the ObjectGroup element may indicate the location of the content associated with this object group.

The startTOI of the ObjectGroup element may indicate a first TOI delivered via this object group.

The endTOI of the ObjectGroup element may indicate a last TOI delivered via this object group.

The BootstrapInfo element may include the bootstrap information of this object flow.

The objectFormat attributes of the information included in the signaling for the object flow according to the embodiment of FIG. 59 may include information on the format of the payload included in this object delivered via the object flow. In a first embodiment, the object format attributes of the object flow may indicate that the payload included in the flow includes a generic file supporting real-time streaming. The object format according to the first embodiment may be a generic file.

In a second embodiment, the object format attributes of the object flow may indicate that the payload included in the flow includes a data file supporting real-time streaming. For example, the object format attributes according to the second embodiment may indicate the DASH segment in the ISOBMFF. In a third embodiment, the object format attributes of the object flow may indicate that the payload included in the flow includes a data file represented in the HTTP entity format in order to support real-time streaming. The HTTP entity may be one entity for transmitting content according to HTTP.

Hereinafter, the File Template element of the information included in the signaling for the object flow shown in FIG. 59 will be described with reference to FIG. 60.

FIG. 60 is a diagram showing a combination of information for representing a file template in one embodiment of the present invention. The file template may be represented by a combination of Representation@id and segment number. For example, when the DASH segment is transmitted, as shown in FIG. 60, Representation@id and segment number may be combined to dynamically generate information on the content location of each file. As a result, the broadcast reception device can efficiently acquire the flow of the transport packets including a specific component according to the dynamically generated content location information.

FIG. 61 is a diagram showing an object flow included in service signaling according to one embodiment of the present invention.

The object flow may further include a default attribute @isDefault along with the object format attributes described with reference to FIG. 59. That is, the object flow may include id, objectFormat, contentType, contentEncoding and/or isDefault attributes. In addition, the object flow may include a File element and the File element may include contentLocation and/or TOI attributes. The object flow may include a FileTemplate element and the FileTemplate element may include contentLocTemplate, startTOI, endTOI and/or scale attributes. In addition, the object flow may include an ObjectGroup element and the ObjectGroup element may include contentLocation, startTOI and/or endTOI attributes. In addition, the object flow may include the above-described BootstrapInfo element.

The id may indicate the identifier of this object flow. When the DASH segment is delivered via this object flow, the id can be equal to a combination of the MPD identifier, the period identifier and the DASH representation identifier.

The objectFormat may indicate the format of the objects in this object flow as described above.

The contentType may indicate the media content component type for this object flow.

The contentEncoding may indicate the encoding method of the objects delivered via this object flow.

The isDefault may indicate whether the payload included in the object delivered via the object flow includes component data used by default. For example, this may indicate whether the receiver basically receives and represents the component data delivered via this object flow without receiving and processing additional signaling information such as DASH MPD.

The file element may include information on the file.

The contentLocation of the file element may indicate the location where the file can be acquired. When the DASH segment is delivered via this object flow, the contentLocation may be equal to the DASH segment URL.

The TOI attribute of the file element is a transport object identifier and may indicate the identifier of the transport object.

The FileTemplate element may include information on a file template.

The contentLocTemplate of the FileTemplate element may indicate the template used to generate the location where the file can be acquired.

The startTOI of the FileTemplate element may indicate a first TOI delivered via this object flow.

The endTOI of the FileTemplate element may indicate a last TOI delivered via this object flow.

The scale attribute of the FileTemplate element may indicate information on the scale between TOI values in this object flow.

The ObjectGroup element may include information on the group of transport objects delivered via this object flow.

The contentLocation of the ObjectGroup element may indicate the location of the content associated with this object group.

The startTOI of the ObjectGroup element may indicate a first TOI delivered via this object group.

The endTOI of the ObjectGroup element may indicate a last TOI delivered via this object group.

The BootstrapInfo element may include the bootstrap information of this object flow.

FIG. 62 is a diagram showing other information included in signaling of a broadcast service in a next generation broadcast system in one embodiment of the present invention. An existing FLUTE client may receive a file description table (FDT) and then a broadcast reception device may receive a file according to the FDT. However, this method is not suitable for transmission and reception of the file via the real-time broadcast service. In other words, the FLUTE protocol may not be suitably applied to the real-time broadcast service using a unidirectional transport protocol. Accordingly, in one embodiment of the present invention, the service signaling may include FDT information.

More specifically, as shown in FIG. 62, the FDTInstance element according to one embodiment of the present invention may include an @id attribute (element). The @id attribute may indicate the specific identifier of the FDT instance. Accordingly, the broadcast reception device may identify the FDT instance via the @id attribute to dynamically generate the FDT instance. In addition, the broadcast reception device may receive and process real-time streaming data represented in the form of the file according to the generated FDT instance (The other attributes should be described).

In addition, the FDTInstance element according to one embodiment of the present invention may include an @Expires attribute. The @Expires attribute may include information on the expiration information of the FDTInstance. Accordingly, the broadcast reception device 100 may discard the expired FDTInstance according to the @Expires attribute.

In addition, the FDTInstance element according to one embodiment of the present invention may include an @Complete attribute. In one embodiment, when the @Complete attribute has a true value, the @Complete attribute may indicate that the future FDTInstance to be provided in the same session does not include new data.

In addition, the FDTInstance element according to one embodiment of the present invention may include an @Content-Location attribute. The @Content-Location attribute may be assigned a valid URI.

In addition, the FDTInstance element according to one embodiment of the present invention may include an @TOI attribute. The @TOI attribute is necessarily assigned a valid TOI value.

In addition, the FDTInstance element according to one embodiment of the present invention may include an @Content-Length attribute. The @Content-Length attribute may be the actual length information of the file content.

In addition, the FDTInstance element according to one embodiment of the present invention may include an @Transfer-Length attribute. The @Transfer-Length attribute may be the transfer length of file content.

In addition, the FDTInstance element according to one embodiment of the present invention may include an @Content-Encoding attribute. The @Content-Encoding attribute may be encoding information of file content.

In addition, the FDTInstance element according to one embodiment of the present invention may include an @Content-Type attribute. The @Content-Type attribute may be type information of file content.

FIG. 63 is a diagram showing signaling information for transport session information of a session level according to one embodiment of the present invention. When real-time or non-real-time content is transmitted using an LCT based protocol, signaling information describing the transport session information of a session level, such as a TSID, may be used. The TSID may be transmitted via some of the signaling message using various methods such as an in-band method of transport content or an out-of-band method using a separate path.

The TSID is an abbreviation for transport session instance descriptor and may indicate a descriptor including detailed information on the transport session.

The TSID may include a tsi attribute, a PayloadFormat element transmitted via a SourceFlow and/or a RepairFlow. In addition, the PayloadFormat element may include codePoint, protocol, deliveryObjectFormat, realtime, isobmff and/or packetheadersize attributes. In addition, the PayloadFormat element may include EFID and/or ApplicationIdentifier elements.

The tsi may indicate a transport session identifier.

The codePoint may define what code point value is used for this payload. This value may indicate the value of the CP field of the LCT header.

The protocol indicates the transport protocol of this payload. That is, the protocol may define the transport protocol of each payload at a payload level. Various types may exist in the LCT based transport protocol and the type may be identified by assigning an integer value to each type. For example, 0 may identify the ALC and 1 may identify ROUTE. In addition, the same identification method is applicable to the other protocols and new protocols to be defined in the future. In addition, in the above-described embodiment, the other @protocol value may be assigned in units of the LCT packet having the codepoint value equal to the value assigned to the @codepoint to transmit content using various protocols within one transport session.

The deliveryObjectFormat may indicate the payload format of the transport object.

The realtime may indicate whether the LCT packet includes component data for a real-time service. When the component data for the real-time service is included, this may indicate whether an extension header including NTP timestamps representing the presentation time of the transport object is included.

The isobmff may indicate whether the transport object is a sequence of ISOBMFF boxes, a DASH object referred to by the MPD or a sequence of ISOBMFF boxes fragmented according to a MPU mode of an MMT.

The packetheadersize may indicate the size of the route packet header.

The EFID may include detailed information of file delivered data.

The ApplicationIdentifier may provide additional information which can be mapped to the application which is carried in this transport session, e.g., the RepresentationID of the DASH content.

FIG. 64 is a diagram showing signaling information for transport session information of a session level according to another embodiment of the present invention. When realtime or non-real-time content is transmitted using an LCT based protocol, signaling information describing the transport session information of a session level, such as a TSID, may be used. The TSID may be transmitted via some of the signaling message using various methods such as an in-band method of transport content or an out-of-band method using a separate path.

When the protocols of the packets transmitted within one transport session are all identical, the TSID may have the following structure. That is, a protocol attribute may exist at TransportSession protocol attribute and may indicate that all packets of the session having the TSI value of the tsi attribute are transmitted via the protocol corresponding to the value assigned to the protocol attribute.

The TSID may include a tsi attribute, a protocol attribute of a SourceFlow, a PayloadFormat element and/or a RepiarFlow of each transport session. In addition, the PayloadFormat element may include codePoint, deliveryObjectFormat, realtime, isobmff and/or packetheadersize attributes. In addition, the PayloadFormat element may include EFID and/or ApplicationIdentifier elements.

The tsi may indicate a transport session identifier.

The protocol indicates the transport protocol of this payload. Various types may exist in the LCT based transport protocol and the type may be identified by assigning an integer value to each type. For example, 0 may identify the ALC and 1 may identify ROUTE. In addition, the same identification method is applicable to the other protocols and new protocols to be defined in the future. In addition, in the above-described embodiment, content transmission using the same protocol is possible with respect to all the packets included in one transport session.

The codePoint may define what code point value is used for this payload. This value may indicate the value of the CP field of the LCT header.

The deliveryObjectFormat may indicate the payload format of the transport object.

The realtime may indicate whether the LCT packet includes an extension header including NTP timestamps representing the presentation time of the transport object.

The isobmff may indicate whether the transport object is a sequence of ISOBMFF boxes, a DASH object referred to by the MPD or a sequence of ISOBMFF boxes fragmented according to a MPU mode of an MMT.

The packetheadersize may indicate the size of the route packet header.

The EFID may include detailed information of file delivered data.

The ApplicationIdentifier may provide additional information which can be mapped to the application which is carried in this transport session, e.g., the RepresentationID of the DASH content.

Figure 65:
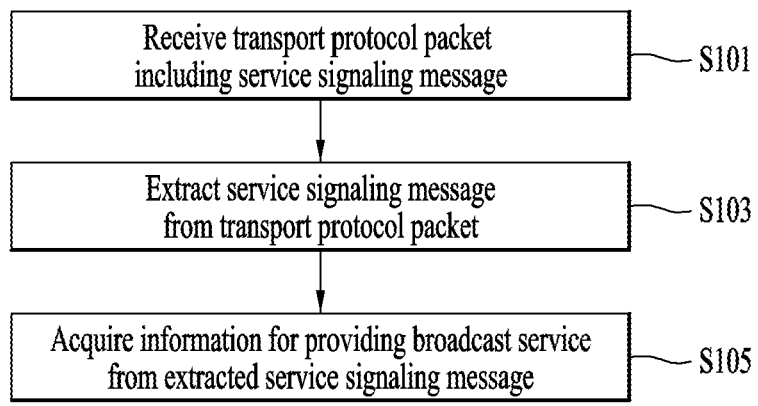
FIG. 65 is a flowchart illustrating a process of operating a broadcast reception device according to one embodiment of the present invention.

FIG. 65 is a flowchart illustrating a process of operating a broadcast reception device according to one embodiment of the present invention.

A reception unit of the broadcast reception device receives a transport protocol packet including a service signaling message (S101). The reception unit may include an Internet protocol communication unit and a broadcast reception unit. The service signaling message may be information for signaling at least one of a broadcast service and media content. In one embodiment, the transport protocol may be an Internet protocol (IP). In addition, in one embodiment, the service signaling message may be expressed in at least one of binary format and XML format. The transport protocol packet may include a signaling message header and a signaling message.

A controller of the broadcast reception device extracts the service signaling message from the received transport protocol packet (S103). More specifically, the transport protocol packet may be parsed to extract the service signaling message. The controller may acquire an Internet protocol datagram from the layered transport protocol packet. The acquired Internet protocol datagram may include the service signaling message.

The controller of the broadcast reception device acquires information for providing a broadcast service from the service signaling message (S105). The information for providing the broadcast service may be part of the service signaling message.

In one embodiment, the information for providing the broadcast service may be service information for a timebase including metadata on a timeline which is a series of time information for content.

In another embodiment, information for providing a broadcast service may be service information of detailed information for acquisition of segments configuring content in adaptive media streaming. Detailed information for acquisition of segments configuring content in adaptive media streaming may be a media presentation description (MPD).

In another embodiment, the information for providing the broadcast service may be service information of a path for acquiring component data configuring content in a broadcast service. The component data may be an entity configuring a broadcast service or content. At this time, the information on the path for acquiring the component data may be identification information of a physical layer pipe delivering component data. The layered transport protocol packet may include a physical layer pipe delivered through a physical layer. A plurality of physical layer pipes may be present. Accordingly, it is necessary to distinguish a physical layer pipe including component data to be acquired from the physical layer pipes.

In another embodiment, the information for providing the broadcast service may be service information for a signaling message for an application used in the broadcast service. At this time, the service information for the signaling message for the application may be at least one of identifier information of a broadcaster for transmitting the application, a source IP address of an Internet protocol datagram including the application, a destination IP address of the Internet protocol datagram including the application, a port number of a user datagram protocol (UDP) of the Internet protocol datagram including the application, identifier information of a transport session for transmitting the application and identifier information of a packet for transmitting the application.

In another embodiment, the information for providing the broadcast service may be service information for a signaling message for a service used in the broadcast service. At this time, the service may be one content.

In another embodiment, the information for providing the broadcast service may be service information of a flow for delivering the component of the broadcast service.

Figure 66:
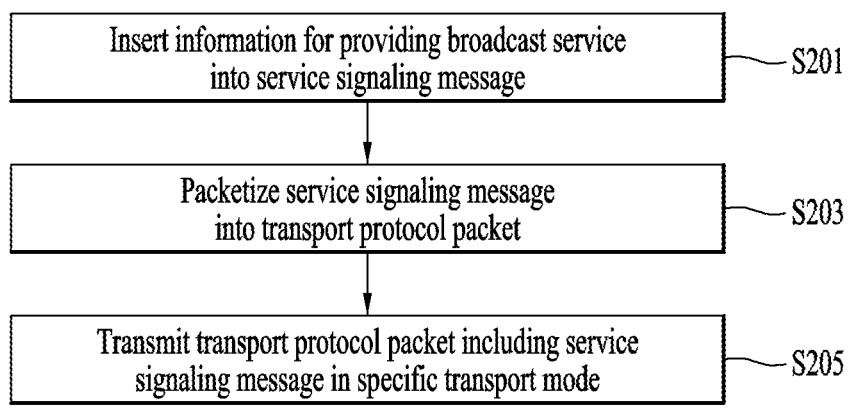
FIG. 66 is a flowchart illustrating a process of operating a broadcast transmission device according to one embodiment of the present invention.

FIG. 66 is a flowchart illustrating a process of operating a broadcast transmission device according to one embodiment of the present invention.

A controller of the broadcast transmission device inserts information for providing a broadcast service into a service signaling message (S201). In one embodiment, the controller of the broadcast transmission device may insert the information for providing the broadcast service into the service signaling message in XML format. In another embodiment, the controller of the broadcast transmission device may insert the information for providing the broadcast service into the service signaling message in binary format.

The controller of the broadcast transmission device packetizes the service signaling message, into which the information for providing the broadcast service is inserted, into a transport protocol packet (S203). At this time, the transport protocol may be any one of a session based transport protocol (ALC/LCT or FLUTE) and a packet based transport protocol (MPEG-2 TS or MMT).

A transmission unit of the broadcast transmission device transmits the transport protocol packet, into which the service signaling message is packetized, to a broadcast reception device in a specific transport mode (S205).

In one embodiment, the information for providing the broadcast service may be service information for a timebase including metadata on a timeline which is a series of time information for content.

In another embodiment, the information for providing the broadcast service may be service information of detailed information for acquisition of segments configuring content in adaptive media streaming. Detailed information for acquisition of segments configuring content in adaptive media streaming may be a media presentation description (MPD).

In another embodiment, the information for providing the broadcast service may be service information of a path for acquiring component data configuring content in a broadcast service. The component data may be an entity configuring a broadcast service or content. At this time, the information on the path for acquiring the component data may be identification information of a physical layer pipe delivering component data. The layered transport protocol packet may include a physical layer pipe delivered through a physical layer. A plurality of physical layer pipes may be present. Accordingly, it is necessary to distinguish a physical layer pipe including component data to be acquired from the physical layer pipes.

In another embodiment, the information for providing the broadcast service may be service information for a signaling message for an application used in the broadcast service. At this time, the service information for the signaling message for the application may be at least one of identifier information of a broadcaster for transmitting the application, a source IP address of an Internet protocol datagram including the application, a destination IP address of the Internet protocol datagram including the application, a port number of a user datagram protocol (UDP) of the Internet protocol datagram including the application, identifier information of a transport session for transmitting the application and identifier information of a packet for transmitting the application.

In another embodiment, the information for providing the broadcast service may be service information for a signaling message for a service used in the broadcast service. At this time, the service may be one content.

In another embodiment, the information for providing the broadcast service may be service information of a flow for delivering the component of the broadcast service.

One embodiment of the present invention provides a broadcast transmission device supporting a next-generation hybrid broadcast based on a terrestrial broadcast network and an Internet communication network, a method of operating the broadcast transmission device, a broadcast reception device and a method of operating the broadcast reception device.

In particular, one embodiment of the present invention provides a broadcast transmission device using a payload format of a service signaling message in a next-generation broadcast system, a method of operating the broadcast transmission device, a broadcast reception device and a method of operating the broadcast reception device.

In particular, one embodiment of the present invention provides a broadcast transmission device using broadcast service signaling in a next-generation broadcast system, a method of operating the broadcast transmission device, a broadcast reception device and a method of operating the broadcast reception device.

In particular, one embodiment of the present invention provides a broadcast transmission device using signaling of a component acquisition path of a broadcast service in a next-generation broadcast system, a method of operating the broadcast transmission device, a broadcast reception device and a method of operating the broadcast reception device.

In particular, one embodiment of the present invention provides a broadcast transmission device using signaling for a transmission flow of a component of a broadcast service in a next-generation broadcast system, a method of operating the broadcast transmission device, a broadcast reception device and a method of operating the broadcast reception device.

The features, structures, effects, etc. of the above-described embodiments are included in at least one embodiment of the present invention and are not limited to one embodiment. Further, the features, structures, effects, etc. of the above-described embodiments may be embodied by combining or modifying other embodiments by those skilled in the art. Accordingly, such combinations or modifications may be interpreted as being included within the scope of the present invention.

Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, differences related to such modifications or applications should be interpreted as being included within the scope of the present invention defined by the appended claims.

The invention claimed is:

1. A broadcast transmitting apparatus comprising:
a processor configured to generate first service signaling information for scanning broadcast services, second service signaling information, and service data for a broadcast service; and
a transmitter to transmit broadcast signals,
wherein the broadcast signals include the first service signaling information, the second service signaling information, and the service data for the broadcast service,
wherein the first service signaling information includes service identification information, service type information, service name information, and channel number information,
wherein the first service signaling information further includes source Internet protocol (IP) address information, destination IP address information and a destination user datagram protocol (UDP) port number of transport packets carrying the second service signaling information,
wherein the second service signaling information includes a media presentation description (MPD), component information including information on one or more transport session in which a content component of the broadcast service is carried, and application information for providing application-related metadata,
wherein the broadcast signals further include object flow information for an object flow which carries the content component of the broadcast service,
wherein the object flow information includes format information of an object,
wherein the first service signaling information is transmitted through low layer signaling, and
wherein the second service signaling information is transmitted through the transport packets.

2. The broadcast transmitting apparatus according to claim 1, wherein the object flow information further includes file template information, and
wherein the file template information includes an identifier that is substituted with a value corresponding to a segment number.

3. The broadcast transmitting apparatus according to claim 1, wherein the component information includes source IP address information, destination IP address information, a destination UDP port number, and a transport session identifier (TSI) for the content component.

4. The broadcast transmitting apparatus according to claim 1, wherein the object flow information further includes content type information indicating a media type of the content component carried by the object flow.

5. The broadcast transmitting apparatus according to claim 1, wherein the format information includes a value for indicating that the object represents one of a file or Hypertext Transfer Protocol (HTTP) message.

6. A broadcast transmitting method comprising:
generating first service signaling information for scanning broadcast services, second service signaling information, and service data for a broadcast service; and
transmitting broadcast signals,
wherein the broadcast signals include the first service signaling information, the second service signaling information, and the service data for a broadcast service,
wherein the first service signaling information includes service identification information, service type information, service name information, and channel number information,
wherein the first service signaling information further includes source Internet protocol (IP) address information, destination IP address information and a destination user datagram protocol (UDP) port number of transport packets carrying the second service signaling information,
wherein the second service signaling information includes a media presentation description (MPD), component information including information on one or more transport session in which a content component of the broadcast service is carried, and application information for providing application-related metadata,
wherein the broadcast signals further include object flow information for an object flow which carries the content component of the broadcast service,
wherein the object flow information includes format information of an object,
wherein the first service signaling information is transmitted through low layer signaling, and
wherein the second service signaling information is transmitted through the transport packets.

7. The broadcast transmitting method according to claim 6, wherein the object flow information further includes file template information, and
wherein the file template information includes an identifier that is substituted with a value corresponding to a segment number.

8. The broadcast transmitting method according to claim 6, wherein the component information includes source IP address information, destination IP address information, a destination UDP port number, and transport session identifier (TSI) for the content component.

9. The broadcast transmitting method according to claim 6, wherein the object flow information further includes content type information indicating a media type of the content component carried by the object flow.

10. The broadcast transmitting method according to claim 6, wherein the format information includes a value for indicating that the object represents one of a file or Hypertext Transfer Protocol (HTTP) message.

11. A broadcast receiving apparatus comprising:
a receiver configured to receive broadcast signals,
wherein the broadcast signals include first service signaling information for scanning broadcast services, second service signaling information, and service data for a broadcast service,
wherein the first service signaling information includes service identification information, service type information, service name information, and channel number information,
wherein the first service signaling information further includes source Internet protocol (IP) address information, destination IP address information and a destination user datagram protocol (UDP) port number of transport packets carrying the second service signaling information,
wherein the second service signaling information includes a media presentation description (MPD), component information including information on one or more transport session in which a content component of the broadcast service is carried, and application information for providing application-related metadata,
wherein the broadcast signals further include object flow information for an object flow which carries the content component of the broadcast service, and
wherein the object flow information includes format information of an object; and
a signaling processor configured to decode the first service signaling information, and decode the second service signaling information based on the decoded first service signaling information,
wherein the first service signaling information is transmitted through low layer signaling, and
wherein the second service signaling information is transmitted through the transport packets.

12. A broadcast receiving method comprising:
receiving broadcast signals,
wherein the broadcast signals include first service signaling information for scanning broadcast services, second service signaling information, and service data for a broadcast service,
wherein the first service signaling information includes service identification information, service type information, service name information, and channel number information,
wherein the first service signaling information further includes source Internet protocol (IP) address information, destination IP address information and a destination user datagram protocol (UDP) port number of transport packets carrying the second service signaling information,
wherein the second service signaling information includes a media presentation description (MPD), component information including information on one or more transport session in which a content component of the broadcast service is carried, and application information for providing application-related metadata,
wherein the broadcast signals further include object flow information for an object flow which carries the content component of the broadcast service, and
wherein the object flow information includes format information of an object;
decoding the first service signaling information; and
decoding the second service signaling information based on the decoded first service signaling information,
wherein the first service signaling information is transmitted through low layer signaling, and
wherein the second service signaling information is transmitted through the transport packets.

* * * * *